US009305565B2

(12) United States Patent
Levien et al.

(10) Patent No.: US 9,305,565 B2
(45) Date of Patent: Apr. 5, 2016

(54) METHODS AND SYSTEMS FOR SPEECH ADAPTATION DATA

(75) Inventors: Royce A. Levien, Lexington, MA (US);
Richard T. Lord, Tacoma, WA (US);
Robert W. Lord, Seattle, WA (US);
Mark A. Malamud, Seattle, WA (US)

(73) Assignee: Elwha LLC, Bellevue, WA (US)

( * ) Notice: Subject to any disclaimer, the term of this patent is extended or adjusted under 35 U.S.C. 154(b) by 476 days.

(21) Appl. No.: 13/609,143

(22) Filed: Sep. 10, 2012

(65) Prior Publication Data

US 2013/0325452 A1    Dec. 5, 2013

Related U.S. Application Data

(63) Continuation-in-part of application No. 13/485,733, filed on May 31, 2012, and a continuation-in-part of application No. 13/485,738, filed on May 31, 2012, and a continuation-in-part of application No.

(Continued)

(51) Int. Cl.
| G10L 15/06 | (2013.01) |
| G10L 21/00 | (2013.01) |
| G10L 15/065 | (2013.01) |
| G10L 15/07 | (2013.01) |
| G10L 15/30 | (2013.01) |

(52) U.S. Cl.
CPC .............. *G10L 21/00* (2013.01); *G10L 15/06* (2013.01); *G10L 15/063* (2013.01); *G10L 15/065* (2013.01); *G10L 15/07* (2013.01); *G10L 15/30* (2013.01)

(58) Field of Classification Search
CPC ....... G10L 15/06; G10L 15/063; G10L 15/065
USPC .................................. 704/200–504
See application file for complete search history.

(56) References Cited

U.S. PATENT DOCUMENTS

| 5,214,615 A | * | 5/1993 | Bauer ........................... 367/128 |
| 6,006,183 A | * | 12/1999 | Lai et al. ........................ 704/235 |
| 6,493,506 B1 | * | 12/2002 | Schoner et al. ............... 386/334 |
| 6,823,306 B2 | * | 11/2004 | Reding et al. ................. 704/244 |

(Continued)

FOREIGN PATENT DOCUMENTS

| EP | 1 205 906 A1 | 5/2002 |
| EP | 2 405 422 A1 | 1/2012 |

OTHER PUBLICATIONS

PCT International Search Report; International App. No. PCT/US13/48640; Jan. 14, 2014; pp. 1-2.

(Continued)

*Primary Examiner* — Samuel G Neway
(74) *Attorney, Agent, or Firm* — Suiter Swantz pc llo

(57) ABSTRACT

Computationally implemented methods and systems include receiving speech data correlated to one or more words spoken by a particular party, receiving adaptation data that is at least partly based on at least one speech interaction of a particular party that is discrete from the received speech data, wherein at least a portion of the adaptation data has been stored on a particular device associated with the particular party, obtaining target data regarding a target configured to process at least a portion of the received speech data, and determining whether to apply the adaptation data for processing at least a portion of the received speech data, at least partly based on the acquired target data. In addition to the foregoing, other aspects are described in the claims, drawings, and text.

54 Claims, 64 Drawing Sheets

Related U.S. Application Data

13/538,855, filed on Jun. 29, 2012, and a continuation-in-part of application No. 13/538,866, filed on Jun. 29, 2012, and a continuation-in-part of application No. 13/564,647, filed on Aug. 1, 2012, and a continuation-in-part of application No. 13/564,649, filed on Aug. 1, 2012, now Pat. No. 8,843,371, and a continuation-in-part of application No. 13/564,650, filed on Aug. 1, 2012, and a continuation-in-part of application No. 13/564,651, filed on Aug. 1, 2012, and a continuation-in-part of application No. 13/609,139, filed on Sep. 10, 2012, and a continuation-in-part of application No. 13/609,142, filed on Sep. 10, 2012.

(56) References Cited

U.S. PATENT DOCUMENTS

| | | | |
|---|---|---|---|
| 7,099,825 B1 | 8/2006 | Cook | |
| 7,162,414 B2 | 1/2007 | Stanford | |
| 7,174,298 B2* | 2/2007 | Sharma | 704/270.1 |
| 7,191,133 B1* | 3/2007 | Pettay | 704/270 |
| 7,194,409 B2 | 3/2007 | Balentine et al. | |
| 7,219,058 B1 | 5/2007 | Rose et al. | |
| 7,243,070 B2* | 7/2007 | Hoffmann et al. | 704/251 |
| 7,346,151 B2* | 3/2008 | Erhart et al. | 379/88.14 |
| 7,660,715 B1* | 2/2010 | Thambiratnam | 704/244 |
| 7,949,529 B2* | 5/2011 | Weider et al. | 704/270 |
| 8,032,383 B1* | 10/2011 | Bhardwaj et al. | 704/275 |
| 8,082,147 B2* | 12/2011 | Parthasarathy et al. | 704/231 |
| 8,374,867 B2* | 2/2013 | Ljolje et al. | 704/244 |
| 8,843,371 B2* | 9/2014 | Levien et al. | 704/244 |
| 2002/0019734 A1 | 2/2002 | Bartosik | |
| 2002/0065656 A1 | 5/2002 | Reding et al. | |
| 2002/0091511 A1* | 7/2002 | Hellwig et al. | 704/201 |
| 2002/0138265 A1* | 9/2002 | Stevens et al. | 704/251 |
| 2002/0138274 A1* | 9/2002 | Sharma et al. | 704/270 |
| 2002/0147579 A1 | 10/2002 | Kushner et al. | |
| 2002/0188446 A1 | 12/2002 | Gao et al. | |
| 2003/0050783 A1* | 3/2003 | Yoshizawa | 704/270.1 |
| 2003/0088421 A1 | 5/2003 | Maes et al. | |
| 2003/0191639 A1 | 10/2003 | Mazza | |
| 2004/0064316 A1* | 4/2004 | Gallino | 704/251 |
| 2004/0088162 A1* | 5/2004 | He et al. | 704/235 |
| 2004/0158457 A1* | 8/2004 | Veprek et al. | 704/201 |
| 2004/0176953 A1 | 9/2004 | Coyle et al. | |
| 2004/0199388 A1 | 10/2004 | Armbruster et al. | |
| 2005/0049868 A1 | 3/2005 | Busayapongchai | |
| 2005/0058435 A1* | 3/2005 | Chung et al. | 386/95 |
| 2005/0152565 A1* | 7/2005 | Jouppi et al. | 381/309 |
| 2007/0233487 A1 | 10/2007 | Cohen et al. | |
| 2008/0015848 A1 | 1/2008 | Arizmendi et al. | |
| 2008/0082332 A1* | 4/2008 | Mallett et al. | 704/250 |
| 2009/0043582 A1* | 2/2009 | Zhou et al. | 704/257 |
| 2009/0063144 A1 | 3/2009 | Rose et al. | |
| 2009/0265217 A1 | 10/2009 | Aurenz | |
| 2009/0290689 A1 | 11/2009 | Watanabe et al. | |
| 2010/0086108 A1* | 4/2010 | Jaiswal et al. | 379/88.04 |
| 2010/0283829 A1 | 11/2010 | De Beer et al. | |
| 2011/0029307 A1 | 2/2011 | Parthasarathy et al. | |
| 2011/0119059 A1 | 5/2011 | Ljolje et al. | |
| 2011/0288863 A1* | 11/2011 | Rasmussen | 704/235 |
| 2012/0010887 A1* | 1/2012 | Boregowda et al. | 704/250 |
| 2012/0014568 A1 | 1/2012 | Conwell et al. | |
| 2013/0325441 A1* | 12/2013 | Levien et al. | 704/9 |
| 2013/0325446 A1* | 12/2013 | Levien et al. | 704/201 |
| 2013/0325447 A1* | 12/2013 | Levien et al. | 704/201 |
| 2013/0325448 A1* | 12/2013 | Levien et al. | 704/201 |
| 2013/0325449 A1* | 12/2013 | Levien et al. | 704/201 |
| 2013/0325450 A1* | 12/2013 | Levien et al. | 704/201 |
| 2013/0325451 A1* | 12/2013 | Levien et al. | 704/201 |
| 2013/0325452 A1* | 12/2013 | Levien et al. | 704/201 |
| 2013/0325453 A1* | 12/2013 | Levien et al. | 704/201 |
| 2013/0325454 A1* | 12/2013 | Levien et al. | 704/201 |
| 2013/0325459 A1* | 12/2013 | Levien et al. | 704/231 |
| 2013/0325474 A1* | 12/2013 | Levien et al. | 704/251 |
| 2014/0039881 A1* | 2/2014 | Levien et al. | 704/201 |
| 2014/0039882 A1* | 2/2014 | Levien et al. | 704/201 |

OTHER PUBLICATIONS

European Patent Office, Supplementary European Search Report, Pursuant to Rule 62 EPC; App. No. EP 13808577; Jan. 19, 2016; pp. 1-2.

* cited by examiner

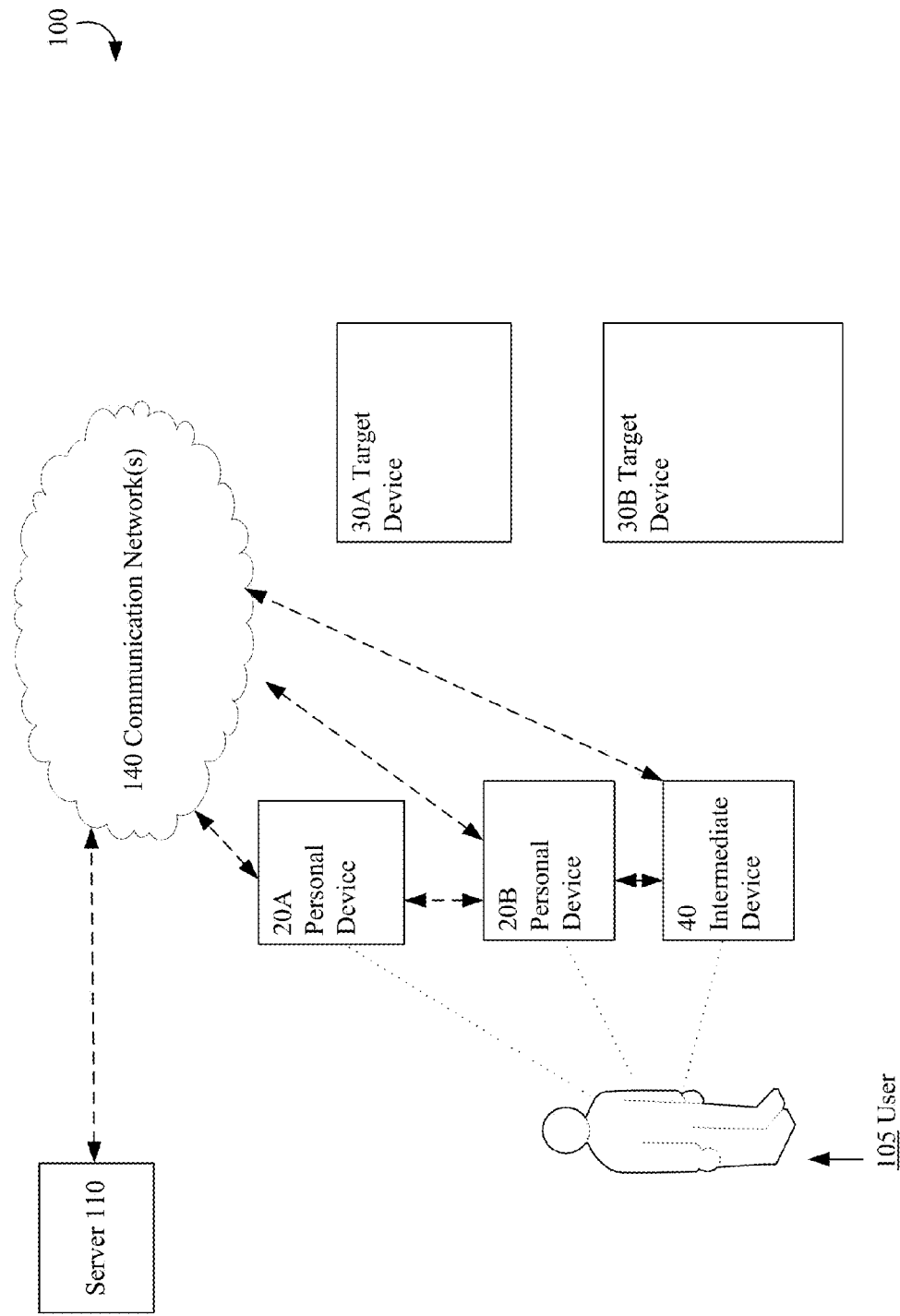

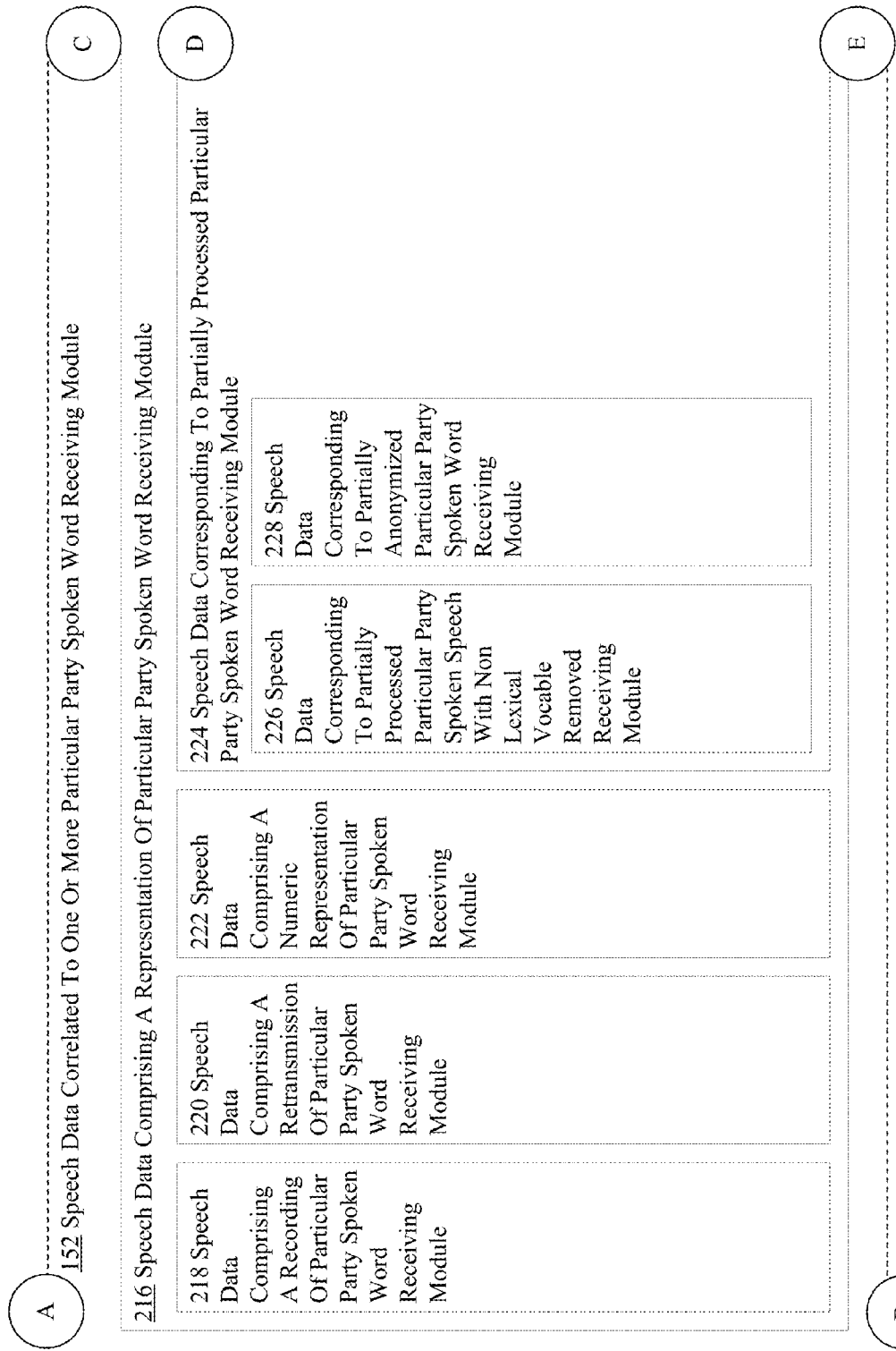

154 Adaptation Data At Least Partly Based On Discrete Speech Interaction Of Particular Party Separate From Detected Speech Data, And Has Been Stored On A Particular Party-associated Particular Device Receiving Module 302 Adaptation Data Comprising One Or More Words And Corresponding Pronunciations Of The One Or More Words At Least Partly Based On Discrete Speech Interaction Of Particular Party Separate From Detected Speech Data, And Has Been Stored On A Particular Party-associated Particular Device Receiving Module 304 Adaptation Data Comprising One Or More Words And Corresponding Pronunciations Of The One Or More Words At Least Partly Based On At Least One Previous Training By The Particular Party Separate From Detected Speech Data, And Has Been Stored On A Particular Party-associated Particular Device Receiving Module 306 Adaptation Data Comprising One Or More Words And Corresponding Pronunciations Of The One Or More Words At Least Partly Based On At Least One Previous Training By The Particular Party Separate From Detected Speech Data Corresponding To An Order Placed By The Particular Party At An Automated Drive-thru Terminal That Accepts Speech Input, And Has Been Stored On A Particular Party-associated Particular Device Receiving Module 308 Adaptation Data Comprising One Or More Words And Corresponding Pronunciations Of The One Or More Words At Least Partly Based On At Least One Previous Training By The Particular Party In Response To Cellular Telephone Device Prompting Separate From Detected Speech Data Corresponding To An Order Placed By The Particular Party At An Automated Drive-thru Terminal That Accepts Speech Input, And Has Been Stored On A Particular Party-associated Particular Device Receiving Module 310 Adaptation Data Comprising One Or More Words And Corresponding Pronunciations Of The One Or More Words At Least Partly Based On At Least One Previous Training By The Particular Party In Response To Cellular Telephone Device Prompting Separate From Detected Speech Data Corresponding To An Order Placed By The Particular Party At An Automated Drive-thru Terminal That Accepts Speech Input, And Has Been Stored On A Particular Device Linked To The Particular Party Through A Contract With A Telecommunications Provider Receiving Module

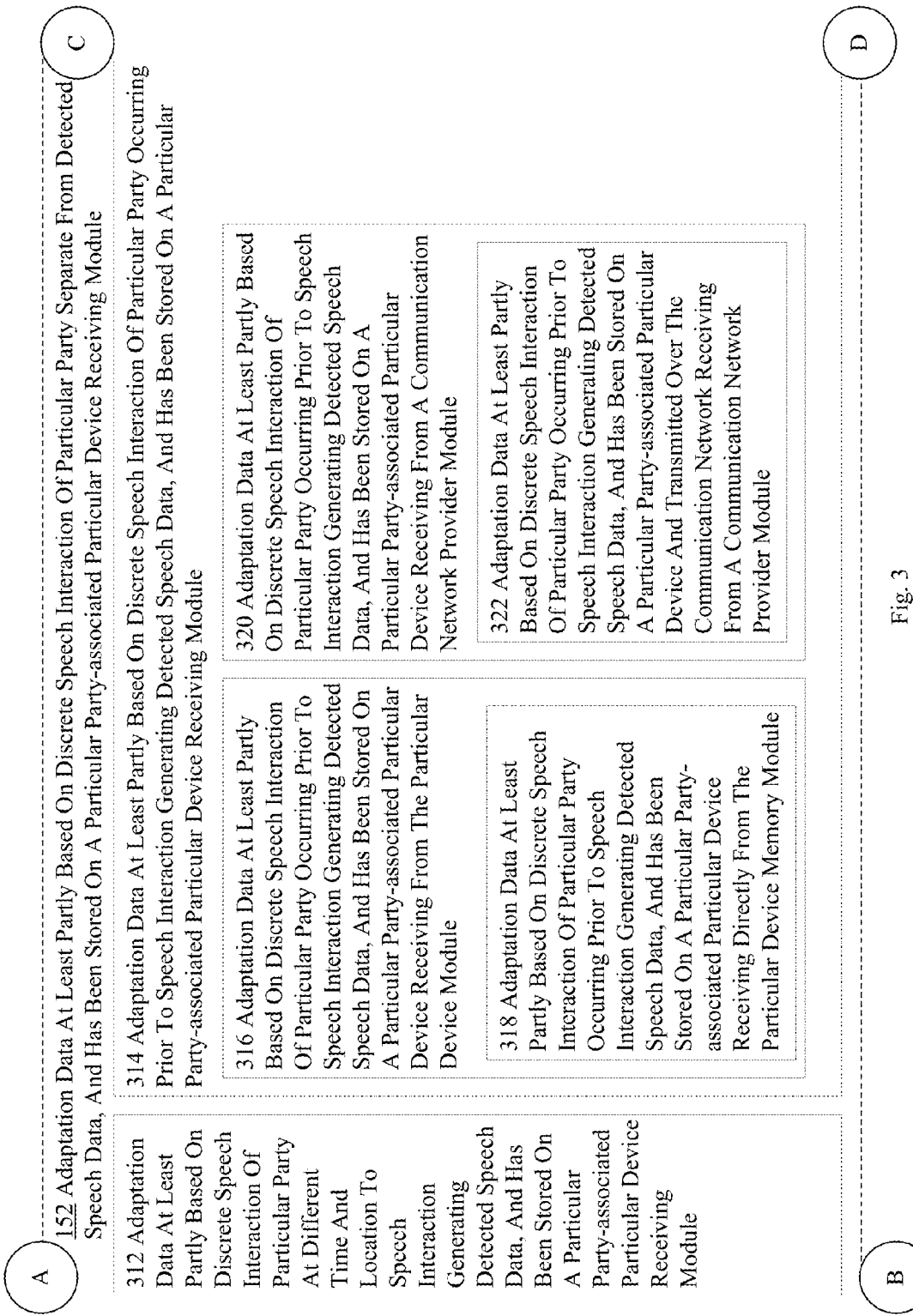

FIG. 3D

152 Adaptation Data At Least Partly Based On Discrete Speech Interaction Of Particular Party Separate From Detected Speech Data, And Has Been Stored On A Particular Party-associated Particular Device Receiving Module 328 Adaptation Data At Least Partly Based On Discrete Speech Interaction Of Particular Party Occurring Prior To Speech Interaction Generating Detected Speech Data, And Has Been Stored On A Particular Party-associated Particular Device Receiving In Response To Condition Module 336 Adaptation Data At Least Partly Based On Discrete Speech Interaction Of Particular Party Occurring Prior To Speech Interaction Generating Detected Speech Data, And Has Been Stored On A Particular Party-associated Particular Device Receiving In Response To Detection Of The Particular Party At A Particular Location Module 338 Adaptation Data At Least Partly Based On Discrete Speech Interaction Of Particular Party Occurring Prior To Speech Interaction Generating Detected Speech Data, And Has Been Stored On A Particular Party-associated Particular Device Receiving In Response To Detection Of The Particular Party Within A Particular Proximity Of A Target Device Module

Fig. 3

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

Fig. 3

152 Adaptation Data At Least Partly Based On Discrete Speech Interaction Of Particular Party Separate From Detected Speech Data, And Has Been Stored On A Particular Party-associated Particular Device Receiving Module

340 Adaptation Data At Least Partly Based On Discrete Speech Interaction Of Particular Party Separate From Detected Speech Data, And Has Been Stored On A Particular Party-associated Particular Device Acquiring From A Further Device Module

| 342 Adaptation Data Originating At Further Device And At Least Partly Based On Discrete Speech Interaction Of Particular Party Separate From Detected Speech Data, And Has Been Stored On A Particular Party-associated Particular Device Acquiring From A Further Device Module | 344 Adaptation Data At Least Partly Based On Discrete Speech Interaction Of Particular Party Separate From Detected Speech Data, And Has Been Stored On A Particular Party-associated Particular Device Acquiring From A Further Device Related To The Particular Device Module | 346 Adaptation Data At Least Partly Based On Discrete Speech Interaction Of Particular Party Separate From Detected Speech Data, And Has Been Stored On A Particular Party-associated Particular Device Associated With The Particular Party Module | 348 Adaptation Data At Least Partly Based On Discrete Speech Interaction Of Particular Party Separate From Detected Speech Data, And Has Been Stored On A Particular Party-associated Particular Device Acquiring From A Further Device In Communication With The Particular Device Module | 350 Adaptation Data At Least Partly Based On Discrete Speech Interaction Of Particular Party Separate From Detected Speech Data, And Has Been Stored On A Particular Party-associated Particular Device Acquiring From A Further Device At Least Partially Controlled By The Particular Device Module | 352 Adaptation Data At Least Partly Based On Discrete Speech Interaction Of Particular Party Separate From Detected Speech Data, And Has Been Stored On A Particular Party-associated Particular Device Acquiring From A Further Device That Received The Adaptation Data From The Particular Device Module |

FIG. 3E

152 Adaptation Data At Least Partly Based On Discrete Speech Interaction Of Particular Party Separate From Detected Speech Data, And Has Been Stored On A Particular Party-associated Particular Device Receiving Module 340 Adaptation Data At Least Partly Based On Discrete Speech Interaction Of Particular Party Separate From Detected Speech Data, And Has Been Stored On A Particular Party-associated Particular Device Acquiring From A Further Device Module 354 Adaptation Data Comprising Instructions For Modifying A Pronunciation Dictionary, Said Adaptation Data At Least Partly Based On Discrete Speech Interaction Of Particular Party Separate From Detected Speech Data, And Has Been Stored On A Particular Party-associated Particular Device Acquiring From A Further Device Module 356 Adaptation Data Comprising A First Instruction For Modifying A Pronunciation Dictionary Based On A First Particular Party Interaction And A Second Instruction For Modifying A Pronunciation Dictionary Based On A Second Particular Party Interaction, And Has Been Stored On A Particular Party-associated Particular Device Acquiring From A Further Device Module 358 Adaptation Data Comprising A First Instruction For Modifying A Pronunciation Dictionary Based On A First Particular Party Interaction And A Second Instruction For Modifying A Pronunciation Dictionary Based On A Second Particular Party Interaction, Said First Instruction Has Been Stored On A Particular Party-associated Particular Device Acquiring From A Further Device Module

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

152 Adaptation Data At Least Partly Based On Discrete Speech Interaction Of Particular Party Separate From Detected Speech Data, And Has Been Stored On A Particular Party-associated Particular Device Receiving Module

360 Adaptation Data At Least Partly Based On Discrete Speech Interaction Of Particular Party Separate From Detected Speech Data, And Has Been Stored On A Particular Party-associated Particular Device Generating Module

362 Adaptation Data At Least Partly Based On Discrete Speech Interaction Of Particular Party Separate From Detected Speech Data, And Has Been Stored On A Particular Party-associated Particular Device Retrieving Module

364 Adaptation Data At Least Partly Based On Discrete Speech Interaction Of Particular Party With Particular Type Of Device Separate From Detected Speech Data, And Has Been Stored On A Particular Party-associated Particular Device Receiving Module

366 Adaptation Data At Least Partly Based On Discrete Speech Interaction Of Particular Party With Device Of Same Type As Target Device Configured To Receive Speech Data, Said Discrete Interaction Separate From Detected Speech Data, And Has Been Stored On A Particular Party-associated Particular Device Receiving Module

368 Adaptation Data At Least Partly Based On Discrete Speech Interaction Of Particular Party With Device Having Particular Characteristic Separate From Detected Speech Data, And Has Been Stored On A Particular Party-associated Particular Device Receiving Module

370 Adaptation Data At Least Partly Based On Discrete Speech Interaction Of Particular Party With Device Communicating On A Same Communication Network As Target Device And Separate From Detected Speech Data, And Has Been Stored On A Particular Party-associated Particular Device Receiving Module

372 Adaptation Data At Least Partly Based On Discrete Speech Interaction Of Particular Party With Device Configured To Carry Out A Same Function As The Target Device And Separate From Detected Speech Data, And Has Been Stored On A Particular Party-associated Particular Device Receiving Module

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

152 Adaptation Data At Least Partly Based On Discrete Speech Interaction Of Particular Party Separate From Detected Speech Data, And Has Been Stored On A Particular Party-associated Particular Device Receiving Module 364 Adaptation Data At Least Partly Based On Discrete Speech Interaction Of Particular Party With Particular Type Of Device Separate From Detected Speech Data, And Has Been Stored On A Particular Party-associated Particular Device Receiving Module 368 Adaptation Data At Least Partly Based On Discrete Speech Interaction Of Particular Party With Device Having Particular Characteristic Separate From Detected Speech Data, And Has Been Stored On A Particular Party-associated Particular Device Receiving Module 374 Adaptation Data At Least Partly Based On Discrete Speech Interaction Of Particular Party With Device Configured To Accept A Same Type Of Input As The Target Device And Separate From Detected Speech Data, And Has Been Stored On A Particular Party-associated Particular Device Receiving Module 376 Adaptation Data At Least Partly Based On Discrete Speech Interaction Of Particular Party With Particular Device Separate From Detected Speech Data, And Has Been Stored On A Particular Party-associated Particular Device Receiving Module 378 Adaptation Data At Least Partly Based On Discrete Speech Interaction Of Particular Party With Cellular Telephone Device Separate From Detected Speech Data, And Has Been Stored On A Particular Party-associated Cellular Telephone Device Receiving Module 380 Adaptation Data At Least Partly Based On Particular Party Telephone Conversation Carried Out Using Cellular Telephone Device Separate From Detected Speech Data, And Has Been Stored On A Particular Party-associated Cellular Telephone Receiving Module 382 Adaptation Data At Least Partly Based On Particular Party Speech Command Given To Cellular Telephone Device Separate From Detected Speech Data, And Has Been Stored On A Particular Party-associated Cellular Telephone Receiving Module

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

FIG. 3I

152 Adaptation Data At Least Partly Based On Discrete Speech Interaction Of Particular Party Separate From Detected Speech Data, And Has Been Stored On A Particular Party-associated Particular Device Receiving Module

| 384 Adaptation Data At Least Partly Based On Discrete Speech Interaction Of Particular Party Separate From Detected Speech Data And Using Same Utterance As Speech That Is Part Of Speech Data, And Has Been Stored On A Particular Party-associated Particular Device Receiving Module | 386 Adaptation Data At Least Partly Based On Discrete Speech Interaction Of Particular Party And Using Same Utterance As Speech That Is Part Of Speech That Is Part Of The Speech Data Receiving Module | 388 Adaptation Data Comprising A Phoneme Dictionary Based On One Or More Particular Party Pronunciations, Such That At Least One Entry Has Been Stored On A Particular Party-associated Particular Device Receiving Module | 390 Adaptation Data Comprising A Sentence Diagramming Path Selection Algorithm Based On One Or More Particular Party Discrete Speech Interactions, And Has Been Stored On A Particular Party-associated Particular Device Receiving Module | 392 Adaptation Data At Least Partly Based On Discrete Speech Interaction Of Particular Party Separate From Detected Speech Data, And At Least Partly Collected By A Particular Party-associated Particular Device Receiving Module | 394 Adaptation Data Comprising Instructions For Modifying One Or More Portions Of A Speech Recognition Component Of A Target Device That Are At Least Partly Based On One Or More Particular Party Speech Interactions, And Has Been Stored On A Particular Party-associated Particular Device Receiving Module |

Fig. 3

| Fig. 3A | Fig. 3B | Fig. 3C | Fig. 3D | Fig. 3E | Fig. 3F | Fig. 3G | Fig. 3H | Fig. 3I | Fig. 3J | Fig. 3K |

Fig. 3

152 Adaptation Data At Least Partly Based On Discrete Speech Interaction Of Particular Party Separate From Detected Speech Data, And Has Been Stored On A Particular Party-associated Particular Device Receiving Module

| 396 Adaptation Data Comprising A Location Of Instructions For Modifying One Or More Portions Of A Speech Recognition Component Of A Target Device That Are At Least Partly Based On One Or More Particular Party Speech Interactions, And Has Been Stored On A Particular Party-associated Particular Device Receiving Module | 398 Adaptation Data At Least Partly Based On Discrete Speech Interaction Of Particular Party Separate From Detected Speech Data, And Transmitted From A Particular Party-associated Particular Device Receiving Module | 301 Adaptation Data At Least Partly Based On Discrete Speech Interaction Of Particular Party Separate From Detected Speech Data, And Stored On A Particular Party-associated Particular Device Receiving Module | 303 Adaptation Data At Least Partly Based On Discrete Speech Interaction Of Particular Party Separate From Detected Speech Data, And Is Temporarily Stored On The Particular-party Associated Particular Device Until Remote Server Deposit Receiving Module | 305 Adaptation Data At Least Partly Based On Discrete Speech Interaction Of Particular Party Separate From Detected Speech Data, And Was Transmitted From A First Device To A Second Device Using The Particular Party-associated Particular Device As A Channel Configured To Facilitate The Transaction Receiving Module |

FIG. 3J

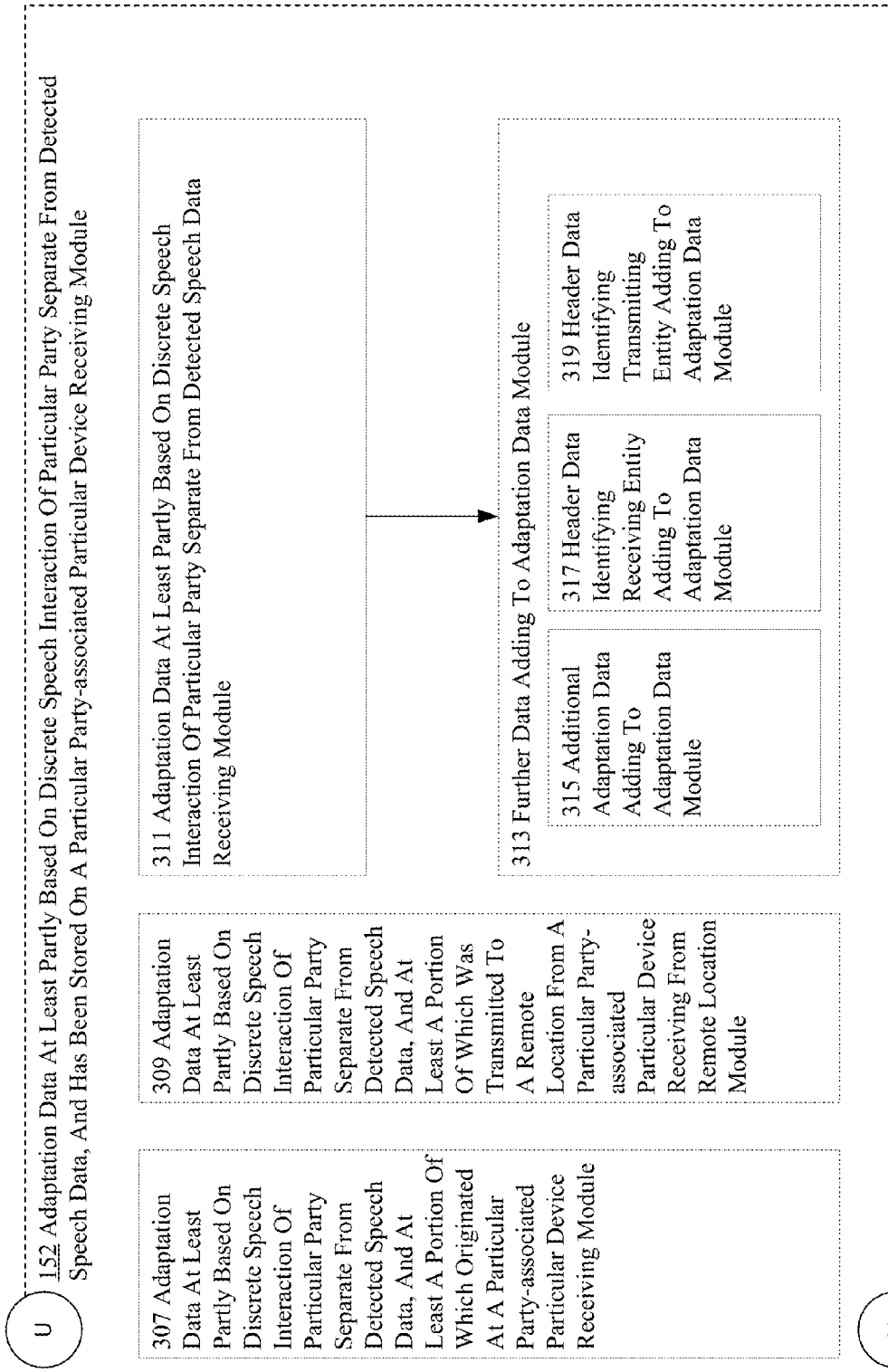

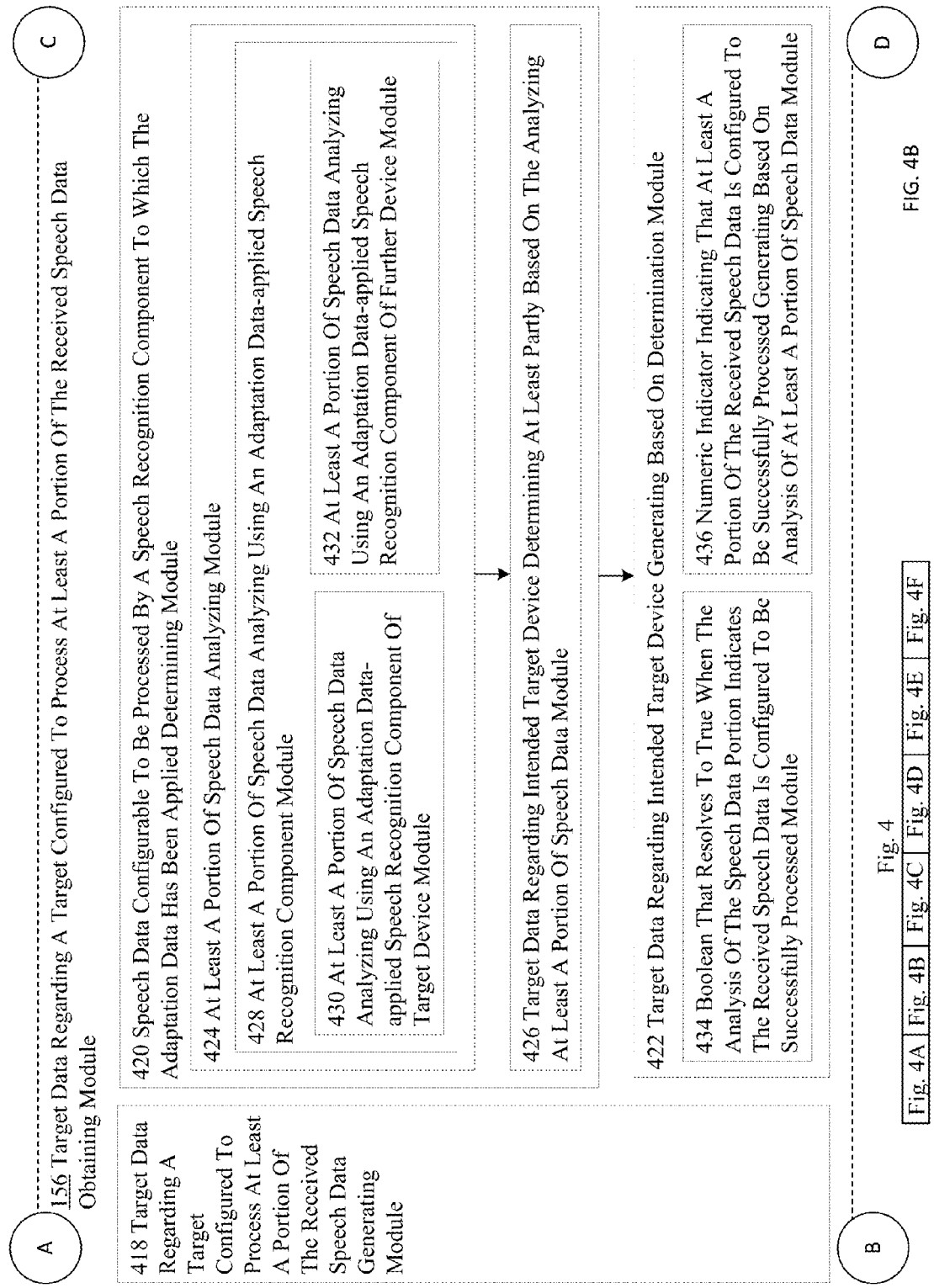

FIG. 4E

156 Target Data Regarding A Target Configured To Process At Least A Portion Of The Received Speech Data Obtaining Module 462 Target Data Regarding A Target Device Configured To Process At Least A Portion Of Speech Data Receiving Module 466 Target Data Regarding A Target Device Configured To Process At Least A Portion Of Speech Data Receiving From A Further Device Module 472 Target Data Regarding A Target Device Configured To Process At Least A Portion Of Speech Data Receiving From A Further Device Configured To Process The Speech Data Less Efficiently Than The Target Device Module 474 Target Data Regarding A Target Device Configured To Process At Least A Portion Of Speech Data Receiving From A Further Device For Which The Speech Data Is Unintended Module 476 Target Data Regarding A Target Device Configured To Process At Least A Portion Of Speech Data And Target Data Indicating The Speech Data Was Determined To Be Intended For The Target Device Receiving From A Further Device Module 494 Data Identifying The Target Device Receiving Module 496 Name Of The Target Device Receiving Module 497 Device Identifier Of The Target Device Receiving Module 498 Address Of The Target Device Receiving Module 499 Location Of The Target Device Receiving Module

Fig. 4

| Fig. 4A | Fig. 4B | Fig. 4C | Fig. 4D | Fig. 4E | Fig. 4F |

156 Target Data Regarding A Target Configured To Process At Least A Portion Of The Received Speech Data Obtaining Module 478 Target Data Regarding An Intended Application Module Configured To Process At Least A Portion Of The Received Speech Data Obtaining Module 480 Target Data Regarding An Intended Application Module Configured To Process, Facilitated By The Adaptation Data, At Least A Portion Of The Received Speech Data Obtaining Module 482 Target Data Regarding A Speech Data Processing Capability Of An Intended Application Module Configured To Process, Facilitated By The Adaptation Data, At Least A Portion Of The Received Speech Data Obtaining Module 484 Target Data Regarding A First Application Module Configured To Process At Least A Portion Of The Received Speech Data And A Second Application Module Configured To Process At Least A Portion Of The Received Speech Data Obtaining Module 486 Target Data Regarding A Word Processing Application Module Configured To Process At Least A Portion Of The Received Speech Data And A Speech Recognition Application Module Configured To Process At Least A Portion Of The Received Speech Data Obtaining Module 488 Target Data Regarding A Word Processing Application Module Configured To Process At Least A Portion Of The Received Speech Data And An Operating System Application Module Configured To Process At Least A Portion Of The Received Speech Data Obtaining Module 490 Target Data Regarding A Word Processing Application Module Configured To Process At Least A Portion Of The Received Speech Data And A Spreadsheet Processing Application Module Configured To Process At Least A Portion Of The Received Speech Data Obtaining Module

FIG. 4F

| Fig. 4A | Fig. 4B | Fig. 4C | Fig. 4D | Fig. 4E | Fig. 4F |

Fig. 4

158 Application Of Adaptation Data For Processing At Least A Portion Of The Received Speech Data Determining Module 502 Application Of Adaptation Data For Processing At Least A Portion Of The Received Speech Data Determining Based On Acquired Target Data Comprising An Indication Of Intended Device Module 504 Application Of Adaptation Data For Processing At Least A Portion Of The Received Speech Data Determining Based On Acquired Target Data Comprising An Indication That Speech Data Has Arrived At Intended Device Module 506 Application Of Adaptation Data For Processing At Least A Portion Of The Received Speech Data Determining Based On Acquired Target Data Comprising An Indication That Speech Data Has Not Arrived At Intended Device Module 508 Application Of Adaptation Data For Processing At Least A Portion Of The Received Speech Data Choosing Against Based On Acquired Target Data Comprising An Indication That Speech Data Has Not Arrived At Intended Device Module 510 Application Of Adaptation Data For Processing At Least A Portion Of The Received Speech Data Determining Based On Acquired Target Data Comprising An Indication That Speech Data Has Arrived At Other Device Than An Intended Device Module 512 Application Of Adaptation Data For Processing At Least A Portion Of The Received Speech Data Determining When Acquired Target Data Indicates Capability Of Adaptation Data Application Module

| Fig. 5A | Fig. 5B | Fig. 5C |

158 Application Of Adaptation Data For Processing At Least A Portion Of The Received Speech Data Determining Module

| 514 Application Of Adaptation Data For Processing At Least A Portion Of The Received Speech Data Determining Based On Acquired Target Data Indicating Presence Of One Or More Other Devices Configured To Apply Adaptation Data Module | 516 Application Of Adaptation Data For Processing At Least A Portion Of The Received Speech Data Determining Against Based On Acquired Target Data Indicating Presence Of One Or More Other Devices Configured To Efficiently Apply Adaptation Data Module | 518 Application Of Adaptation Data For Processing At Least A Portion Of The Received Speech Data Determining Based On Acquired Target Data Indicating Presence Of One Or More Other Applications Module | 520 Application Of Adaptation Data For Processing At Least A Portion Of The Received Speech Data Determining Based On One Or More Characteristics Of One Or More Applications And Target Data Indicating A Presence Of The One Or More Applications Module |

Fig. 5

| Fig. 5A | Fig. 5B | Fig. 5C |

FIG. 5B

158 Application Of Adaptation Data For Processing At Least A Portion Of The Received Speech Data Determining Module

522 Application Of Adaptation Data For Processing At Least A Portion Of The Received Speech Data Determining Against Based Acquired Target Data Comprising One Or More Characteristics Of One Or More Applications Module

524 Application Of Adaptation Data For Processing At Least A Portion Of The Received Speech Data Determining Against Based Acquired Target Data Comprising A Presence Of One Or More Applications And One Or More Characteristics Of The One Or More Applications Module

526 Application Of Adaptation Data For Processing At Least A Portion Of The Received Speech Data Determining Against Based Acquired Target Data Comprising A Developer Of One Or More Applications Module

528 Application Of Adaptation Data For Processing At Least A Portion Of The Received Speech Data Determining Based On One Or More Application Preference Flags Module

530 Application Of Adaptation Data For Processing At Least A Portion Of The Received Speech Data Determining Based On One Or More User-controlled Preference Flags Module

532 Application Of Adaptation Data For Processing At Least A Portion Of The Received Speech Data Determining Based On Operating System Decision Module

| Fig. 5A | Fig. 5B | Fig. 5C |

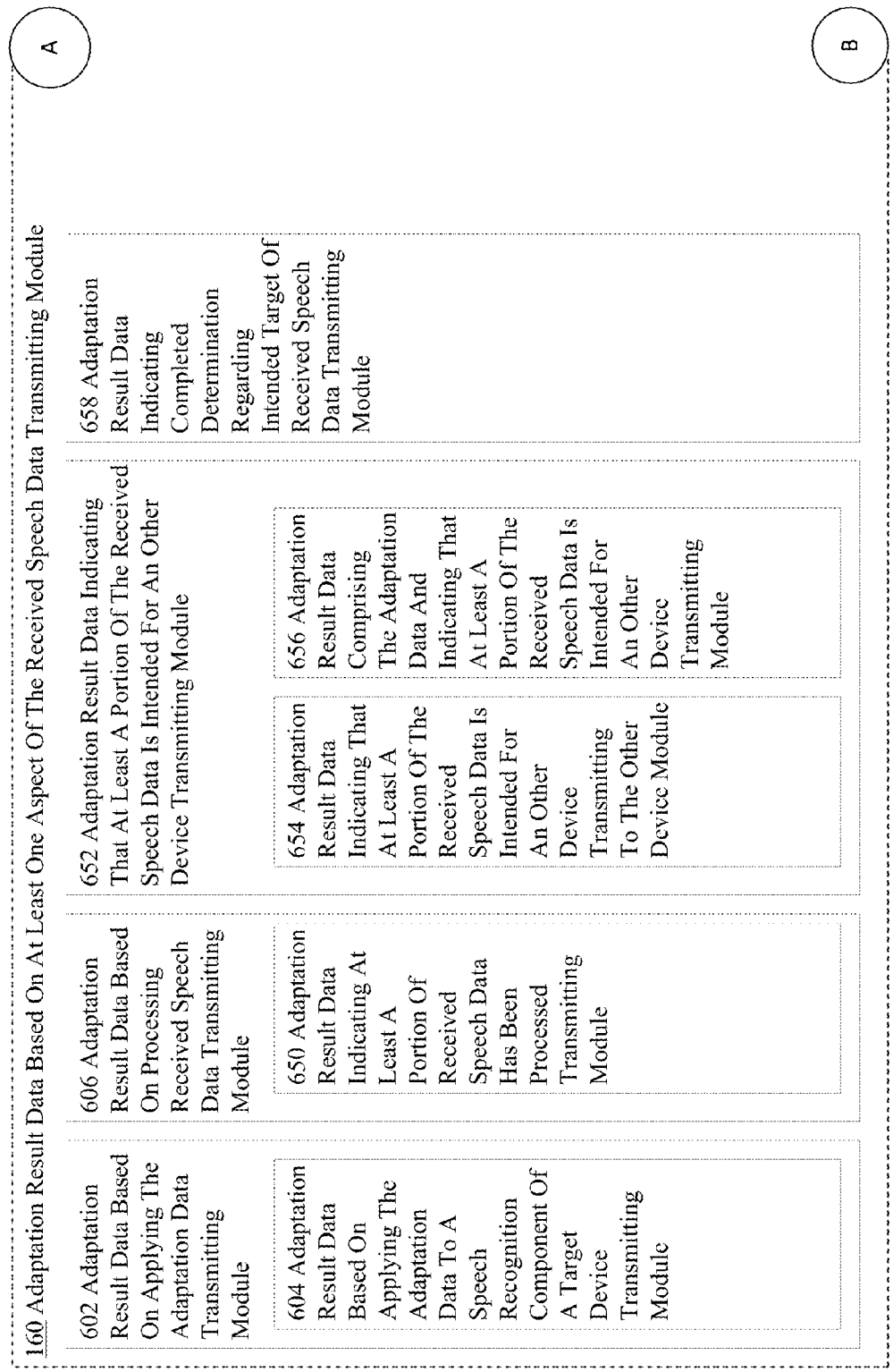

160 Adaptation Result Data Based On At Least One Aspect Of The Received Speech Data Transmitting Module 608 Adaptation Result Data Based On A Measure Of Success Of At Least One Portion Of A Speech-facilitated Transaction Corresponding To The Received Speech Data Transmitting Module 610 Adaptation Result Data Comprising A Representation Of Success Of At Least One Portion Of A Speech-facilitated Transaction Corresponding To The Received Speech Data Transmitting Module 612 Adaptation Result Data Comprising A Numeric Representation Of Success Provided By The Particular Party Of At Least One Portion Of A Speech-facilitated Transaction Corresponding To The Received Speech Data Transmitting Module 614 Adaptation Result Data Comprising A Numeric Representation Of Success Of At Least One Portion Of A Speech-facilitated Transaction Corresponding To The Received Speech Data Transmitting Module 616 Adaptation Result Data Comprising Confidence Rate Of Correct Interpretation Of At Least One Portion Of The Speech-facilitated Transaction Corresponding To The Received Speech Data Transmitting Module 618 Adaptation Result Data Comprising A List Of At Least One Word That Was A Portion Of The Received Speech Data And That Was Improperly Interpreted During Speech Data Processing Transmitting Module 620 Adaptation Result Data Comprising At Least One Phoneme Appearing In At Least One Improperly Interpreted Word Transmitting Module

Fig. 6

| Fig. 6A | Fig. 6B |

702 Receiving Speech Data Correlated To One Or More Words Spoken By A Particular Party

844 Receiving Speech Data Comprising Previously Recorded One Or More Words Spoken By The Particular Party, And A Timestamp Corresponding To A Time At Which The One Or More Words Spoken By The Particular Party Were Recorded

846 Receiving Speech Data That Comprises A Compressed Version Of Data Correlated To One Or More Words Spoken By The Particular Party

848 Receiving Audio Data Corresponding To One Or More Words Spoken By The Particular Party

850 Receiving, From A Further Device, Speech Data Correlated To One Or More Words Spoken By A Particular Party

852 Receiving, From The Further Device, Audio Data Derived From One Or More Words Spoken By The Particular Party

854 Receiving, From The Further Device, Audio Data Derived From One Or More Words Spoken By The Particular Party And Detected By The Further Device

856 Receiving, From The Further Device, Audio Data Derived From One Or More Words Spoken By The Particular Party And Recorded By The Further Device

858 Receiving, From The Further Device, Audio Data Derived By The Further Device From One Or More Words Spoken By The Particular Party And Detected By The Particular Device

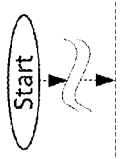
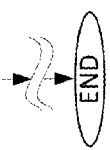

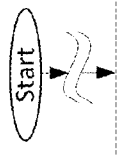

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 902 Acquiring Data Comprising One Or More Words And Corresponding Pronunciations Of The One Or More Words That Is At Least Partly Based On At Least One Speech Interaction Of The Particular Party, Said At Least One Speech Interaction Of The Particular Party Discrete From The Detected Speech Data, Wherein At Least A Portion Of The Adaptation Data Has Been Stored On The Particular Device Associated With The Particular Party 904 Acquiring Data Comprising One Or More Words And Corresponding Pronunciations Of The One Or More Words That Is At Least Partly Based On At Least One Previous Training By The Particular Party Providing The Pronunciations Of The One Or More Words In Response To Prompting, That Is Discrete From The Detected Speech Data, Wherein At Least A Portion Of The Adaptation Data Has Been Stored On The Particular Device Associated With The Particular Party 906 Acquiring Adaptation Data Comprising One Or More Words And Corresponding Pronunciations Of The One Or More Words That Is At Least Partly Based On At Least One Previous Training By The Particular Party Repeating The Pronunciations Of The One Or More Words In Response To Prompting By A Cellular Telephone Device With A Screen And A Memory, That Is Discrete From The Detected Speech Data Corresponding To An Order For Food Placed By The Particular Party At An Automated Drive-thru Terminal That Accepts Speech Input, Wherein At Least A Portion Of The Adaptation Data Has Been Stored On The Cellular Telephone Device Associated With The Particular Party 908 Acquiring Adaptation Data Comprising One Or More Words And Corresponding Pronunciations Of The One Or More Words That Is At Least Partly Based On At Least One Previous Training By The Particular Party Repeating The Pronunciations Of The One Or More Words In Response To Prompting By A Cellular Telephone Device With A Screen And A Memory, That Is Discrete From The Detected Speech Data Corresponding To An Order For Food Placed By The Particular Party At An Automated Drive-thru Terminal That Accepts Speech Input, Wherein At Least A Portion Of The Adaptation Data Has Been Stored On The Cellular Telephone Device Associated With The Particular Party

FIG. 9A

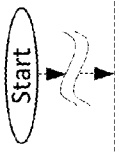
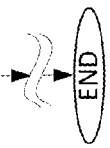

FIG. 9C

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 912 Acquiring Adaptation Data That Is At Least Partly Based On At Least One Speech Interaction Of The Particular That Occurred Prior To A Speech Interaction That Generated The Detected Speech Data, Wherein At Least A Portion Of The Adaptation Data Has Been Stored On A Particular Device Associated With The Particular Party 914 Acquiring At Least A Portion Of Adaptation Data That Is At Least Partly Based On At Least One Speech Interaction Of The Particular That Occurred Prior To A Speech Interaction That Generated The Detected Speech Data, Wherein At Least A Portion Of The Adaptation Data Has Been Stored On A Particular Device Associated With The Particular Party 916 Receiving, From The Particular Device, Adaptation Data That Is At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 918 Receiving, From A Memory Of The Particular Device, Adaptation Data That Is At Least Partly Based On At Least One Speech Interaction Of The Particular Party That Occurred Prior To A Speech Interaction That Generated The Detected Speech Data, Wherein The Adaptation Data Has Been Stored On A Particular Device Associated With The Particular Party

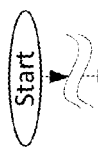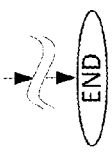

FIG. 9D

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

914 Acquiring Adaptation Data That Is At Least Partly Based On At Least One Speech Interaction Of The Particular That Occurred Prior To A Speech Interaction That Generated The Detected Speech Data, Wherein At Least A Portion Of The Adaptation Data Has Been Stored On A Particular Device Associated With The Particular Party

920 Receiving, From A Communication Network Provider, Adaptation Data That Is At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party

924 Acquiring Adaptation Data, From A Device Connected To A Same Network As A Target Device To Which The Detected Speech Data Is Directed, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party

922 Receiving, From A Communication Network Provider, Adaptation Data That Is Data That Is At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party And Previously Transmitted To The Communication Network Provider

926 Retrieving Adaptation Data In Response To Reception Of The Speech Data, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party

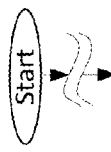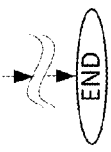

FIG. 9E

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 928 Acquiring Adaptation Data In Response To A Detection Of A Particular Condition, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 930 Acquiring Adaptation Data In Response To The Particular Party Interacting With A Target Device To Which The Speech Data Is Directed, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 932 Acquiring Adaptation Data In Response To The Particular Party Inserting A Key Into A Motor Vehicle To Which The Speech Data Is Directed, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 934 Acquiring Adaptation Data In Response To The Particular Party Executing A Program On A Computing Device To Which The Speech Data Is Directed, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party

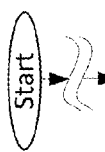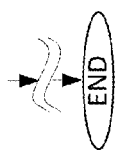

FIG. 9F

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 928 Acquiring Adaptation Data In Response To A Detection Of A Particular Condition, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 936 Acquiring Adaptation Data In Response To A Detection Of The Particular Party At A Particular Location, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party 938 Acquiring Adaptation Data In Response To A Detection Of The Particular Party Within A Particular Proximity Of A Target Device, Said Adaptation Data At Least Partly Based On At Least One Speech Interaction Of The Particular Party That Occurred Prior To A Speech Interaction That Generated The Detected Speech Data, Wherein At Least A Portion Of The Adaptation Data Has Been Stored On A Particular Device Associated With The Particular Party

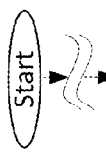
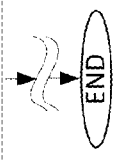

FIG. 9G

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 940 Acquiring Adaptation Data, From A Further Device, Said Adaptation Data At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 942 Acquiring Adaptation Data From A Further Device, Said Adaptation Data Originating At The Further Device And At Least Partly Based On At Least One Speech Interaction Of The Particular Party That Is Discrete From The Detected Speech Data, Wherein At Least A Portion Of The Adaptation Data Has Been Stored On A Particular Device Associated With The Particular Party 944 Acquiring Adaptation Data From A Further Device, Said Adaptation Data Originating At The Further Device And At Least Partly Based On At Least One Speech Interaction Of The Particular Party That Is Discrete From The Detected Speech Data, Wherein At Least A Portion Of The Adaptation Data Has Been Stored On A Particular Device Associated With The Particular Party 946 Acquiring Adaptation Data From A Further Device Associated With The Particular Party, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party 948 Acquiring Adaptation Data From A Further Device In Communication With The Particular Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party

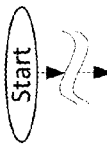
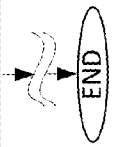

FIG. 9H

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 940 Acquiring Adaptation Data, From A Further Device, Said Adaptation Data At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 944 Acquiring Adaptation Data From A Further Device Related To The Particular Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party 950 Acquiring Adaptation Data From A Further Device That Is At Least Partially Controlled By The Particular Device, Said Adaptation Data Originating At The Further Device And At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party 952 Acquiring Adaptation Data From A Further Device, Said Adaptation Data Received By The Further Device From The Particular Device, And Said Adaptation Data At Least Partly Based On Least One Speech Interaction Of The Particular Party That Is Discrete From The Detected Speech Data, Wherein At Least A Portion Of The Adaptation Data Has Been Stored On A Particular Device Associated With The Particular Party

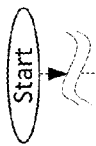

FIG. 9I

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

940 Acquiring Adaptation Data, From A Further Device, Said Adaptation Data At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

954 Acquiring Adaptation Data, From A Further Device, Said Adaptation Data Comprising Instructions For Modifying A Pronunciation Dictionary, And Said Adaptation Data At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

956 Acquiring Adaptation Data, From A Further Device, Said Adaptation Data Comprising A First Instruction For Modifying The Pronunciation Dictionary Based On A First Speech Interaction Of The Particular Party And A Second Instruction For Modifying The Pronunciation Dictionary Based On A Second Speech Interaction Of The Particular Party, And Said Adaptation Data Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

958 Acquiring Adaptation Data, From A Further Device, Said Adaptation Data Comprising A First Instruction For Modifying The Pronunciation Dictionary Based On A First Speech Interaction Of The Particular Party And A Second Instruction For Modifying The Pronunciation Dictionary Based On A Second Speech Interaction Of The Particular Party, And Said Adaptation Data Is At Least Partly Based On At Least One Speech Interaction Of A Particular Party That Is Discrete From The Detected Speech Data, Wherein The First Instruction For Modifying The Pronunciation Data Has Been Stored On A Particular Device Associated With The Particular Party

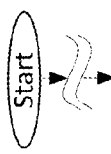
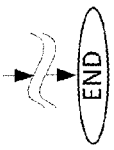

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

960 Generating Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

962 Retrieving Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

964 Acquiring Adaptation Data That Is At Least Partly Based On At Least One Speech Interaction Of The Particular Party With A Particular Type Of Device, Said At Least One Speech Interaction Discrete From The Detected Speech Data, Wherein At Least A Portion Of The Adaptation Data Has Been Stored On A Particular Device Associated With The Particular Party

966 Acquiring Adaptation Data That Is At Least Partly Based On At Least One Speech Interaction Of The Particular Party With The Particular Type Of Device That Is A Same Type Of Device As A Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party

968 Acquiring Adaptation Data That Is At Least Partly Based On At Least One Speech Interaction Of The Particular Party With A Device That Has At Least One Characteristic In Common With A Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party

FIG. 9J

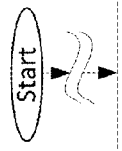

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 964 Acquiring Adaptation Data That Is At Least Partly Based On At Least One Speech Interaction Of The Particular Party With A Particular Type Of Device, Said At Least One Speech Interaction Discrete From The Detected Speech Data, Wherein At Least A Portion Of The Adaptation Data Has Been Stored On A Particular Device Associated With The Particular Party 968 Acquiring Adaptation Data That Is At Least Partly Based On At Least One Speech Interaction Of The Particular Party With A Device That Has At Least One Characteristic In Common With A Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party 970 Acquiring Adaptation Data That Is At Least Partly Based On At Least One Speech Interaction Of The Particular Party With A Device That Communicates On A Same Type Of Communication Network As The Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party 972 Acquiring Adaptation Data That Is At Least Partly Based On At Least One Speech Interaction Of The Particular Party With A Device That Is Configured To Carry Out A Similar Function As The Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party

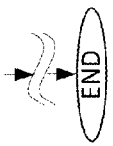

FIG. 9K

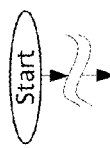 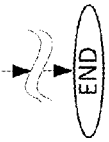

FIG. 9L

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 964 Acquiring Adaptation Data That Is At Least Partly Based On At Least One Speech Interaction Of The Particular Party With A Particular Type Of Device, Said At Least One Speech Interaction Discrete From The Detected Speech Data, Wherein At Least A Portion Of The Adaptation Data Has Been Stored On A Particular Device Associated With The Particular Party 968 Acquiring Adaptation Data That Is At Least Partly Based On At Least One Speech Interaction Of The Particular Party With A Device That Has At Least One Characteristic In Common With A Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party 974 Acquiring Adaptation Data That Is At Least Partly Based On At Least One Speech Interaction Of The Particular Party With A Type Of Device That Accepts A Same Type Of Input As The Target Device That Is Configured To Receive The Speech Data, Said At Least One Speech Interaction Is Discrete From The Detected Speech Data, Wherein At Least A Portion Of The Adaptation Data Has Been Stored On A Particular Device Associated With The Particular Party

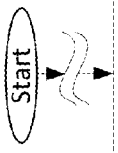
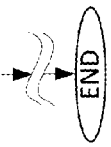

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party 976 Acquiring Adaptation Data That Is At Least Partly Based On At Least One Speech Interaction Of The Particular Party With The Particular Device, Said At Least One Speech Interaction Is Discrete From The Detected Speech Data, Wherein At Least A Portion Of The Adaptation Data Has Been Stored On The Particular Device Associated With The Particular Party 978 Acquiring Adaptation Data That Is At Least Partly Based On At Least One Speech Interaction Of The Particular Party With A Cellular Telephone Device, Said At Least One Speech Interaction Is Discrete From The Detected Speech Data, Wherein At Least A Portion Of The Adaptation Data Has Been Stored On The Cellular Telephone Device Associated With The Particular Party 980 Acquiring Adaptation Data That Is At Least Partly Based On At Least One Telephone Conversation Carried Out Using The Cellular Telephone Device, Said At Least One Telephone Conversation Is Different Than Speech That Is Part Of The Detected Speech Data, Wherein At Least A Portion Of The Adaptation Data Has Been Stored On The Cellular Telephone Device Associated With The Particular Party 982 Acquiring Adaptation Data That Is At Least Partly Based On At Least One Speech Instruction Given To The Cellular Telephone Device By The Particular Party, Said At Least One Speech Instruction Different From The Detected Speech Data, Wherein At Least A Portion Of The Adaptation Data Has Been Stored On The Particular Device Associated With The Particular Party

FIG. 9M

704 Acquiring Adaptation Data That Is At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party

| 984 Acquiring Adaptation Data That Is At Least Partly Based On At Least One Speech Interaction Of The Particular Party That Used One Or More Same Utterances S As Speech Used In The Detected Speech Data, Said One Or More Same Utterances Spoken To A Different Device Than A Target Device To Which The Detected Speech Data Is Directed | 986 Acquiring Adaptation Data That Is At Least Partly Based On At Least One Speech Interaction Of The Particular Party That Used One Or More Same Utterances, Said One Or More Same Utterances Spoken At A Different Time, As Speech Used In The Detected Speech Data | 988 Acquiring A Phoneme Database Based On One Or More Pronunciations By The Particular Party That Are Discrete From The Detected Speech Data, Wherein At Least One Entry Of The Phoneme Database Has Been Stored On A Particular Device Associated With The Particular Party | 990 Acquiring A Sentence Diagramming Path Selection Algorithm Based On At Least One Speech Interaction Of A Particular Party That Is Discrete From The Detected Speech Data, Wherein At Least A Portion Of The Adaptation Data Has Been Stored On A Particular Device Associated With The Particular Party | 992 Acquiring Adaptation Data That Is At Least Partly Based On At Least One Speech Interaction Of A Particular Party That Is Discrete From The Detected Speech Data, Wherein At Least A Portion Of The Adaptation Data Was Collected By The Particular Device Associated With The Particular Party | 994 Acquiring One Or More Instructions For Modifying One Or More Portions Of A Speech Recognition Component Of A Target Device, Said Instructions At Least Partly Based On At Least One Speech Interaction Of A Particular Party That Is Discrete From The Detected Speech Data, Wherein At Least A Portion Of The Adaptation Data Has Been Stored On A Particular Device Associated With The Particular Party |

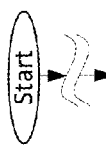
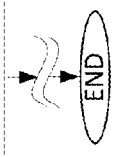

FIG. 9N

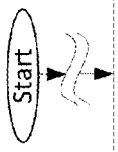
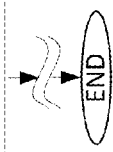

FIG. 10B

706 Obtaining Target Data Regarding An Intended Target Configured To Process At Least A Portion Of The Received Speech Data

1010 Receiving An Indication From The Speech Processing Component That The Adaptation Data Has Been Applied To The Target Device To Assist In Processing At Least A Portion Of The Received Speech

1012 Receiving An Indication From The Speech Processing Component That The Adaptation Data Is Configured To Be Applied To An Automated Teller Machine Device To Assist In Processing At Least A Portion Of The Received Speech Data

1014 Receiving The Indication From The Speech Processing Component Of The Automated Teller Machine Device That The Adaptation Data Is Configured To Be Applied To The Automated Teller Machine Device To Assist In Processing At Least A Portion Of Data Corresponding To A Spoken Request By The Particular Party To Withdraw Two Hundred Dollars From A Bank Account

1016 Receiving The Indication From The Speech Processing Component Of The Automated Teller Machine Device That The Automated Teller Machine Device Is Configured To Apply A List Of The Way That The Particular Party Pronounces Numbers Zero Through Nine To Assist In Processing At Least A Portion Of Data Corresponding To A Spoken Request By The Particular Party To Withdraw Two Hundred Dollars From The Bank Account

1018 Generating Target Data Regarding A Target Device Configured To Process At Least A Portion Of The Received Speech Data

708 Determining Whether To Apply The Adaptation Data For Processing At Least A Portion Of The Received Speech Data, At Least Partly Based On The Acquired Target Data

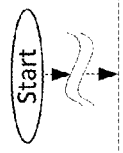

| 1114 Determining Against Application Of The Adaptation Data For Processing At Least A Portion Of The Received Speech Data When The Acquired Target Data Indicates That There Are One Or More Other Devices Present That Are Configured To Apply The Adaptation Data For Processing At Least A Portion Of The Received Speech Data | 1116 Determining Against Application Of The Adaptation Data For Processing At Least A Portion Of The Received Speech Data When The Acquired Target Data Indicates That There Are One Or More Other Devices Present That Are Configured To More Efficiently Apply The Adaptation Data For Processing At Least A Portion To The Received Speech Data |

| 1118 Determining Whether To Apply The Adaptation Data For Processing At Least A Portion Of The Received Speech Data When The Acquired Target Data Indicates A Presence Of One Or More Applications Configured To Process The Received Speech Data | 1120 Determining Whether To Apply The Adaptation Data For Processing At Least A Portion Of The Received Speech Data Based On One Or More Characteristics Of One Or More Applications Of The Target Device, Wherein The Acquired Target Data Includes Data Regarding A Presence Of The One Or More Applications |

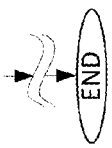

FIG. 11B

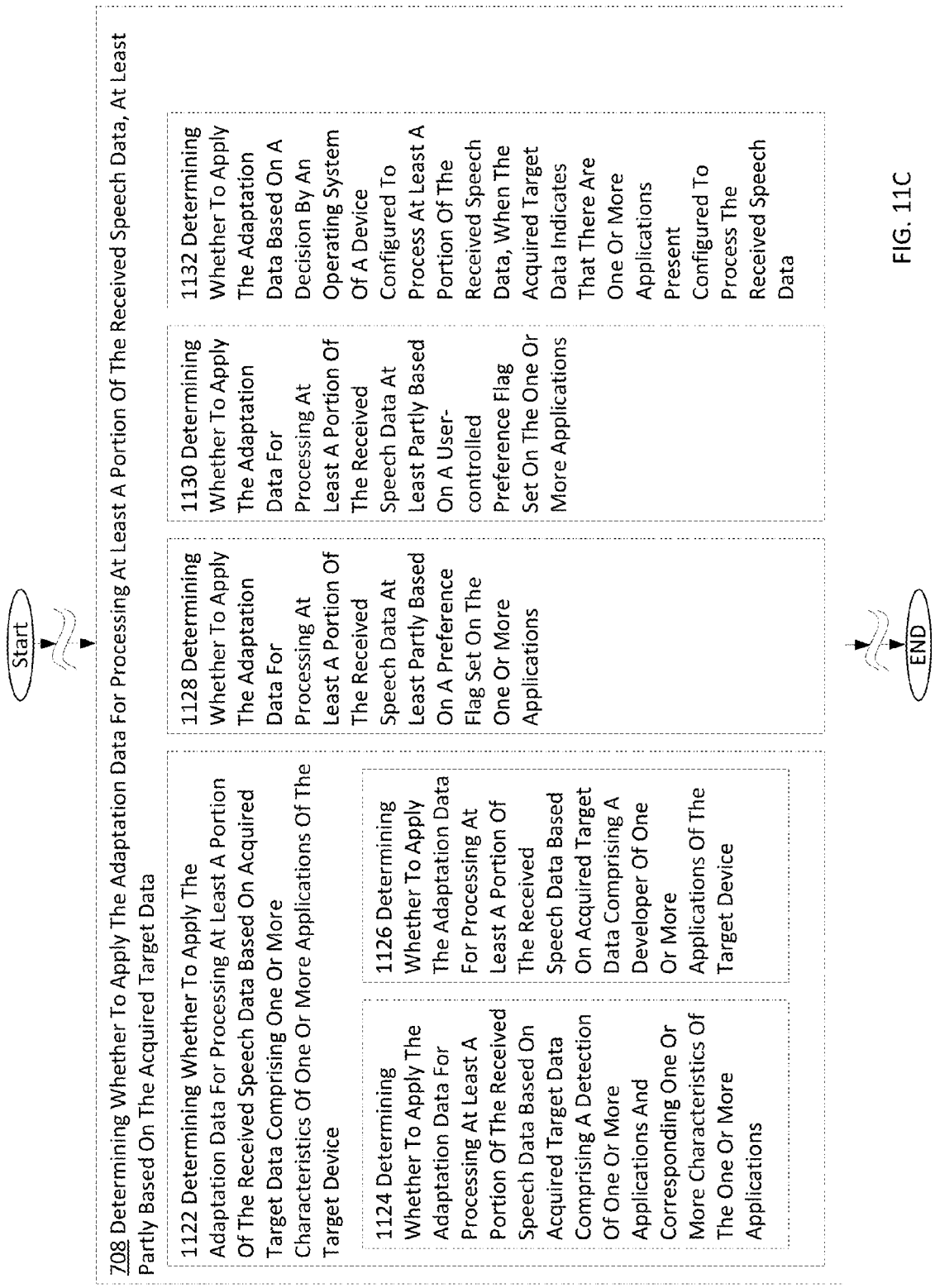

METHODS AND SYSTEMS FOR SPEECH ADAPTATION DATA

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications, including any priority claims, is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 13/485,733, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/485,738, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 31 May 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,855, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/538,866, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 29 Jun. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,647, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 August 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,649, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,650, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/564,651, entitled SPEECH RECOGNITION ADAPTATION SYSTEMS BASED ON ADAPTATION DATA, naming Royce A. Levien, Richard T. Lord, Robert W. Lord, Mark A. Malamud, and John D. Rinaldo, Jr. as inventors, filed 1 Aug. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/609,139, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012, which is currently co-pending or is an application of which a currently co-pending application is entitled to the benefit of the filing date.

For purposes of the USPTO extra-statutory requirements, the present application constitutes a continuation-in-part of U.S. patent application Ser. No. 13/609,142, entitled METHODS AND SYSTEMS FOR SPEECH ADAPTATION DATA, naming Royce A. Levien, Richard T. Lord, Robert W. Lord, and Mark A. Malamud as inventors, filed 10 Sep. 2012, which is currently co-pending or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above, but expressly points out that such designation(s) are not to be construed in any way as any type of commentary and/or admission as to whether or not the present application contains any new matter in addition to the matter of its parent application(s).

BACKGROUND

This application is related to adaptation data related to speech processing.

SUMMARY

In one or more various aspects, a method includes but is not limited to receiving speech data correlated to one or more words spoken by a particular party, receiving adaptation data that is at least partly based on at least one speech interaction of a particular party that is discrete from the received speech data, wherein at least a portion of the adaptation data has been stored on a particular device associated with the particular party, obtaining target data regarding a target configured to process at least a portion of the received speech data, determining whether to apply the adaptation data for processing at least a portion of the received speech data, at least partly based on the acquired target data, and means for transmitting adaptation result data that is based on at least one aspect of the received speech data. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for effecting the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for receiving speech data correlated to one or more words spoken by a particular party, means for receiving adaptation data that is at least partly based on at least one speech interaction of a particular party that is discrete from the received speech data, wherein at least a portion of the adaptation data has been stored on a particular device associated with the particular party, means for obtaining target data regarding a target configured to process at least a portion of the received speech data, means for determining whether to apply the adaptation data for processing at least a portion of the received speech data, at least partly based on the acquired target data, and means for transmitting adaptation result data that is based on at least one aspect of the received speech data. In addition to the foregoing, other system aspects are described in the claims, drawings, and text forming a part of the disclosure set forth herein.

In one or more various aspects, a system includes, but is not limited to, circuitry for receiving speech data correlated to one or more words spoken by a particular party, circuitry for receiving adaptation data that is at least partly based on at least one speech interaction of a particular party that is discrete from the received speech data, wherein at least a portion of the adaptation data has been stored on a particular device associated with the particular party, circuitry for obtaining target data regarding a target configured to process at least a portion of the received speech data, circuitry for determining whether to apply the adaptation data for processing at least a portion of the received speech data, at least partly based on the acquired target data, and circuitry for transmitting adaptation result data that is based on at least one aspect of the received speech data. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for receiving speech data correlated to one or more words spoken by a particular party, one or more instructions for receiving adaptation data that is at least partly based on at least one speech interaction of a particular party that is discrete from the received speech data, wherein at least a portion of the adaptation data has been stored on a particular device associated with the particular party, one or more instructions for obtaining target data regarding a target configured to process at least a portion of the received speech data, one or more instructions for determining whether to apply the adaptation data for processing at least a portion of the received speech data, at least partly based on the acquired target data, and one or more instructions for transmitting adaptation result data that is based on at least one aspect of the received speech data. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for receiving speech data correlated to one or more words spoken by a particular party, one or more interchained physical machines ordered for receiving adaptation data that is at least partly based on at least one speech interaction of a particular party that is discrete from the received speech data, wherein at least a portion of the adaptation data has been stored on a particular device associated with the particular party, one or more interchained physical machines ordered for obtaining target data regarding a target configured to process at least a portion of the received speech data, one or more interchained physical machines ordered for determining whether to apply the adaptation data for processing at least a portion of the received speech data, at least partly based on the acquired target data, and one or more interchained physical machines ordered for transmitting adaptation result data that is based on at least one aspect of the received speech data.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1A shows a high-level block diagram of an exemplary environment 100, according to an embodiment.

FIG. 2, including FIGS. 2A-2D, shows a particular perspective of the speech data correlated to one or more particular party spoken words receiving module 152 of the device 130 of environment 100 of FIG. 1B.

FIG. 3, including FIGS. 3A-3K, shows adaptation data at least partly based on discrete speech interaction of particular party separate from detected speech data, and has been stored on a particular party-associated particular device receiving module 154 of the device 130 of environment 100 of FIG. 1B.

FIG. 4, including FIGS. 4A-4F, shows target data regarding a target configured to process at least a portion of the received speech data obtaining module 156 of the device 130 of environment 100 of FIG. 1B.

FIG. 5, including FIGS. 5A-5C, shows application of adaptation data for processing at least a portion of the received speech data determining module 158 of the device 130 of environment 100 of FIG. 1B.

FIG. 6, including FIGS. 6A-6B, shows adaptation result data based on at least one aspect of the received speech data transmitting module 160 of the device 130 of environment 100 of FIG. 1B.

FIG. 8D is a high-level logic flowchart of a process depicting alternate implementations of a receiving speech data operation 702 of FIG. 7, according to one or more embodiments.

FIG. 9A is a high-level logic flowchart of a process depicting alternate implementations of a receiving adaptation data operation 704 of FIG. 7, according to one or more embodiments.

FIG. 9C is a high-level logic flowchart of a process depicting alternate implementations of a receiving adaptation data operation 704 of FIG. 7, according to one or more embodiments.

FIG. 9D is a high-level logic flowchart of a process depicting alternate implementations of a receiving adaptation data operation 704 of FIG. 7, according to one or more embodiments.

FIG. 9E is a high-level logic flowchart of a process depicting alternate implementations of a receiving adaptation data operation 704 of FIG. 7, according to one or more embodiments.

FIG. 9F is a high-level logic flowchart of a process depicting alternate implementations of a receiving adaptation data operation 704 of FIG. 7, according to one or more embodiments.

FIG. 9G is a high-level logic flowchart of a process depicting alternate implementations of a receiving adaptation data operation 704 of FIG. 7, according to one or more embodiments.

FIG. 9H is a high-level logic flowchart of a process depicting alternate implementations of a receiving adaptation data operation 704 of FIG. 7, according to one or more embodiments.

FIG. 9I is a high-level logic flowchart of a process depicting alternate implementations of a receiving adaptation data operation 704 of FIG. 7, according to one or more embodiments.

FIG. 9J is a high-level logic flowchart of a process depicting alternate implementations of a receiving adaptation data operation 704 of FIG. 7, according to one or more embodiments.

FIG. 9K is a high-level logic flowchart of a process depicting alternate implementations of a receiving adaptation data operation 704 of FIG. 7, according to one or more embodiments.

FIG. 9L is a high-level logic flowchart of a process depicting alternate implementations of a receiving adaptation data operation 704 of FIG. 7, according to one or more embodiments.

FIG. 9M is a high-level logic flowchart of a process depicting alternate implementations of a receiving adaptation data operation 704 of FIG. 7, according to one or more embodiments.

FIG. 9N is a high-level logic flowchart of a process depicting alternate implementations of a receiving adaptation data operation 704 of FIG. 7, according to one or more embodiments.

FIG. 10B is a high-level logic flowchart of a process depicting alternate implementations of an obtaining target data operation 706 of FIG. 7, according to one or more embodiments.

FIG. 11A is a high-level logic flowchart of a process depicting alternate implementations of a determining whether to apply the adaptation data operation 708 of FIG. 7, according to one or more embodiments.

FIG. 11B is a high-level logic flowchart of a process depicting alternate implementations of a determining whether to apply the adaptation data operation 708 of FIG. 7, according to one or more embodiments.

FIG. 11C is a high-level logic flowchart of a process depicting alternate implementations of a determining whether to apply the adaptation data operation 708 of FIG. 7, according to one or more embodiments.

DETAILED DESCRIPTION

Figure 1B:
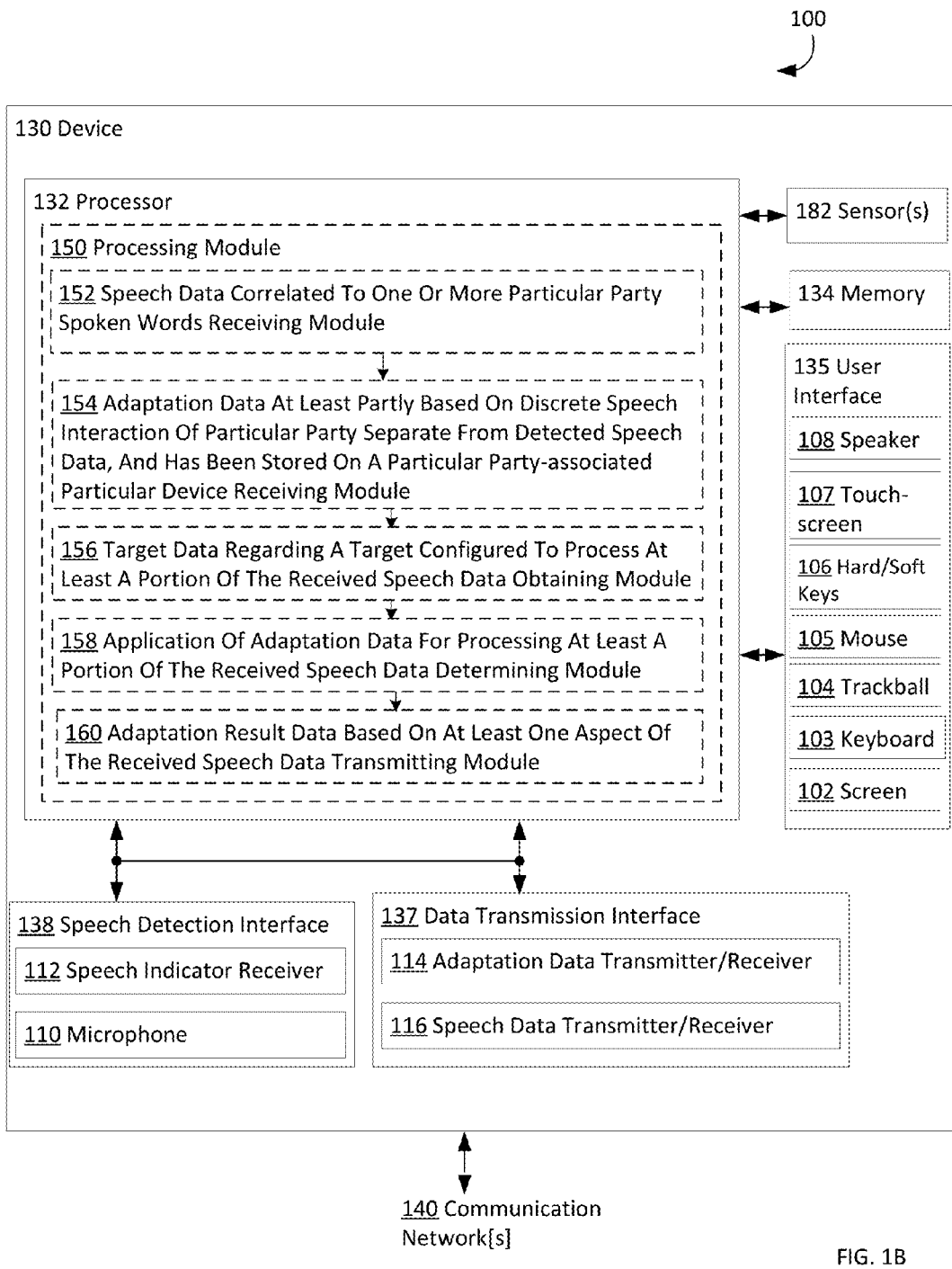
FIG. 1B shows a high-level block diagram of a device 130 operating in an exemplary embodiment 100, according to an embodiment.

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

In accordance with various embodiments, computationally implemented methods, systems, circuitry, articles of manufacture, and computer program products are designed to, among other things, provide an interface for receiving speech data correlated to one or more words spoken by a particular party, receiving adaptation data that is at least partly based on at least one speech interaction of a particular party that is discrete from the received speech data, wherein at least a portion of the adaptation data has been stored on a particular device associated with the particular party, obtaining target data regarding a target configured to process at least a portion of the received speech data, determining whether to apply the adaptation data for processing at least a portion of the received speech data, at least partly based on the acquired target data, and transmitting adaptation result data that is based on at least one aspect of the received speech data.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although user 105 is shown/described herein as a single illustrated figure, those skilled in the art will appreciate that user 105 may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. See, e.g., Wikipedia, High-level programming language, http://en.wikipedia.org/wiki/High-levelprogramming_language (as of Jun. 5, 2012, 21:00 GMT). In order to facilitate human comprehension, in many instances, high-level programming languages resemble or even share symbols with natural languages. See, e.g., Wikipedia, Natural language, http://en.wikipedia.org/wiki/Natural_language (as of Jun. 5, 2012, 21:00 GMT).

It has been argued that because high-level programming languages use strong abstraction (e.g., that they may resemble or share symbols with natural languages), they are therefore a "purely mental construct." (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors). See, e.g., Wikipedia, Logic gates, http://en.wikipedia.org/wiki/Logic_gates (as of Jun. 5, 2012, 21:03 GMT).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output. See, e.g., Wikipedia, Computer architecture, http://en.wikipedia.org/wiki/Computer_architecture (as of Jun. 5, 2012, 21:03 GMT).

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). See, e.g., Wikipedia, Instructions per second, http://en.wikipedia.org/wiki/Instructions_per_second (as of Jun. 5, 2012, 21:04 GMT). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry).

Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

The proliferation of automation in many transactions is apparent. For example, Automated Teller Machines ("ATMs") dispense money and receive deposits. Airline ticket counter machines check passengers in, dispense tickets, and allow passengers to change or upgrade flights. Train and subway ticket counter machines allow passengers to purchase a ticket to a particular destination without invoking a human interaction at all. Many groceries and pharmacies have self-service checkout machines which allow a consumer to pay for goods purchased by interacting only with a machine. Large companies now staff telephone answering systems with machines that interact with customers, and invoke a human in the transaction only if there is a problem with the machine-facilitated transaction.

Nevertheless, as such automation increases, convenience and accessibility may decrease. Self-checkout machines at grocery stores may be difficult to operate. ATMs and ticket counter machines may be mostly inaccessible to disabled persons or persons requiring special access. Where before, the interaction with a human would allow disabled persons to complete transactions with relative ease, if a disabled person is unable to push the buttons on an ATM, there is little the machine can do to facilitate the transaction to completion. While some of these public terminals allow speech operations, they are configured to the most generic forms of speech, which may be less useful in recognizing particular speakers, thereby leading to frustration for users attempting to speak to the machine. This problem may be especially challenging for the disabled, who already may face significant challenges in completing transactions with automated machines.

In addition, smartphones and tablet devices also now are configured to receive speech commands. Speech and voice controlled automobile systems now appear regularly in motor vehicles, even in economical, mass-produced vehicles. Home entertainment devices, e.g., disc players, televisions, radios, stereos, and the like, may respond to speech commands. Additionally, home security systems may respond to speech commands. In an office setting, a worker's computer may respond to speech from that worker, allowing faster, more efficient work flows. Such systems and machines may be trained to operate with particular users, either through explicit training or through repeated interactions. Nevertheless, when that system is upgraded or replaced, e.g., a new television is purchased, that training may be lost with the device. Thus, in some embodiments described herein, adaptation data for speech recognition systems may be separated from the device which recognizes the speech, and may be more closely associated with a user, e.g., through a device carried by the user, or through a network location associated with the user.

Further, in some environments, there may be more than one device that transmits and receives data within a range of interacting with a user. For example, merely sitting on a couch watching television may involve five or more devices, e.g., a television, a cable box, an audio/visual receiver, a remote control, and a smartphone device. Some of these devices may transmit or receive speech data. Some of these devices may transmit, receive, or store adaptation data, as will be described in more detail herein. Thus, in some embodiments, which will be described in more detail herein, there may be methods, systems, and devices for determining which devices in a system should perform actions that allow a user to efficiently interact with an intended device through that user's speech.

Referring now to FIG. 1, e.g., FIG. 1A, FIG. 1A illustrates an example environment 100 in which the methods, systems, circuitry, articles of manufacture, and computer program products and architecture, in accordance with various embodiments, may be implemented by one or more of personal device 20A, personal device 20B, intermediate device 40, target device 30A, and target device 30B. In some embodiments, e.g., as shown in FIG. 1B, device 39, which in some embodiments, may be an example of one of target device 30A, target device 30B, and intermediate device 40. The device 130, in various embodiments, may be endowed with logic that is designed for receiving speech data correlated to one or more words spoken by a particular party, logic that is designed for receiving adaptation data that is at least partly based on at least one speech interaction of a particular party that is discrete from the received speech data, wherein at least a portion of the adaptation data has been stored on a particular device associated with the particular party, logic that is designed for obtaining target data regarding a target configured to process at least a portion of the received speech data, determining whether to apply the adaptation data for processing at least a portion of the received speech data, at least partly based on the acquired target data, and transmitting adaptation result data that is based on at least one aspect of the received speech data.

Referring again to the exemplary embodiment in FIG. 1A, a user 105 may engage in a speech facilitated transaction with one or more of a terminal device 30A and a terminal device 30B. In some embodiments, the speech-facilitated transaction may be directed to one of terminal device 30A or terminal device 30B. In some embodiments, the user may not specifically direct her speech toward terminal device 30A or terminal device 30B, but rather to both of them, with indifference toward which device carries out the speech-facilitated transaction. In some embodiments, one of the terminal device 30A and terminal device 30B negotiate between themselves to determine which device will carry out the speech-facilitated transaction. In some embodiments, one or more of the personal device 20A, the personal device 20B, and the intermediate device 40 may determine which of the terminal device 30A and terminal device 30B carries out the speech-facilitated transaction. In some embodiments, one or more of personal device 20A, personal device 20B, and intermediate device 40 may detect one or more of terminal device 30A and terminal device 30B, establish a connection, or negotiate with one or more of terminal devices 30A and 30B. In some embodiments, one or more of terminal device 30A, terminal device 30B, and intermediate device 40 may detect one or more of personal device 20A and personal device 20B, establish a connection, or negotiate with one or more of the detected devices.

The dashed-line arrows shown in environment 100 of FIG. 1A are not labeled, but are intended to show the flow of data from one device to the other. Some data connections are omitted for simplicity of drawing, e.g., although there is no arrow, personal device 20A may communicate directly with terminal device 30A and terminal device 30B. The flow of data may include one or more adaptation data, speech data in any format, including raw speech from the user, adaptation result data, intended target data, target data, and the like. The dotted line arrows show an association between the user 105 and one or more of personal device 20A, personal device 20B, and intermediate device 40.

Although it is not shown in FIG. 1A, any or all of personal devices 20A, 20B, and 40 may communicate with any or all of terminal device 30A and terminal device 30B, either directly, or indirectly. In some embodiments, these devices communicate with each other via a server 110, which may be local or remote to any of the devices 20A, 20B, 30A, 30B, and 40. In some embodiments, these devices communicate with each other via one or more communication networks 140, which may be local or remote to any of the devices 20A, 20B, 30A, 30B, and 40. Although server 110 and communication network 40 are pictured in each of the embodiments in FIGS. 1A and 1C-1E, server 110 and communication network 140 are not required, and are shown merely for purposes of illustration.

Referring again to FIG. 1A, FIG. 1A shows personal device 20A, personal device 20B, intermediate device 40, terminal device 30A, terminal device 30B, and server 110. The number of devices is shown merely for illustrative purposes. In some embodiments, however, there may be a different number of personal devices, intermediate devices, terminal devices, servers, and communication networks. In some embodiments, one or more of the personal devices, intermediate devices, terminal devices, servers, and communication networks may be omitted entirely.

Referring again to FIG. 1A, personal device 20A and 20B are shown as associated with user 105. This association may be attenuated, e.g., they may merely be in the same physical proximity. In other embodiments, the association may be one of ownership, mutual contract, information storing, previous usage, or other factors. The examples described further herein will provide a non-exhaustive list of examples of relationships between user 105 and a personal device, e.g., personal device 20A or personal device 20B (hereinafter collectively referred to as "personal device 20*"). In some embodiments, personal device 20* may be any size and have any specification. Personal device 20* may be a custom device of any shape or size, configured to transmit, receive, and store data. Personal device 20* may include, but is not limited to, a smartphone device, a tablet device, a personal computer device, a laptop device, a keychain device, a key, a personal digital assistant device, a modified memory stick, a universal remote control, or any other piece of electronics. In addition, personal device 20 may be a modified object that is worn, e.g., eyeglasses, a wallet, a credit card, a watch, a chain, or an article of clothing. Anything that is configured to store, transmit, and receive data may be a personal device 20*, and personal device 20* is not limited in size to devices that are capable of being carried by a user. Additionally, personal device 20* may not be in direct proximity to the user, e.g., personal device 20 may be a computer sitting on a desk in a user's home or office.

Although terminal devices 30A and 30B are described as "terminal device," this is merely for simplicity of illustration. Device 130, e.g., of which terminal devices 30A and 30B may be examples, may be any device that is configured to receive speech. For example, terminal device 130 may be a terminal, a computer, a navigation system, a phone, a piece of home electronics (e.g., a DVD player, Blu-Ray player, media player, game system, television, receiver, alarm clock, and the like). Device 130 may, in some embodiments, be a home security system, a safe lock, a door lock, a kitchen appliance configured to receive speech, and the like. In some embodiments, device 130 may be a motorized vehicle, e.g., a car, boat, airplane, motorcycle, golf cart, wheelchair, and the like. In some embodiments, device 130 may be a piece of portable electronics, e.g., a laptop computer, a netbook computer, a tablet device, a smartphone, a cellular phone, a radio, a portable navigation system, or any other piece of electronics capable of receiving speech. Device 130 may be a part of an enterprise solution, e.g., a common workstation in an office, a copier, a scanner, a personal workstation in a cubicle, an office directory, an interactive screen, and a telephone. These examples and lists are not meant to be exhaustive, but merely to illustrate a few examples of the terminal device. Some of these examples are shown in more detail with respect to FIGS. 1C, 1D, and 1E.

In some embodiments, a terminal device, e.g., device 130 receives adaptation data from a personal device, in a process that will be described in more detail herein. In some embodiments, the adaptation data is transmitted over one or more communication network(s) 140. In various embodiments, the communication network 140 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 140 may be wired, wireless, or a combination of wired and wireless networks. It is noted that "communication network" here refers to one or more communication networks, which may or may not interact with each other.

In some embodiments, the adaptation data does not come directly from the personal device, e.g., personal device 20A. In some embodiments, the personal device merely facilitates communication of the adaptation data, e.g., by providing one or more of an address, credentials, instructions, authorization, and recommendations. For example, in some embodiments, the personal device provides a location at server 10 at which adaptation data may be received. In some embodiments, the personal device retrieves adaptation data from server 10 upon a request from the device 130, and then relays or facilitates in the relaying of the adaptation data to the device 130.

In some embodiments, a personal device broadcasts the adaptation data regardless of whether a terminal device is listening, e.g., at predetermined, regular, or otherwise-defined intervals. In other embodiments, a personal device listens for a request from a terminal device, and transmits or broadcasts adaptation data in response to that request. In some embodiments, user 105 determines when a personal device, e.g., personal device 20A, broadcasts adaptation data. In still other embodiments, a third party (not shown) triggers the transmission of adaptation data to the device 130, in which the transmission is facilitated by the personal device.

FIG. 1B shows a more detailed description of a device 130 in an exemplary embodiment 100. Device 130 may be an example of terminal device 30A or 30B of FIG. 1A, intermediate device 40 of FIG. 1A, device 31 of FIG. 1C, operating system application 91 of FIG. 1C, first application 91, second application 92, speech processing application 83, or enterprise client 82 of FIG. 1C, any of devices 51, 52, 53, and 54 of FIG. 1D, motor vehicle control system 41 of FIG. 1E, GPS navigation device 41 of FIG. 1E, and the like. The foregoing is not intended to be exhaustive of the possible devices that correspond to device 130 of FIG. 1B, but are merely exemplary of the types of devices that may have a structure as outlined in FIG. 1B.

Referring again to FIG. 1B, in various embodiments, the device 130 may comprise, among other elements, a processor 132, a memory 134, a user interface 135, a speech detection interface 138, and a data transmission interface 137. Each of these elements may be absent in various embodiments of device 130, e.g., some devices 130 may not have a speech detection interface 138, or a memory 134, or a user interface 135.

Processor 132 may include one or more microprocessors, Central Processing Units ("CPU"), a Graphics Processing Units ("GPU"), Physics Processing Units, Digital Signal Processors, Network Processors, Floating Point Processors, and the like. In some embodiments, processor 132 may be a server. In some embodiments, processor 132 may be a distributed-core processor. Although processor 132 is as a single processor that is part of a single device 130, processor 132 may be multiple processors distributed over one or many computing devices 130, which may or may not be configured to operate together. Processor 132 is illustrated as being configured to execute computer readable instructions in order to execute one or more operations described above, and as illustrated in FIGS. 7, 8A-8D, 9A-9Q, 10A-9G, 11A-11C, and 12A-12B. In some embodiments, processor 132 is designed to be configured to operate as processing module 150, which may include one or more of speech data correlated to one or more particular party spoken words receiving module 152, adaptation data at least partly based on discrete speech interaction of particular party separate from detected speech data, and has been stored on a particular party-associated particular device receiving module 154, target data regarding a target configured to process at least a portion of the received speech data obtaining module 156, application of adaptation data for processing at least a portion of the received speech data determining module 158, and adaptation result data based on at least one aspect of the received speech data transmitting module 160.

Referring again to FIG. 1B, as set forth above, device 130 may include a memory 134. In some embodiments, memory 134 may comprise of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In some embodiments, memory 134 may be located at a single network site. In some embodiments, memory 134 may be located at multiple network sites, including sites that are distant from each other.

Referring again to FIG. 1B, as set forth above, device 130 may include a user interface 135. The user interface may be implemented in hardware or software, or both, and may include various input and output devices to allow an operator of device 130 to interact with the device 130. For example, user interface 135 may include, but is not limited to, an audio display, e.g., a speaker 108, a video display, e.g., a screen 102, a microphone, a camera, a keyboard, e.g., keyboard 103, a trackball, e.g., trackball 104, a mouse, e.g., mouse 105, one or more soft keys, e.g., hard/soft keys 106, a touch input, e.g., touchscreen 107, e.g., which may also be a video display screen, a joystick, a game controller, a touchpad, a handset, or any other device that allows interaction between a device and a user.

Referring again to FIG. 1B, as set forth above, device 130 may include a speech detection interface 138. Speech detection interface 138 may be configured to receive and/or process speech as input, or to observe and/or record speech of a speech-facilitated transaction Although not present in some embodiments, in some embodiments, a speech detection interface 138 may include a speech indicator receiver 112, which may be a sensor of any type, or a communication port that receives a signal, or a sensor that detects a button press, or any other module that can detect a change of state of any kind in the environment 100, whether internal or external to the device. The speech detection interface 138 may, in some embodiments, include a microphone 110, which may or may not communicate with speech indicator receiver 112. In some embodiments, microphone 110 may detect speech, either selectively or always-on, and may be controlled by one or more of speech indicator receiver 112 and processor 132.

Referring again to FIG. 1B, as set forth above, device 130 may include a data transmission interface 137. Data transmission interface 137 may, in some embodiments, handle the transmission and reception of data by the device. For example, in some embodiments, data transmission interface 137 may include an adaptation data transmitter/receiver 114, which handles the reception and transmission of adaptation data over any type of network or internal form of communication, e.g., internal bus, and the like. Data transmission interface 137 may, in some embodiments, include speech data transmitter/receiver 116, which may handle the reception and transmission of speech data, including raw speech, over any form of moving data.

Referring again to FIG. 1B, as set forth above, device 130 may have one or more sensors 182. These sensors include, but are not limited to, a Global Positioning System (GPS) sensor, a still camera, a video camera, an altimeter, an air quality sensor, a barometer, an accelerometer, a charge-coupled device, a radio, a thermometer, a pedometer, a heart monitor, a moisture sensor, a humidity sensor, a microphone, a seismometer, and a magnetic field sensor. Sensors 182 may interface with sensor interface 180. Although FIG. 1B illustrates sensors 182 as part of device 130, in some embodiments, sensors 182 may be separated from device 130, and communicate via one or more communication networks, e.g., communication networks 140.

Figure 1C:
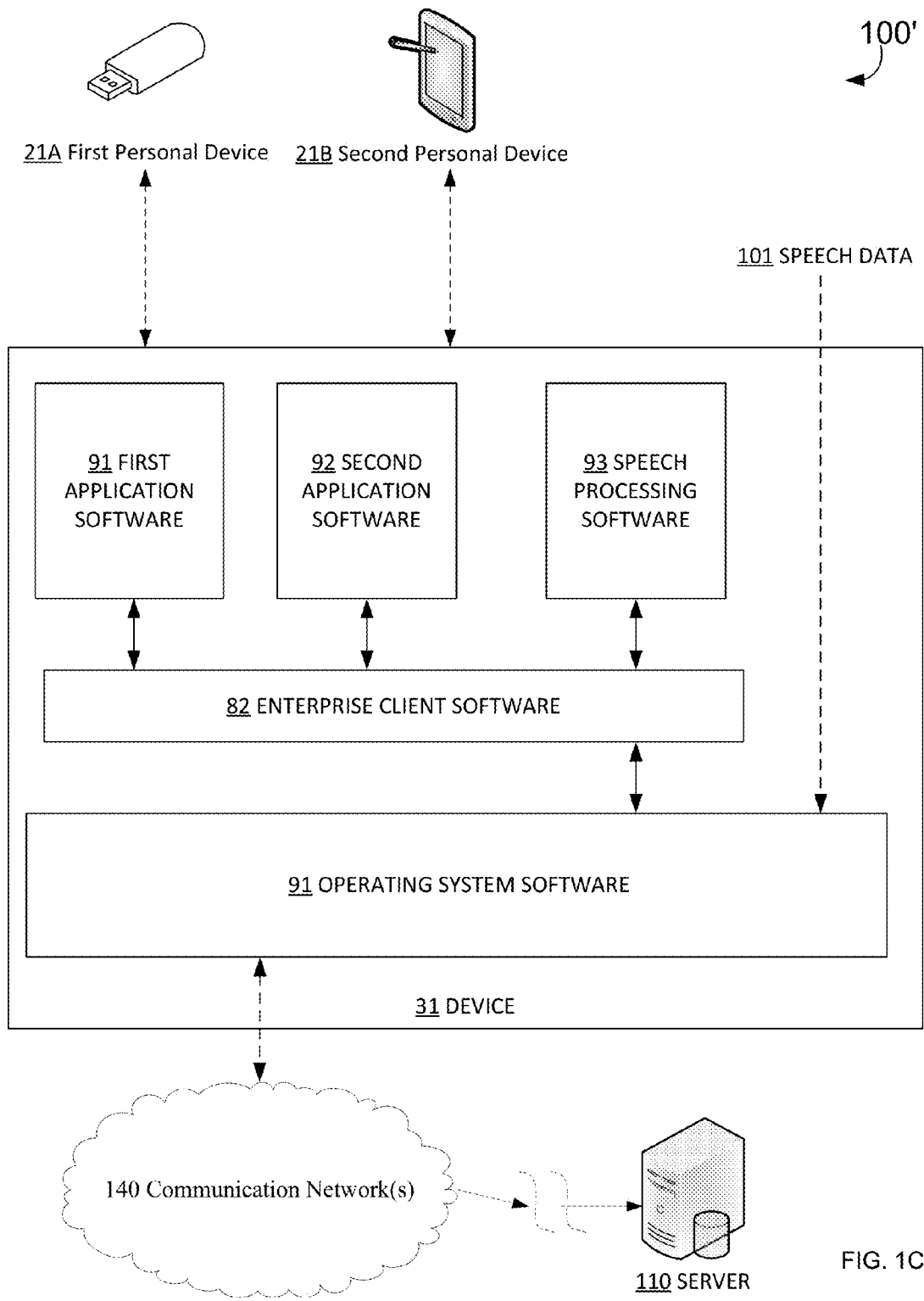
FIG. 1C shows a high-level diagram of an exemplary environment 100', which is an example of an exemplary embodiment 100 having a device 130, according to an embodiment.

Referring now to FIG. 1C, FIG. 1C shows an example embodiment of an exemplary environment 100', which is a non-limiting example of an environment 100. As shown in FIG. 1C, environment 100' may include a user (not shown), which user may have one or more of a first personal device 21A and a second personal device 21B. First personal device 21A may be, for example, a USB drive, and second personal device 21B may be, for example, a cellular telephone device, although both personal device 21A and personal device 21B may be any form of personal device 120 as previously described. One or more of first personal device 21A and second personal device 21B may interact with device 31, which may be any type of computing device, e.g., laptop computer, desktop computer, server, netbook, tablet device, smartphone, and the like. Device 31 may have an operating system 81 loaded thereon. Operating system 81 may include, but is not limited to, Microsoft Windows, Google Android, Apple iOS, Apple Mountain Lion, UNIX, Linux, Chrome OS, Symbian, and the like.

In addition, in some embodiments, device 31 may include an enterprise client 82 onboard. For example, some systems, e.g., in an office environment, may have a client software, e.g., Citrix, or the like, loaded on their systems to integrate the user experience for their workers. In some embodiments, this module may play a role in determining the role of the interpretation of speech data (e.g., speech data 101) and the application of adaptation data. In some embodiments, device 31 also may include one or more of first application 91 and second application 92. First and second application 91 and 92 may be any type of application, e.g., game, spreadsheet, word processor, web browser, chat client, picture viewer, picture manipulator, webcam application, and the like. In some embodiments, these modules may play a role in determining the role of the interpretation of speech data and the application of adaptation data. For example, the complexity of the application may play a role in determining how much of the speech processing occurs at the application level. In some embodiments, device 31 may communicate with one or more communication networks 140 and one or more servers 110.

Figure 1D:
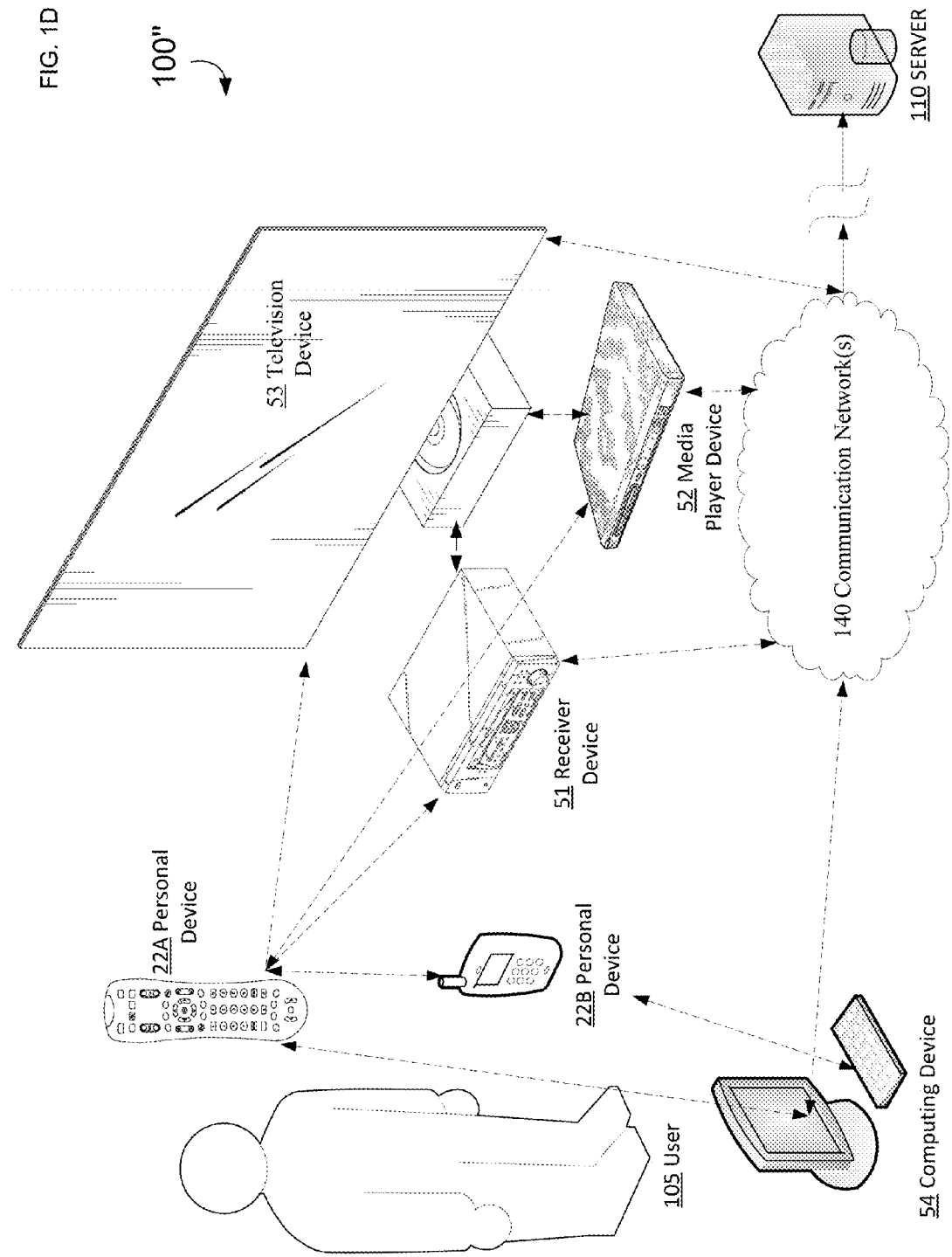
FIG. 1D shows a high-level diagram of an exemplary environment 100", which is an example of an exemplary embodiment 100 having a device 130 according to an embodiment.

Referring now to FIG. 1D, FIG. 1D shows an example embodiment of an exemplary environment 100", which is a non-limiting example of an environment 100. As shown in FIG. 1D, environment 100" may include a user 105, which user may have one or more of a personal device 22A and a personal device 22B. Personal device 22A may be, for example, a universal remote control, and personal device 22B may be, for example, a cellular telephone device, although both personal device 22A and personal device 22B may be any form of personal device 120 as previously described. In some embodiments, one or both of personal device 22A, personal device 22B, and computing device 54 may transmit, store, and/or receive adaptation data. In some embodiments, one of personal device 22A, personal device 22B, and computing device 54 may determine to which of the devices shown in FIG. 1D the user 105 is directing her speech. In other embodiments, one or more of receiver device 51, media player device 52, and television device 53 may transmit one or more of speech data and adaptation data back and forth, and one or more of receiver device 51, media player device 52, and television device 53 may determine which device should apply the adaptation data, and which device should process the speech data, out of devices 22A, 22B, 51, 52, 53, and 54.

Figure 1E:
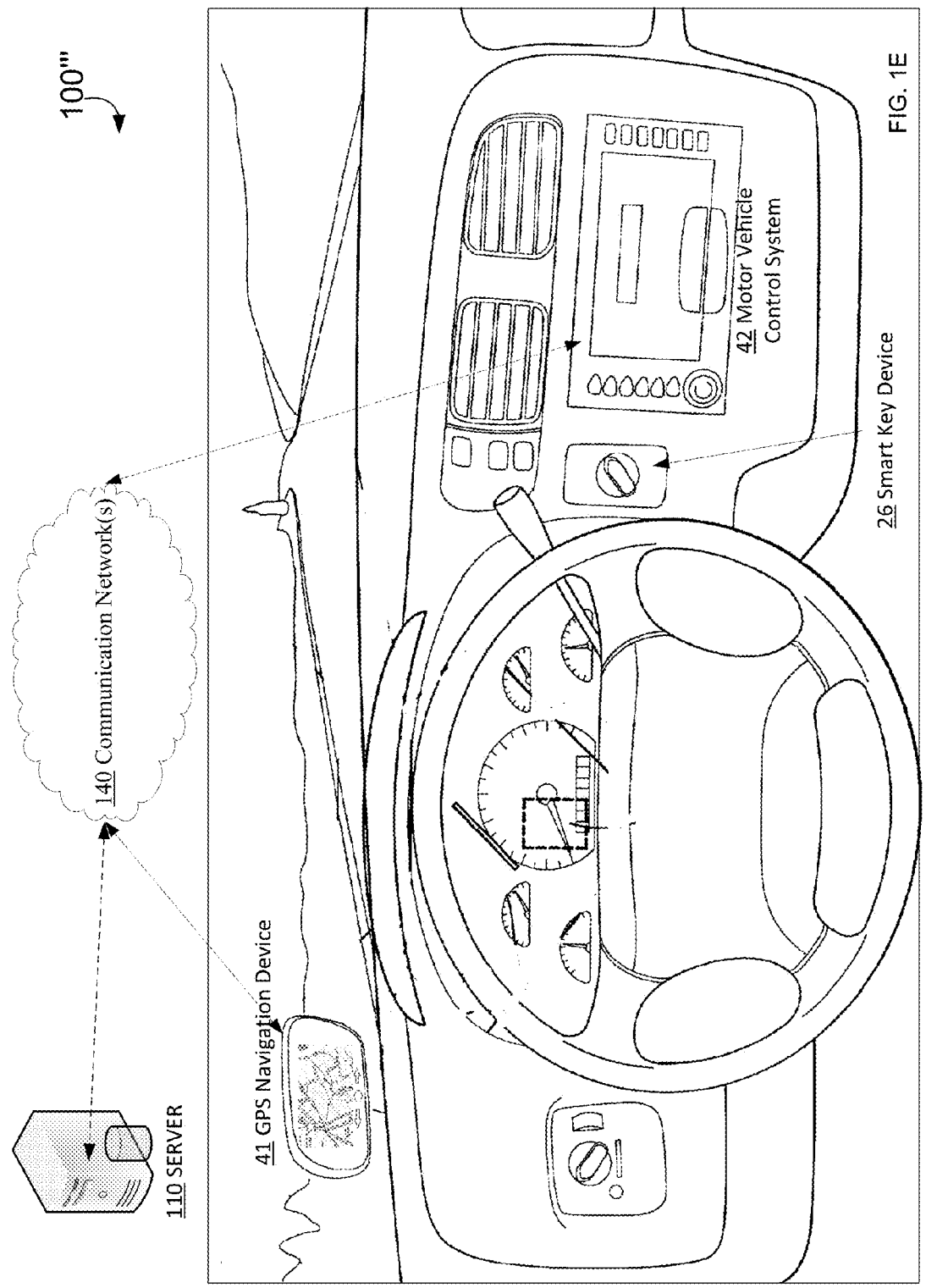
FIG. 1E shows a high-level diagram of an exemplary environment 100''', which is an example of an exemplary embodiment 100 having a device 130, according to an embodiment.

Referring now to FIG. 1E, FIG. 1E shows an example embodiment of an exemplary environment 100'", which is a non-limiting example of an environment 100. As shown in FIG. 1E, environment 100' may include a user (not shown) driving an automobile (interior only shown), wherein the automobile is equipped with a motor vehicle control system 42, which may control the non-driving features of the automobile, e.g., music, climate, temperature, fuel management, seat position, media playing, lights, and the like. The automobile also may have a smart key device 26, which, in some embodiments, may store, receive, and/or transmit adaptation data, either wirelessly or through the system of the automobile. In some embodiments, environment 100' may also include a GPS navigation device 41, which may be an example of intermediate device 40, which also may be a personal device 120. In some embodiments, GPS navigation device 41 may serve as a terminal device, receiving speech data and adaptation data in order to process a user's request. In other embodiments, GPS navigation device 41 may serve as a personal device, storing adaptation data derived from navigation commands of the user, and transmitting the adaptation data to a target device, e.g., motor vehicle control system 42, when needed. Intermediate devices 40, e.g., as shown in FIG. 1A, and GPS navigation device 41, which may be an example of intermediate device 40, may be a personal device for a first transaction and a terminal in a second transaction. In some embodiments, GPS navigation device 41 may change its role based on an analysis of data received by GPS navigation device 41.

Referring again to FIG. 1E, in some embodiments, GPS navigation device 41, motor vehicle control system 42, smart key device 26, and the user's personal device (not shown) may communicate with one or more communication networks 140 and one or more servers 110. As in all shown exemplary embodiments, however, these elements are optional and some embodiments may exclude them.

Figure 2A:
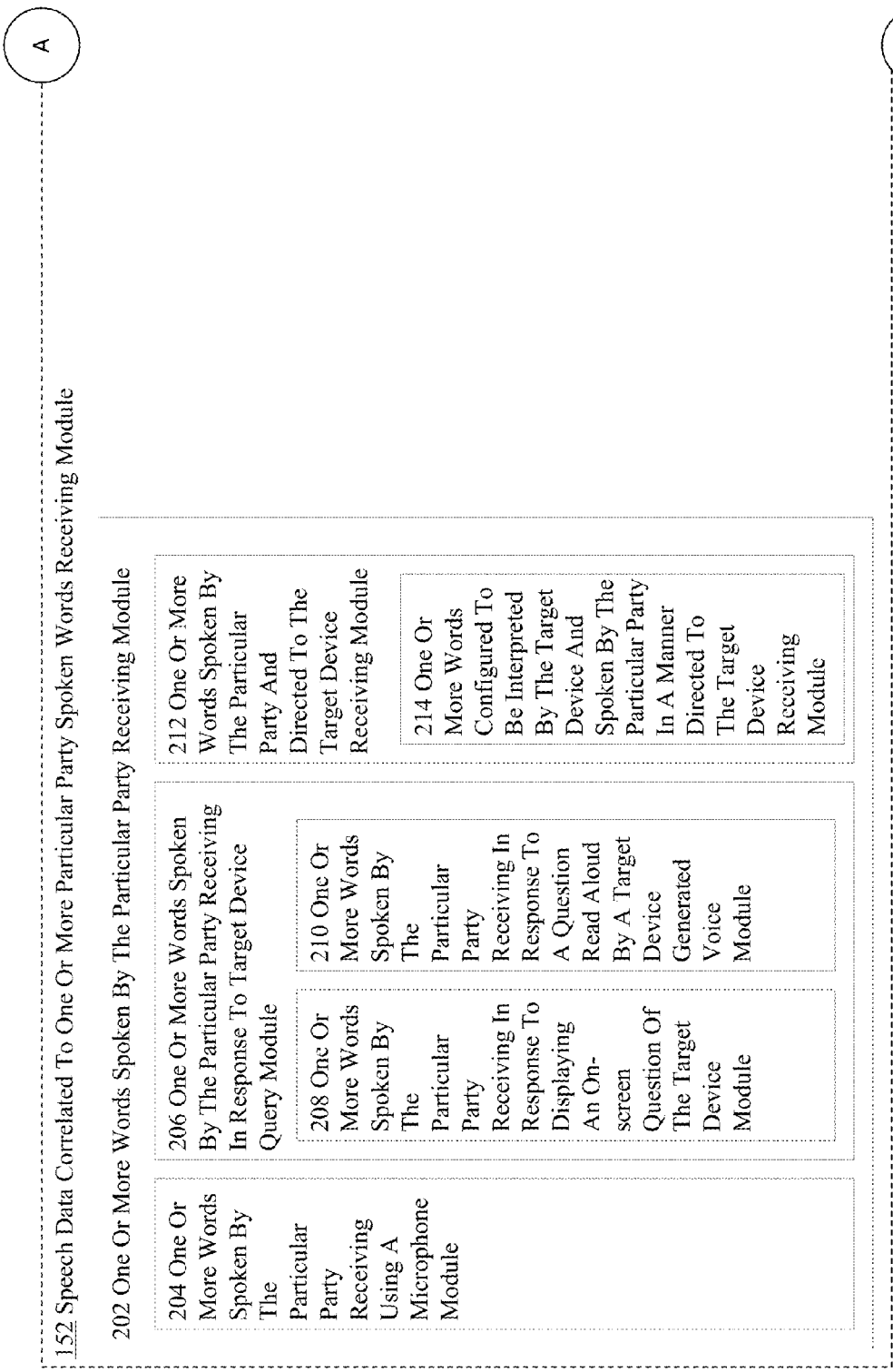

Referring now to FIG. 2, FIG. 2 illustrates an exemplary implementation of the speech data correlated to one or more particular party spoken words receiving module 152. As illustrated in FIG. 2, the speech data correlated to one or more particular party spoken words receiving module 152 may include one or more sub-logic modules in various alternative implementations and embodiments. For example, as shown in FIG. 2, e.g., FIG. 2A, in some embodiments, module 152 may include one or more words spoken by the particular party receiving module 202. In some embodiments, module 202 may include one or more of one or more words spoken by the particular party receiving using a microphone module 204, one or more words spoken by the particular party receiving in response to target device query module 206, and one or more words spoken by the particular party and directed to the target device receiving module 212. In some embodiments, module 206 may include one or more of one or more words spoken by the particular party receiving in response to displaying an on-screen question of the target device module 208 and one or more words spoken by the particular party receiving in response to a question read aloud by a target device generated voice module 210. In some embodiments, module 212 may include one or more words configured to be interpreted by the target device and spoken by the particular party in a manner directed to the target device receiving module 214.

Referring again to FIG. 2, e.g., FIG. 2B, in some embodiments, module 152 may include speech data comprising a representation of particular party spoken word receiving module 216. In some embodiments, module 216 may include one or more of speech data comprising a recording of particular party spoken word receiving module 218, speech data comprising a retransmission of particular party spoken word receiving module 220, speech data comprising a numeric representation of particular party spoken word receiving module 222, and speech data corresponding to partially processed particular party spoken word receiving module 224. In some embodiments, module 224 may include one or more of speech data corresponding to partially processed particular party spoken speech with non-lexical vocable removed receiving module 226 and speech data corresponding to partially anonymized particular party spoken word receiving module 228.

Figure 2C:
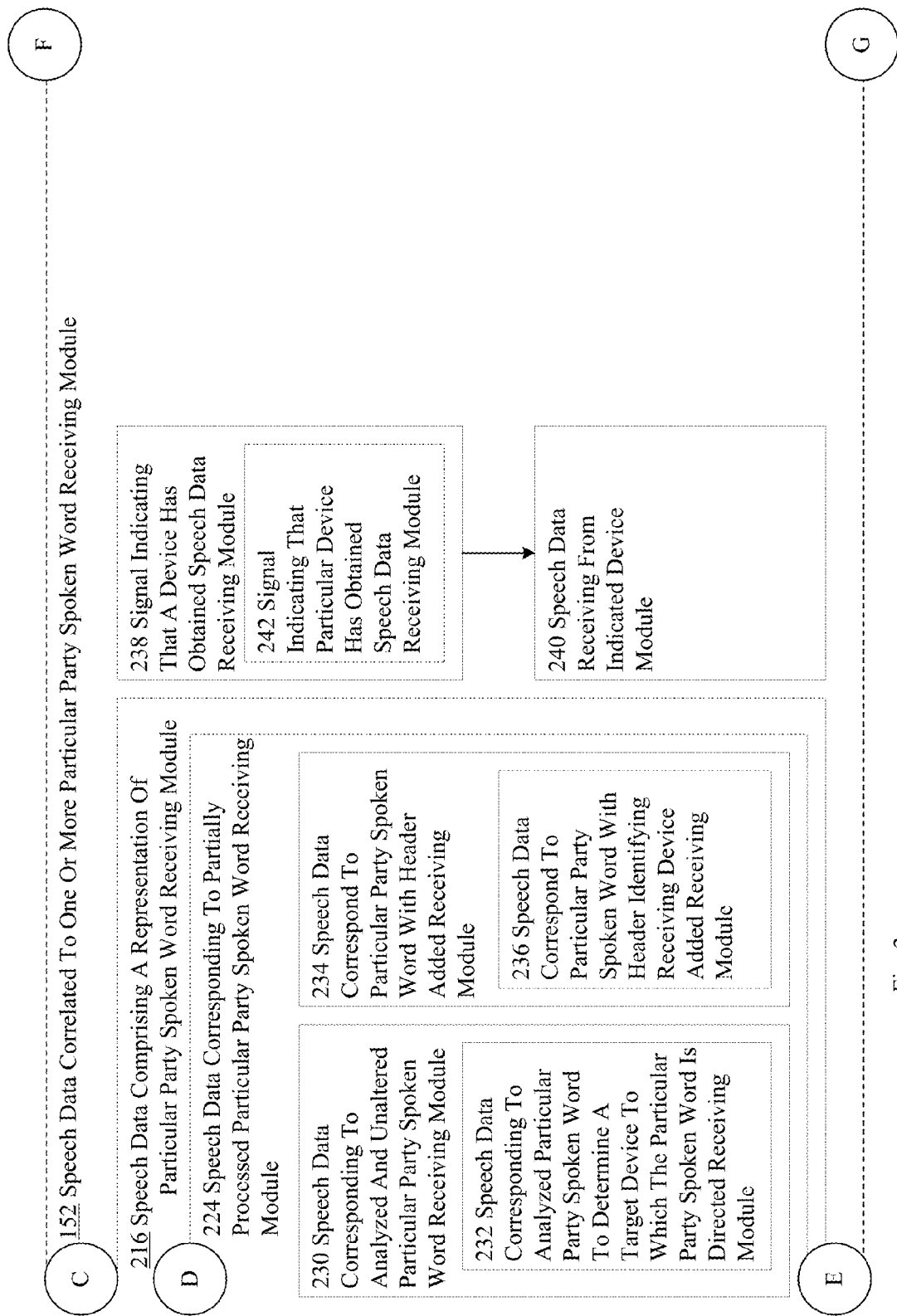

Referring again to FIG. 2, e.g., FIG. 2C, in some embodiments, module 152 may include module 216, which may include module 224, as described above. In some embodiments, module 224 may include one or more of speech data corresponding to analyzed and unaltered particular party spoken word receiving module 230 (e.g., which, in some embodiments, may include speech data corresponding to analyzed particular party spoken word to determine a target device to which the particular party spoken word is directed receiving module 232) and speech data correspond to particular party spoken word with header added receiving module 234 (e.g., which, in some embodiments, may include speech data correspond to particular party spoken word with header identifying receiving device added receiving module 236). In some embodiments, module 152 may include one or more of signal indicating that a device has obtained speech data receiving module 238 (e.g., which, in some embodiments, may include signal indicating that particular device has obtained speech data receiving module 242) and speech data receiving from indicated device module 240.

Figure 2D:
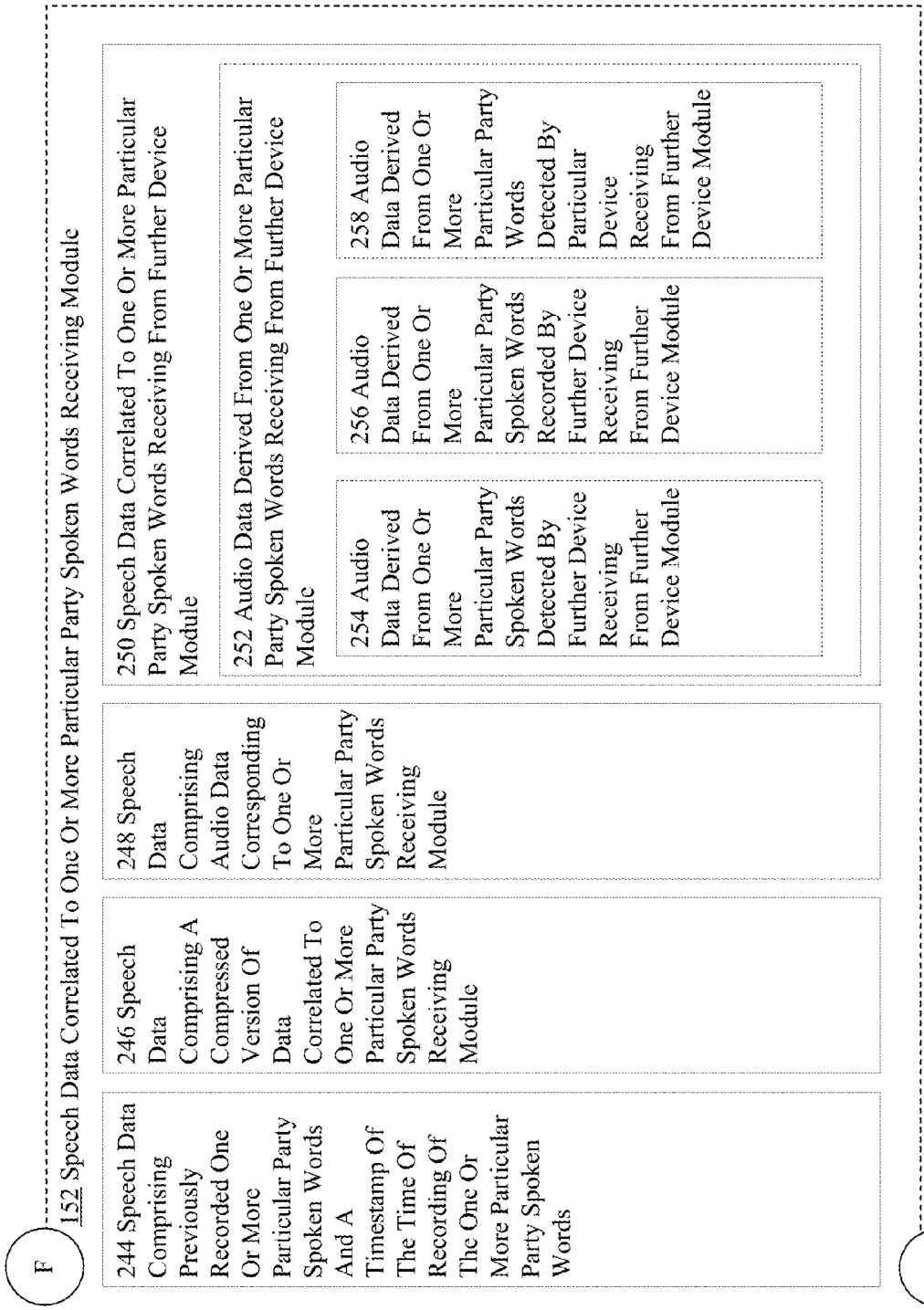

Referring again to FIG. 2, e.g., FIG. 2D, in some embodiments, module 152 may include one or more of speech data comprising previously recorded one or more particular party spoken words and a timestamp of the time of recording of the one or more particular party spoken words 244, speech data comprising a compressed version of data correlated to one or more particular party spoken words receiving module 246, speech data comprising audio data corresponding to one or more particular party spoken words receiving module 248, and speech data correlated to one or more particular party spoken words receiving from further device module 250. In some embodiments, module 250 may include audio data derived from one or more particular party spoken words receiving from further device module 252. In some embodiments, module 252 may include one or more of audio data derived from one or more particular party spoken words detected by further device receiving from further device module 254, audio data derived from one or more particular party spoken words recorded by further device receiving from further device module 256, and audio data derived from one or more particular party words detected by particular device receiving from further device module 258.

FIG. 3 illustrates an exemplary implementation of adaptation data at least partly based on discrete speech interaction of particular party separate from detected speech data, and has been stored on a particular party-associated particular device receiving module 154. As illustrated in FIG. 3, the adaptation data at least partly based on discrete speech interaction of particular party separate from detected speech data, and has been stored on a particular party-associated particular device receiving module 154 may include one or more sub-logic modules in various alternative implementations and embodiments. For example, as shown in FIG. 3 (e.g., FIG. 3A), in some embodiments, module 154 may include adaptation data comprising one or more words and corresponding pronunciations of the one or more words at least partly based on discrete speech interaction of particular party separate from detected speech data, and has been stored on a particular party-associated particular device receiving module 302. In some embodiments, module 302 may include adaptation data comprising one or more words and corresponding pronunciations of the one or more words at least partly based on at least one previous training by the particular party separate from detected speech data, and has been stored on a particular party-associated particular device receiving module 304. In some embodiments, module 304 may include adaptation data comprising one or more words and corresponding pronunciations of the one or more words at least partly based on at least one previous training by the particular party separate from detected speech data corresponding to an order placed by the particular party at an automated drive-thru terminal that accepts speech input, and has been stored on a particular party-associated particular device receiving module 306. In some embodiments, module 306 may include adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular party-associated particular device receiving module 308. In some embodiments, module 308 may include adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular device linked to the particular party through a contract with a telecommunications provider receiving module 310.

Referring again to FIG. 3, e.g., FIG. 3B, in some embodiments, module 154 may include one or more of adaptation data at least partly based on discrete speech interaction of particular party at different time and location to speech interaction generating detected speech data, and has been stored on a particular party-associated particular device receiving module 312 and adaptation data at least partly based on discrete speech interaction of particular party occurring prior to speech interaction generating detected speech data, and has been stored on a particular party-associated particular device receiving module 314. In some embodiments, module 314 may include one or more of adaptation data at least partly based on discrete speech interaction of particular party occurring prior to speech interaction generating detected speech data, and has been stored on a particular party-associated particular device receiving from the particular device module 316 (e.g., which, in some embodiments, may include adaptation data at least partly based on discrete speech interaction of particular party occurring prior to speech interaction generating detected speech data, and has been stored on a particular party-associated particular device receiving directly from the particular device memory module 318) and adaptation data at least partly based on discrete speech interaction of particular party occurring prior to speech interaction generating detected speech data, and has been stored on a particular party-associated particular device receiving from a communication network provider module 320 (e.g., which, in some embodiments, may include adaptation data at least partly based on discrete speech interaction of particular party occurring prior to speech interaction generating detected speech data, and has been stored on a particular party-associated particular device and transmitted over the communication network receiving from a communication network provider module 322).

Referring again to FIG. 3, e.g., FIG. 3C, in some embodiments, module 154 may include module 314, as previously described. In some embodiments, module 314 may include one or more of adaptation data at least partly based on discrete speech interaction of particular party occurring prior to speech interaction generating detected speech data, and has been stored on a particular party-associated particular device receiving from a device connected to a same network as a target device to which the detected speech data is directed module 324 and adaptation data at least partly based on discrete speech interaction of particular party occurring prior to speech interaction generating detected speech data, and has been stored on a particular party-associated particular device receiving in response to reception of speech data module 326. In some embodiments, module 154 may include adaptation data at least partly based on discrete speech interaction of particular party occurring prior to speech interaction generating detected speech data, and has been stored on a particular party-associated particular device acquiring in response to condition module 328. In some embodiments, module 328 may include adaptation data at least partly based on discrete speech interaction of particular party occurring prior to speech interaction generating detected speech data, and has been stored on a particular party-associated particular device acquiring in response to the particular party interacting with a target device module 330. In some embodiments, module 330 may include one or more of adaptation data at least partly based on discrete speech interaction of particular party occurring prior to speech interaction generating detected speech data, and has been stored on a particular party-associated particular device acquiring in response to the particular party inserting a key into a motor vehicle interacting with a target device module 332 and adaptation data at least partly based on discrete speech interaction of particular party occurring prior to speech interaction generating detected speech data, and has been stored on a particular party-associated particular device acquiring in response to the particular party executing a program on a computing device module 334.

Referring again to FIG. 3, e.g., FIG. 3D, in some embodiments, module 154 may include module 328, as previously described. In some embodiments, module 328 may include one or more of adaptation data at least partly based on discrete speech interaction of particular party occurring prior to speech interaction generating detected speech data, and has been stored on a particular party-associated particular device receiving in response to detection of the particular party at a particular location module 336 and adaptation data at least partly based on discrete speech interaction of particular party occurring prior to speech interaction generating detected speech data, and has been stored on a particular party-associated particular device receiving in response to detection of the particular party within a particular proximity of a target device module 338.

Referring again to FIG. 3, e.g., FIG. 3E, in some embodiments, module 154 may include adaptation data at least partly based on discrete speech interaction of particular party separate from detected speech data, and has been stored on a particular party-associated particular device acquiring from a further device module 340. In some embodiments, module 340 may include one or more of adaptation data originating at further device and at least partly based on discrete speech interaction of particular party separate from detected speech data, and has been stored on a particular party-associated particular device acquiring from a further device module 342, adaptation data at least partly based on discrete speech interaction of particular party separate from detected speech data, and has been stored on a particular party-associated particular device acquiring from a further device related to the particular device module 344, and adaptation data at least partly based on discrete speech interaction of particular party separate from detected speech data, and has been stored on a particular party-associated particular device acquiring from a further device that received the adaptation data from the particular device module 352. In some embodiments, module 344 may include one or more of adaptation data at least partly based on discrete speech interaction of particular party separate from detected speech data, and has been stored on a particular party-associated particular device acquiring from a further device associated with the particular party module 346, adaptation data at least partly based on discrete speech interaction of particular party separate from detected speech data, and has been stored on a particular party-associated particular device acquiring from a further device in communication with the particular device module 348, and adaptation data at least partly based on discrete speech interaction of particular party separate from detected speech data, and has been stored on a particular party-associated particular device acquiring from a further device at least partially controlled by the particular device module 350.

Referring again to FIG. 3, e.g., FIG. 3F, in some embodiments, module 154 may include module 340, as previously described. In some embodiments, module 340 may include adaptation data comprising instructions for modifying a pronunciation dictionary, said adaptation data at least partly based on discrete speech interaction of particular party separate from detected speech data, and has been stored on a particular party-associated particular device acquiring from a further device module 354. In some embodiments, module 354 may include adaptation data comprising a first instruction for modifying a pronunciation dictionary based on a first particular party interaction and a second instruction for modifying a pronunciation dictionary based on a second particular party interaction, and has been stored on a particular party-associated particular device acquiring from a further device module 356. In some embodiments, module 356 may include adaptation data comprising a first instruction for modifying a pronunciation dictionary based on a first particular party interaction and a second instruction for modifying a pronunciation dictionary based on a second particular party interaction, said first instruction has been stored on a particular party-associated particular device acquiring from a further device module 358.

Referring again to FIG. 3, e.g., FIG. 3G, in some embodiments, module 154 may include one or more of adaptation data at least partly based on discrete speech interaction of particular party separate from detected speech data, and has been stored on a particular party-associated particular device generating module 360, adaptation data at least partly based on discrete speech interaction of particular party separate from detected speech data, and has been stored on a particular party-associated particular device retrieving module 362, and adaptation data at least partly based on discrete speech interaction of particular party with particular type of device separate from detected speech data, and has been stored on a particular party-associated particular device receiving module 364. In some embodiments, module 364 may include one or more of adaptation data at least partly based on discrete speech interaction of particular party with device of same type as target device configured to receive speech data, said discrete interaction separate from detected speech data, and has been stored on a particular party-associated particular device receiving module 366 and adaptation data at least partly based on discrete speech interaction of particular party with device having particular characteristic separate from detected speech data, and has been stored on a particular party-associated particular device receiving module 368. In some embodiments, module 368 may include one or more of adaptation data at least partly based on discrete speech interaction of particular party with device communicating on a same communication network as target device and separate from detected speech data, and has been stored on a particular party-associated particular device receiving module 370 and adaptation data at least partly based on discrete speech interaction of particular party with device configured to carry out a same function as the target device and separate from detected speech data, and has been stored on a particular party-associated particular device receiving module 372.

Referring again to FIG. 3, e.g., FIG. 3H, in some embodiments, module 154 may include module 364, and module 364 may include module 368, as previously described. In some embodiments, module 368 may include adaptation data at least partly based on discrete speech interaction of particular party with device configured to accept a same type of input as the target device and separate from detected speech data, and has been stored on a particular party-associated particular device receiving module. In some embodiments, module 154 may include adaptation data at least partly based on discrete speech interaction of particular party with particular device separate from detected speech data, and has been stored on a particular party-associated particular device receiving module 376. In some embodiments, module 376 may include adaptation data at least partly based on discrete speech interaction of particular party with cellular telephone device separate from detected speech data, and has been stored on a particular party-associated cellular telephone device receiving module 378. In some embodiments, module 378 may include one or more of adaptation data at least partly based on particular party telephone conversation carried out using cellular telephone device separate from detected speech data, and has been stored on a particular party-associated cellular telephone receiving module 380 and adaptation data at least partly based on particular party speech command given to cellular telephone device separate from detected speech data, and has been stored on a particular party-associated cellular telephone receiving module 382.

Referring again to FIG. 3, e.g., FIG. 3I, in some embodiments, module 154 may include one or more of adaptation data at least partly based on discrete speech interaction of particular party separate from detected speech data and using same utterance as speech that is part of speech data, and has been stored on a particular party-associated particular device receiving module 384, adaptation data at least partly based on discrete speech interaction of particular party and using same utterance as speech that is part of speech data at a different time than speech that is part of the speech data receiving module 386, adaptation data comprising a phoneme dictionary based on one or more particular party pronunciations, such that at least one entry has been stored on a particular party-associated particular device receiving module 388, adaptation data comprising a sentence diagramming path selection algorithm based on one or more particular party discrete speech interactions, and has been stored on a particular party-associated particular device receiving module 390, adaptation data at least partly based on discrete speech interaction of particular party separate from detected speech data, and at least partly collected by a particular party-associated particular device receiving module 392, and adaptation data comprising instructions for modifying one or more portions of a speech recognition component of a target device that are at least partly based on one or more particular party speech interactions, and has been stored on a particular party-associated particular device receiving module 394.

Referring again to FIG. 3, e.g., FIG. 3J, in some embodiments, module 154 may include one or more of adaptation data comprising a location of instructions for modifying one or more portions of a speech recognition component of a target device that are at least partly based on one or more particular party speech interactions, and has been stored on a particular party-associated particular device receiving module 396, adaptation data at least partly based on discrete speech interaction of particular party separate from detected speech data, and transmitted from a particular party-associated particular device receiving module 398, adaptation data at least partly based on discrete speech interaction of particular party separate from detected speech data, and stored on a particular party-associated particular device receiving module 301, adaptation data at least partly based on discrete speech interaction of particular party separate from detected speech data, and is temporarily stored on the particular-party associated particular device until remote server deposit receiving module 303, and adaptation data at least partly based on discrete speech interaction of particular party separate from detected speech data, and was transmitted from a first device to a second device using the particular party-associated particular device as a channel configured to facilitate the transaction receiving module 305.

Referring again to FIG. 3, e.g., FIG. 3K, in some embodiments, module 154 may include one or more of adaptation data at least partly based on discrete speech interaction of particular party separate from detected speech data, and at least a portion of which originated at a particular party-associated particular device receiving module 307, adaptation data at least partly based on discrete speech interaction of particular party separate from detected speech data, and at least a portion of which was transmitted to a remote location from a particular party-associated particular device receiving from remote location module 309, adaptation data at least partly based on discrete speech interaction of particular party separate from detected speech data receiving module 311, and further data adding to adaptation data module 313. In some embodiments, module 313 may include one or more of additional adaptation data adding to adaptation data module 315, header data identifying receiving entity adding to adaptation data module 317, and header data identifying transmitting entity adding to adaptation data module 319.

Referring now to FIG. 4, FIG. 4 illustrates an exemplary implementation of the target data regarding a target configured to process at least a portion of the received speech data obtaining module 156. As illustrated in FIG. 4, the target data regarding a target configured to process at least a portion of the received speech data obtaining module 156 may include one or more sub-logic modules in various alternative implementations and embodiments. For example, as shown in FIG. 4, e.g., FIG. 4A, in some embodiments, module 156 may include one or more of data indicating the target device is configured to process at least a portion of received speech data receiving module 402, data indicating that the adaptation data is configured to be applied to the target device to assist in processing at least a portion of the speech data receiving from a speech processing component module 408, and data indicating that the adaptation data has been applied to the target device to assist in processing at least a portion of the speech data receiving from a speech processing component module 410. In some embodiments, module 402 may include data indicating the target device is configured to process at least a portion of received speech data receiving from speech processing component at central processing component module 404. In some embodiments, module 404 may include one or more of data indicating the target device is configured to process at least a portion of received speech data receiving from speech processing component at central processing component of which the speech processing component is a subcomponent module 406. In some embodiments, module 410 may include data indicating that the adaptation data has been applied to an automated teller machine device to assist in processing at least a portion of the speech data receiving from a speech processing component module 412. In some embodiments, module 412 may include data indicating that the adaptation data has been applied to an automated teller machine device to assist in processing at least a portion of the data corresponding to a spoken request by the particular party receiving from a speech processing component module 414. In some embodiments, module 414 may include data indicating that the list of the way that the particular party pronounces numbers zero through nine has been applied to an automated teller machine device to assist in processing at least a portion of the data corresponding to a spoken request by the particular party receiving from a speech processing component module 416.

Referring again to FIG. 4, e.g., FIG. 4B, in some embodiments, module 156 may include one or more of target data regarding a target configured to process at least a portion of the received speech data generating module 418, speech data configurable to be processed by a speech recognition component to which the adaptation data has been applied determining module 420, and target data regarding intended target device generating based on determination module 422. In some embodiments, module 420 may include one or more of at least a portion of speech data analyzing module 424 and target data regarding intended target device determining at least partly based on the analyzing at least a portion of speech data module 426. In some embodiments, module 424 may include at least a portion of speech data analyzing using an adaptation data-applied speech recognition component module 428. In some embodiments, module 428 may include one or more of at least a portion of speech data analyzing using an adaptation data-applied speech recognition component of target device module 430 and at least a portion of speech data analyzing using an adaptation data-applied speech recognition component of further device module 432. In some embodiments, module 422 may include one or more of Boolean that resolves to true when the analysis of the speech data portion indicates the received speech data is configured to be successfully processed module 434 and numeric indicator indicating that at least a portion of the received speech data is configured to be successfully processed generating based on analysis of at least a portion of speech data module 436.

Figure 4C:
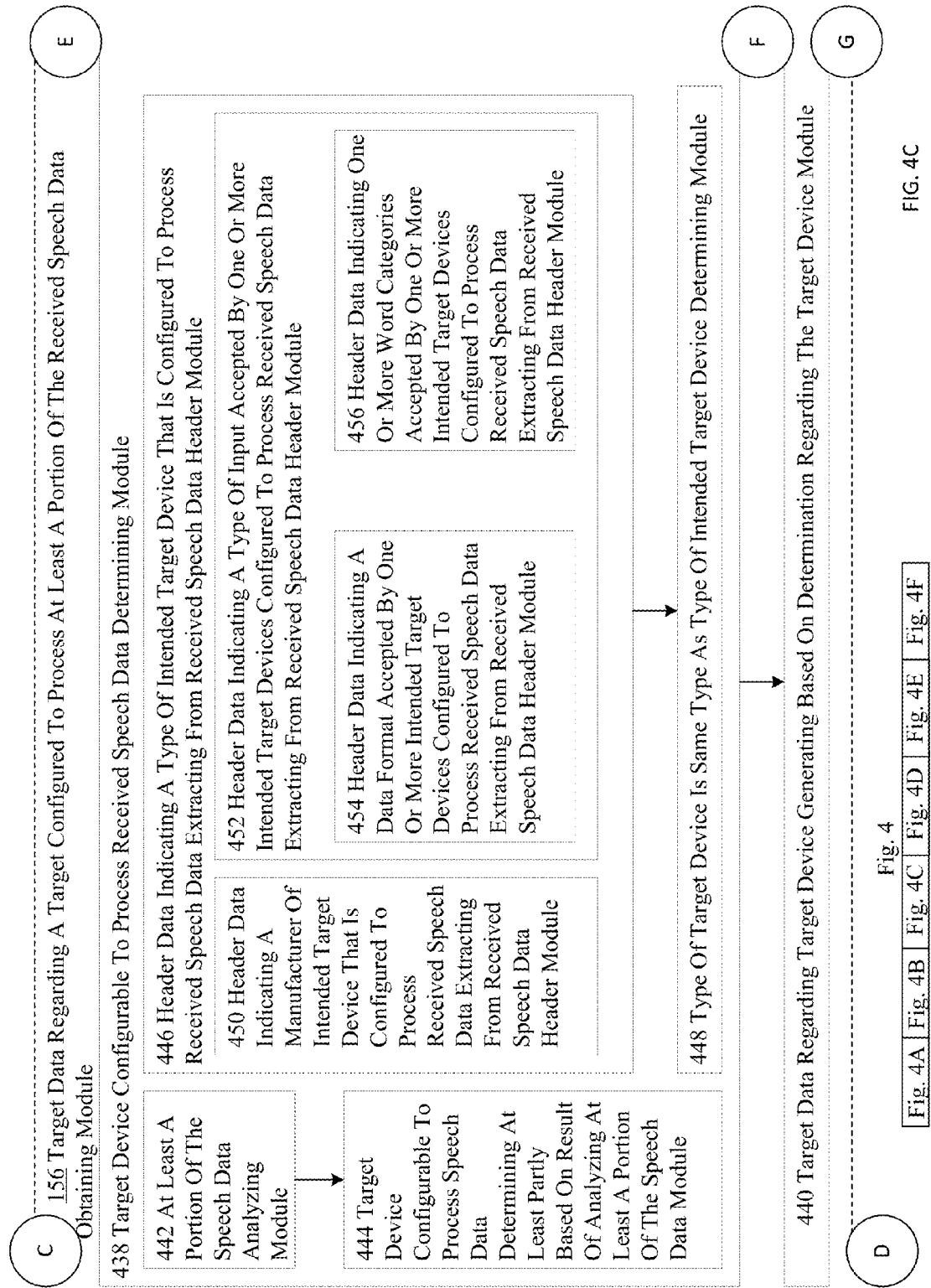

Referring again to FIG. 4, e.g., FIG. 4C, in some embodiments, module 156 may include one or more of target device configurable to process received speech data determining module 438 and target data regarding target device generating based on determination regarding the target device module 400. In some embodiments, module 438 may include one or more of at least a portion of the speech data analyzing module 442, target device configurable to process speech data determining at least partly based on result of analyzing at least a portion of the speech data module 444, header data indicating a type of intended target device that is configured to process received speech data extracting from received speech data header module 446, and type of target device is same type as type of intended target device determining module 448. In some embodiments, module 446 may include one or more of header data indicating a manufacturer of intended target device that is configured to process received speech data extracting from received speech data header module 450 and header data indicating a type of input accepted by one or more intended target devices configured to process received speech data extracting from received speech data header module 452. In some embodiments, module 452 may include one or more of header data indicating a data format accepted by one or more intended target devices configured to process received speech data extracting from received speech data header module 454 and header data indicating one or more word categories accepted by one or more intended target devices configured to process received speech data extracting from received speech data header module 456.

Figure 4D:
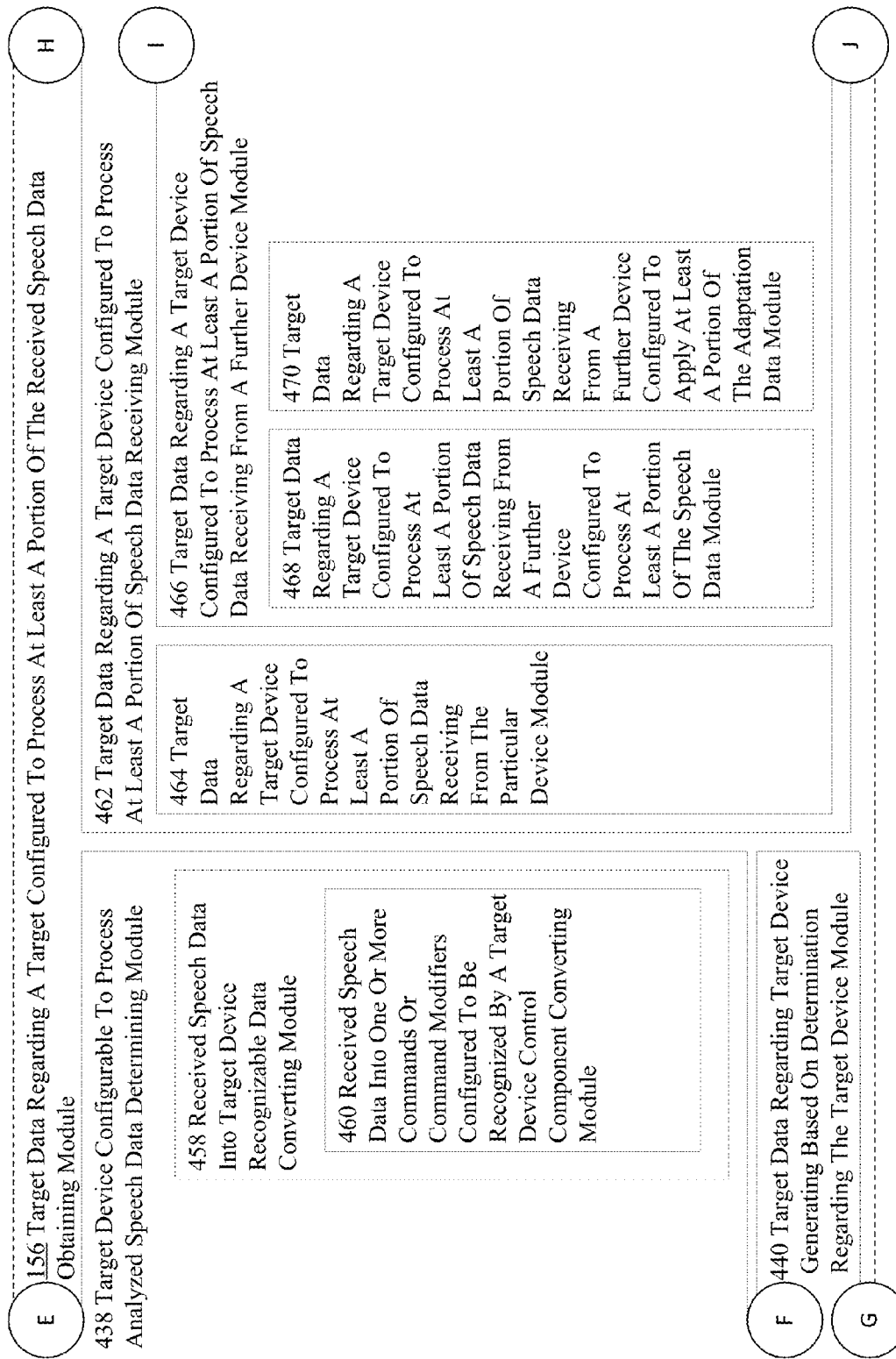
Figure 7:
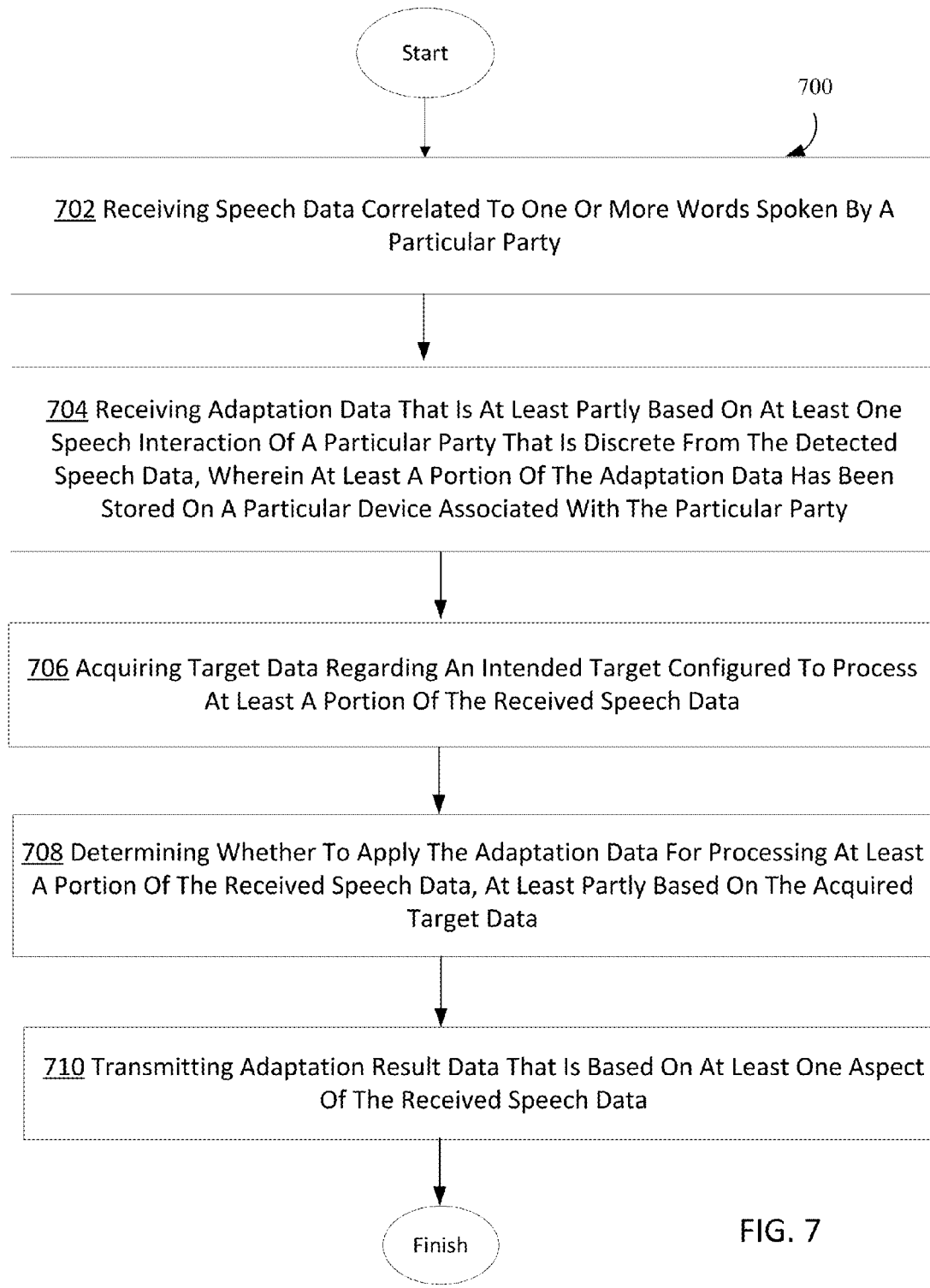
FIG. 7 is a high-level logic flow chart of a process, e.g., operational flow 700, according to an embodiment.

Referring again to FIG. 4, e.g., FIG. 4D, in some embodiments, module 156 may include one or more of module 438 and module 440, as previously described. In some embodiments, module 438 may include received speech data into target device recognizable data converting module 458 and received speech data into one or more commands or command modifiers configured to be recognized by a target device control component converting module 460. In some embodiments, module 156 may include target data regarding a target device configured to process at least a portion of speech data receiving module 462. In some embodiments, module 462 may include one or more of target data regarding a target device configured to process at least a portion of speech data receiving from the particular device module 464 and target data regarding a target device configured to process at least a portion of speech data receiving from a further device module 466. In some embodiments, module 466 may include one or more of target data regarding a target device configured to process at least a portion of speech data receiving from a further device configured to process at least a portion of the speech data module 468 and target data regarding a target device configured to process at least a portion of speech data receiving from a further device configured to apply at least a portion of the adaptation data module 470.

Referring again to FIG. 4, e.g., FIG. 4E, in some embodiments, module 156 may include module 462, and module 462 may include module 466, as previously described. In some embodiments, module 466 may include one or more of target data regarding a target device configured to process at least a portion of speech data receiving from a further device configured to process the speech data less efficiently than the target device module 472, target data regarding a target device configured to process at least a portion of speech data receiving from a further device for which the speech data is unintended module 474, and target data regarding a target device configured to process at least a portion of speech data and target data indicating the speech data was determined to be intended for the target device receiving from a further device module 476. In some embodiments, module 156 may include one or more of data identifying the target device receiving module 494, address of the target device receiving module 498, and location of the target device receiving module 499. In some embodiments, module 494 may include one or more of name of the target device receiving module 496 and device identifier of the target device receiving module Referring again to FIG. 4, e.g., FIG. 4F, in some embodiments, module 156 may include one or more of target data regarding an intended application module configured to process at least a portion of the received speech data obtaining module 478 and target data regarding a first application module configured to process at least a portion of the received speech data and a second application module configured to process at least a portion of the received speech data obtaining module 484. In some embodiments, module 478 may include one or more of target data regarding an intended application module configured to process, facilitated by the adaptation data, at least a portion of the received speech data obtaining module 480 and target data regarding a speech data processing capability of an intended application module configured to process, facilitated by the adaptation data, at least a portion of the received speech data obtaining module 482. In some embodiments, module 484 may include one or more of target data regarding a word processing application module configured to process at least a portion of the received speech data and a speech recognition application module configured to process at least a portion of the received speech data obtaining module 486, target data regarding a word processing application module configured to process at least a portion of the received speech data and an operating system application module configured to process at least a portion of the received speech data obtaining module 488, and target data regarding a word processing application module configured to process at least a portion of the received speech data and a spreadsheet processing application module configured to process at least a portion of the received speech data obtaining module 490.

Referring now to FIG. 5, FIG. 5 illustrates an exemplary implementation of the application of adaptation data for processing at least a portion of the received speech data determining module 158. As illustrated in FIG. 5, the application of adaptation data for processing at least a portion of the received speech data determining module 158 may include one or more sub-logic modules in various alternative implementations and embodiments. For example, as shown in FIG. 5, e.g., FIG. 5A, in some embodiments, module 158 may include one or more of application of adaptation data for processing at least a portion of the received speech data determining based on acquired target data comprising an indication of intended device module 502, application of adaptation data for processing at least a portion of the received speech data determining based on acquired target data comprising an indication that speech data has arrived at intended device module 504, application of adaptation data for processing at least a portion of the received speech data determining based on acquired target data comprising an indication that speech data has not arrived at intended device module 506 (e.g., which, in some embodiments, may include application of adaptation data for processing at least a portion of the received speech data choosing against based on acquired target data comprising an indication that speech data has not arrived at intended device module 508), application of adaptation data for processing at least a portion of the received speech data determining based on acquired target data comprising an indication that speech data has arrived at other device than an intended device module 510, and application of adaptation data for processing at least a portion of the received speech data determining when acquired target data indicates capability of adaptation data application module 512.

Referring again to FIG. 5, e.g., FIG. 5B, in some embodiments, module 158 may include one or more of application of adaptation data for processing at least a portion of the received speech data determining based on acquired target data indicating presence of one or more other devices configured to apply adaptation data module 514, application of adaptation data for processing at least a portion of the received speech data determining against based on acquired target data indicating presence of one or more other devices configured to efficiently apply adaptation data module 516, application of adaptation data for processing at least a portion of the received speech data determining based on acquired target data indicating presence of one or more other applications module 518, and application of adaptation data for processing at least a portion of the received speech data determining based on one or more characteristics of one or more applications and target data indicating a presence of the one or more applications module 520.

Referring again to FIG. 5, e.g., FIG. 5C, in some embodiments, module 158 may include one or more of application of adaptation data for processing at least a portion of the received speech data determining against based acquired target data comprising one or more characteristics of one or more applications module 522, application of adaptation data for processing at least a portion of the received speech data determining based on one or more application preference flags module 528, application of adaptation data for processing at least a portion of the received speech data determining based on one or more user-controlled preference flags module 530, and application of adaptation data for processing at least a portion of the received speech data determining based on operating system decision module 532. In some embodiments, module 522 may include one or more of application of adaptation data for processing at least a portion of the received speech data determining against based acquired target data comprising a presence of one or more applications and one or more characteristics of the one or more applications module 524 and application of adaptation data for processing at least a portion of the received speech data determining against based acquired target data comprising a developer of one or more applications module 526.

Referring now to FIG. 6, FIG. 6 illustrates an exemplary implementation of the adaptation result data based on at least one aspect of the received speech data transmitting module 160. As illustrated in FIG. 6, the adaptation result data based on at least one aspect of the received speech data transmitting module 160 may include one or more sub-logic modules in various alternative implementations and embodiments. For example, as shown in FIG. 6, e.g., FIG. 6A, in some embodiments, module 160 may include one or more of adaptation result data based on applying the adaptation data transmitting module 602, adaptation result data based on processing received speech data transmitting module 606, adaptation result data indicating that at least a portion of the received speech data is intended for an other device transmitting module 652, and adaptation result data indicating completed determination regarding intended target of received speech data transmitting module 658. In some embodiments, module 602 may include adaptation result data based on applying the adaptation data to a speech recognition component of a target device transmitting module 604. In some embodiments, module 606 may include adaptation result data indicating at least a portion of received speech data has been processed transmitting module 650. In some embodiments, module 652 may include one or more of adaptation result data indicating that at least a portion of the received speech data is intended for an other device transmitting to the other device module 654 and adaptation result data comprising the adaptation data and indicating that at least a portion of the received speech data is intended for an other device transmitting module 656.

Referring again to FIG. 6, e.g., FIG. 6B, in some embodiments, module 160 may include one or more of adaptation result data based on a measure of success of at least one portion of a speech-facilitated transaction corresponding to the received speech data transmitting module 608, adaptation result data comprising a list of at least one word that was a portion of the received speech data and that was improperly interpreted during speech data processing transmitting module 618, and adaptation result data comprising at least one phoneme appearing in at least one improperly interpreted word transmitting module 620. In some embodiments, module 608 may include adaptation result data comprising a representation of success of at least one portion of a speech-facilitated transaction corresponding to the received speech data transmitting module 610. In some embodiments, module 610 may include one or more of adaptation result data comprising a numeric representation of success provided by the particular party of at least one portion of a speech-facilitated transaction corresponding to the received speech data transmitting module 612 and adaptation result data comprising a numeric representation of success of at least one portion of a speech-facilitated transaction corresponding to the received speech data transmitting module 614. In some embodiments, module 614 may include adaptation result data comprising confidence rate of correct interpretation of at least one portion of the speech-facilitated transaction corresponding to the received speech data transmitting module 616.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Further, in FIGS. 7-12 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 7 as well as the other operations to be described herein may be performed by at least one of a machine, an article of manufacture, or a composition of matter.

Referring again to FIG. 7, FIG. 7 shows operation 700, which may include operation 702 depicting receiving speech data correlated to one or more words spoken by a particular party. For example, FIG. 1, e.g., FIG. 1E, shows speech data correlated to one or more particular party spoken words receiving module 152 receiving (e.g., either by receiving data, or by a sensor providing notification, e.g., a microphone of a device) speech data (e.g., compressed audio data) correlated to one or more words (e.g., speech of a user placing an order for hot wings and fries at an automated drive-thru window that accepts speech input) spoken by a particular party (e.g., a user of the automated drive-thru window).

Referring again to FIG. 7, operation 700 may include operation 704 depicting receiving adaptation data that is at least partly based on at least one speech interaction of a particular party that is discrete from the received speech data, wherein at least a portion of the adaptation data has been stored on a particular device associated with the particular party. For example, FIG. 1, e.g., FIG. 1E, shows adaptation data at least partly based on discrete speech interaction of particular party separate from detected speech data, and has been stored on a particular party-associated particular device receiving module 154 receiving adaptation data (e.g., a set of proper noun pronunciations, e.g., food items, e.g., "Chunky's Best Wings," or "Big Mac") that is at least partly based on at least one speech interaction (e.g., a previous fast food order at a similar automated drive-thru window at a Big Boy restaurant) of a particular party (e.g., the user, sitting in her car, ordering a meal) that is discrete from the detected speech data (e.g., the speech data of the user placing the order for hot wings and fries at the automated drive-thru window), wherein at least a portion of the adaptation data (e.g., a set of proper noun pronunciations, e.g., food items, e.g., "Chunky's Best Wings," or "Big Mac") has been stored (e.g., at one point was stored, if only temporarily) on a particular device (e.g., a user's cellular phone, on removable memory) associated with the particular party (e.g., in this instance it may merely be carried by the user and in range of the automated drive thru window, or it may broadcast a signal indicating that the device is associated with the party that is speaking when it detects that the user is speaking).

Referring again to FIG. 7, operation 700 may include operation 706 depicting obtaining target data regarding a target configured to process at least a portion of the received speech data. For example, FIG. 1, e.g., FIG. 1E, shows target data regarding a target configured to process at least a portion of the received speech data acquiring module 156 obtaining (e.g., generating, receiving from an internal component, receiving from an external device, or the like) target data (e.g., a listing of, and, in some embodiments, more information about a target device, e.g., a status of the automated drive-thru window, e.g., "ready to receive an order") regarding a target (e.g., a device for which the speech is intended, e.g., the automated drive thru-window, or in other embodiments, a list of devices that can process a portion of the speech data) configured to process at least a portion of the received speech data (e.g., capable of performing one or more operations on the speech data that was received, e.g., speech of a user placing an order for hot wings and fries at an automated drive-thru window that accepts speech input)

Referring again to FIG. 7, operation 700 may include operation 708 depicting determining whether to apply the adaptation data for processing at least a portion of the received speech data, at least partly based on the acquired target data. For example, FIG. 1, e.g., FIG. 1E, shows application of adaptation data for processing at least a portion of the received speech data determining module 158 determining whether to apply (e.g., load the proper noun pronunciations into the processing unit so that the proper noun pronunciations can be used in interpreting the speech) the adaptation data (e.g., a set of proper noun pronunciations, e.g., food items, e.g., "Chunky's Best Wings," or "Big Mac") for processing at least a portion of the received speech data (e.g., the user's order), at least partly based on the acquired target data (e.g., the data that indicates the automated drive thru is ready to receive and process speech).

Referring again to FIG. 7, operation 700 may include operation 710 depicting transmitting adaptation result data that is based on at least one aspect of the received speech data. For example, FIG. 1, e.g., FIG. 1E, shows adaptation result data based on at least one aspect of the received speech data transmitting module 160 transmitting adaptation result data (e.g., a signal indicating that the speech was received, or, in some embodiments, a signal indicating that the speech was received and processed, or, in some embodiments, a signal indicating that the speech was received, but not processed, or, in some embodiments, a signal indicating that the speech was received and determined to be intended for the device that received it, or, in some embodiments, a signal indicating that the speech was received and determined to be intended for a different device than the device that received the speech data) that is based on at least one aspect of the received speech data (e.g., either a characteristic of the speech data itself, or a result of attempting to process the speech data, or other data that will be discussed in more detail herein, and which was elaborated upon in one or more of the previous applications incorporated by reference, supra).

Figure 8A:
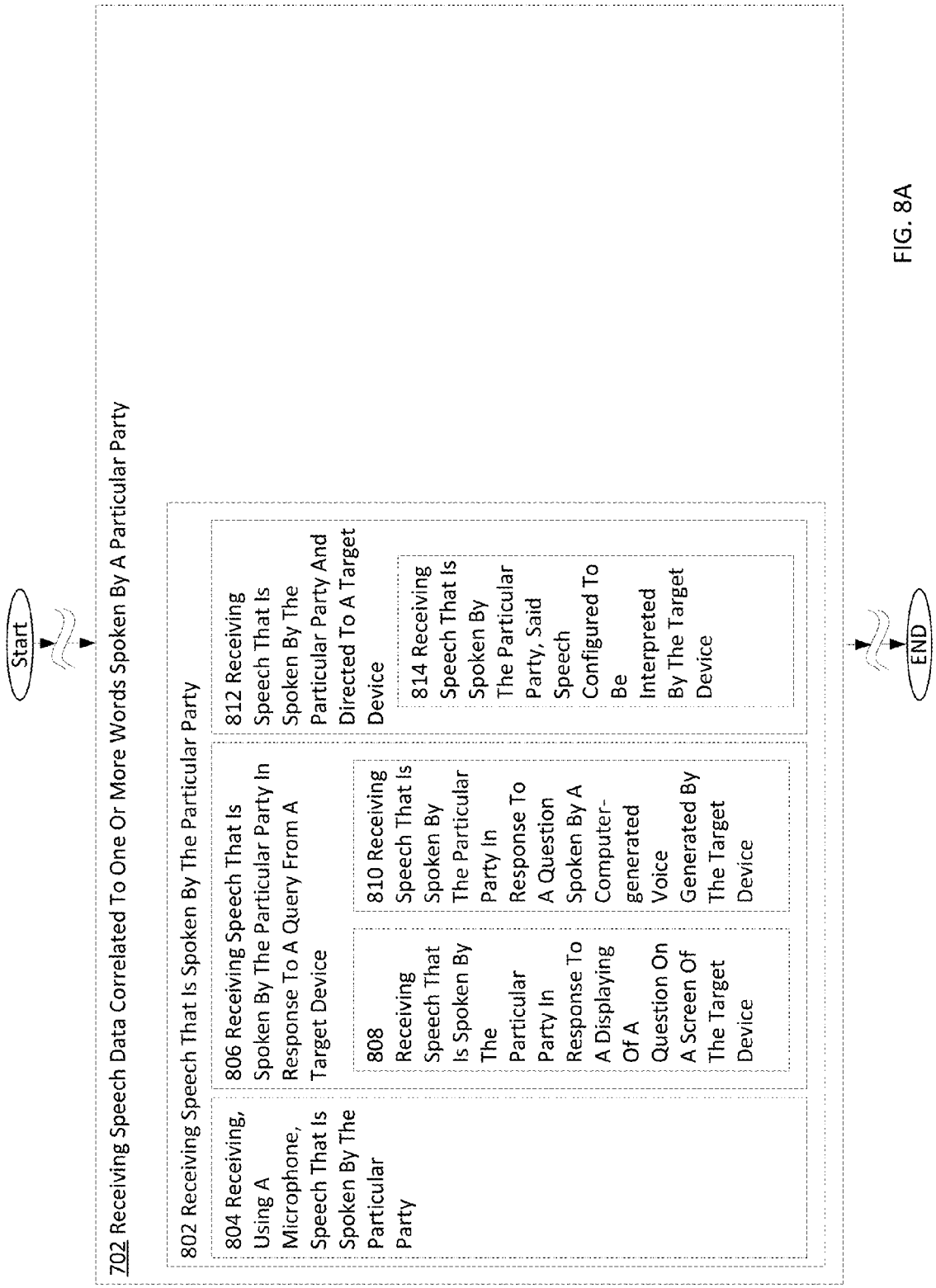
FIG. 8A is a high-level logic flowchart of a process depicting alternate implementations of a receiving speech data operation 702 of FIG. 7, according to one or more embodiments.

FIGS. 8A-8E depict various implementations of operation 702, according to embodiments. Referring now to FIG. 8A, operation 704 may include operation 802 depicting receiving speech that is spoken by the particular party. For example, FIG. 2, e.g., FIG. 2A, shows words spoken by the particular party receiving module 202 receiving speech (e.g., the user says "please withdraw two hundred dollars from checking account number 8675309") that is spoken by the particular party (e.g., the user).

Referring again to FIG. 8A, operation 802 may include operation 804 depicting receiving, using a microphone, speech that is spoken by the particular party. For example, FIG. 2, e.g., FIG. 2A, shows words spoken by the particular party receiving using a microphone module 204 receiving, using a microphone (e.g., a microphone built in to an airline ticket dispensing terminal device), speech that is spoken by the particular party (e.g., "please show me if there are any earlier flights to Washington, D.C.").

Referring again to FIG. 8A, operation 802 may include operation 806 depicting receiving speech that is spoken by the particular party in response to a query from a target device. For example, FIG. 2, e.g., FIG. 2A, shows words spoken by the particular party receiving in response to target device query module 206 receiving speech (e.g., receiving a user command given to a video game, e.g., a first person shooter, being played on a video game system) that is spoken by the particular party (e.g., the player of the video game) in response to a query (e.g., "please give a command to your teammate player" from a target device (e.g., from the video game system, or from the game itself).

Referring again to FIG. 8A, operation 806 may include operation 808 depicting receiving speech that is spoken by the particular party in response to a displaying of a question on a screen of the target device. For example, FIG. 2, e.g., FIG. 2A, shows words spoken by the particular party receiving in response to displaying an on-screen question of the target device module 208 receiving speech that is spoken by the particular party (e.g., a user orders a large pizza with ham, pepperoni, and sausage) in response to a displaying of a question (e.g., "please state your order") on a screen of the target device (e.g., an automated order-placing terminal device inside a restaurant).

Referring again to FIG. 8A, operation 806 may include operation 810 depicting receiving speech that is spoken by the particular party in response to a question spoken by a computer-generated voice generated by the target device. For example, FIG. 2, e.g., FIG. 2A, shows words spoken by the particular party receiving in response to a question read aloud by a target device generated voice module 210 receiving speech that is spoken by the particular party (e.g., the user speaks the command "show me directions to 410 4th Street") in response to a question spoken by a computer generated voice (e.g., "please say the place you would like to travel to") generated by the target device (e.g., a personal navigation system, e.g., personal navigation system 41).

Referring again to FIG. 8A, operation 802 may include operation 812 depicting receiving speech that is spoken by the particular party and directed to a target device. For example, FIG. 2, e.g., FIG. 2A, shows words spoken by the particular party and directed to the target device receiving module 212 receiving speech that is spoken by the particular party (e.g., the user gives a command "make twenty-five copies at fifty percent contrast") and directed (e.g., the particular party is speaking to) to a target device (e.g., a speech-enabled copying machine device).

Referring again to FIG. 8A, operation 812 may include operation 814 depicting receiving speech that is spoken by the particular party, said speech configured to be interpreted by the target device. For example, FIG. 2, e.g., FIG. 2A, shows words configured to be interpreted by the target device and spoken by the particular party in a manner directed to the target device receiving module 214 receiving speech that is spoken by the particular party (e.g., the user gives a command, e.g., "play my playlist number six"), said speech configured to be interpreted (e.g., processed into a command that can be executed) by the target device (e.g., a speech-enabled media player hooked into a home theater system).

Figure 8B:
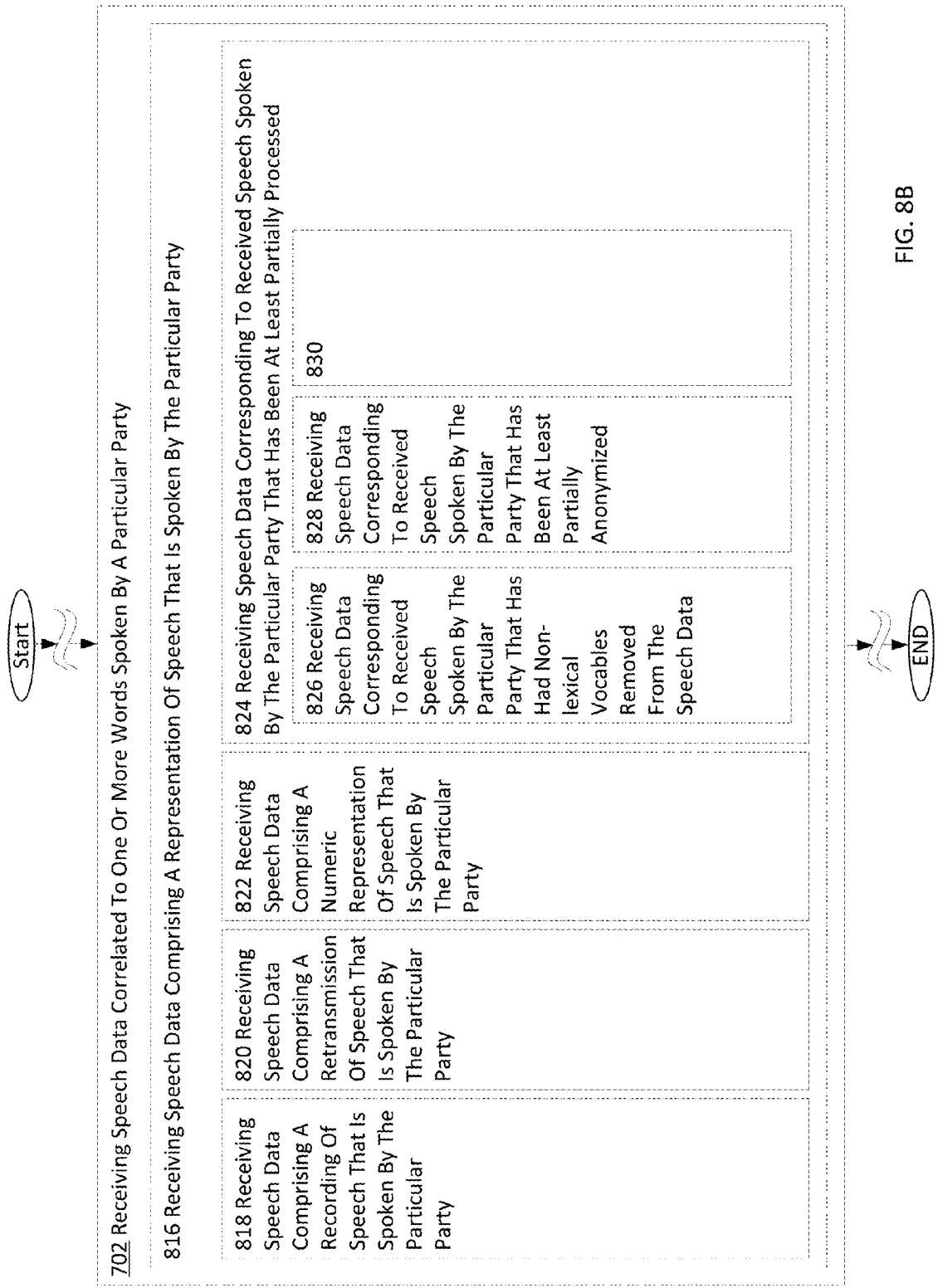
FIG. 8B is a high-level logic flowchart of a process depicting alternate implementations of a receiving speech data operation 702 of FIG. 7, according to one or more embodiments.

Referring now to FIG. 8B, operation 702 may include operation 816 depicting receiving speech data comprising a representation of speech that is spoken by the particular party. For example, FIG. 2, e.g., FIG. 2B, shows speech data comprising a representation of particular party spoken word receiving module 216 receiving speech data comprising a representation of speech (e.g., a Waveform Audio File ("WAV") file) that is spoken by the particular party (e.g., the user gives a command "activate the home security perimeter system").

Referring again to FIG. 8B, operation 816 may include operation 818 depicting receiving speech data comprising a recording of speech that is spoken by the particular party. For example, FIG. 2, e.g., FIG. 2B, shows speech data comprising a recording of particular party spoken word receiving module 218 receiving speech data comprising a recording of speech that is spoken by the particular party (e.g., the user gives a command "compile the program 'never_rush'").

Referring again to FIG. 8B, operation 816 may include operation 820 depicting receiving speech data comprising a retransmission of speech that is spoken by the particular party. For example, FIG. 2, e.g., FIG. 2B, shows speech data comprising a speech data comprising a retransmission of particular party spoken word receiving module 220 receiving speech data (e.g., a user ordering a bag of chili cheese fries) comprising a retransmission (e.g., the device that received the speech, either as speech directly from the user or as speech data from a different device, has retransmitted the received speech, whether modified or not) that is spoken by the particular party (e.g., a user ordering chili cheese fries).

Referring again to FIG. 8B, operation 816 may include operation 822 depicting receiving speech data comprising a numeric representation of speech that is spoken by the particular party. For example, FIG. 2, e.g., FIG. 2B, shows speech data comprising a numeric representation of particular party spoken word receiving module 222 receiving speech data comprising a numeric representation of speech (e.g., speech compressed into a numeric string representing one or more components of speech) that is spoken by the particular party (e.g., a user says to a microwave oven "operate at eighty percent power for ninety seconds").

Referring again to FIG. 8B, operation 816 may include operation 824 depicting receiving speech data corresponding to received speech spoken by the particular party that has been at least partially processed. For example, FIG. 2, e.g., FIG. 2B, shows speech data corresponding to partially processed particular party spoken word receiving module 224 receiving speech data (e.g., compressed data representing speech) corresponding to received speech spoken by the particular party (e.g., "increase the volume" spoken by a user to into a remote control device, but directed at the television) that has been at least partially processed (e.g., the speech data may be compressed, or in other embodiments, a header may be added, or in other embodiments, one or more of the words may be interpreted, or in other embodiments, noise or non-word utterances may be filtered, flagged, or removed).

Referring again to FIG. 8B, operation 824 may include operation 826 depicting receiving speech data corresponding to received speech spoken by the particular party that has had one or more non-lexical vocables removed from the speech data. For example, FIG. 2, e.g., FIG. 2B, shows speech data corresponding to partially processed particular party spoken speech with non-lexical vocable removed receiving module 226 receiving speech data (e.g., received speech processed and compressed into MPEG-2 Audio Layer III ("MP3") format corresponding to received speech (e.g., the user speaks, "la la, I would like a western bacon cheeseburger and large fries") that has had one or more non-lexical vocables (e.g., "la la") removed from the speech data.

Referring again to FIG. 8B, operation 824 may include operation 828 depicting receiving speech data corresponding to received speech spoken by the particular party that has been at least partially anonymized. For example, FIG. 2, e.g., FIG. 2B, shows speech data corresponding to partially anonymized particular party spoken word receiving module 228 receiving speech data (e.g., a representation of speech that is operable on by one or more processors) corresponding to received speech (e.g., "I would like to purchase a train ticket to Colorado") spoken by the particular party (e.g., a user speaking to an automated train ticket transaction terminal device) that has been at least partially anonymized (e.g., particular features that the speaker has, e.g., accent, etc., have been filtered out of the speech data).

Figure 8C:
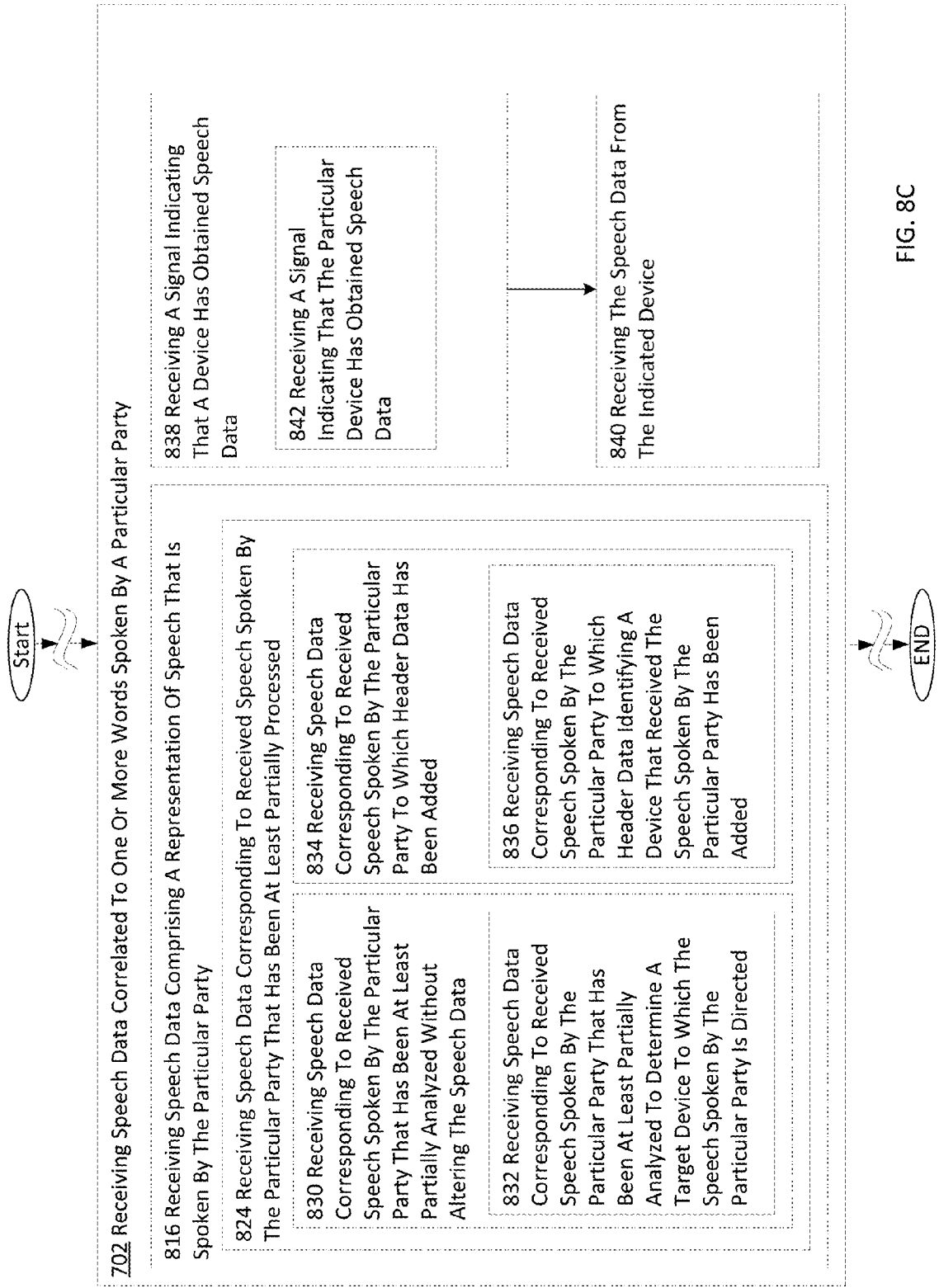
FIG. 8C is a high-level logic flowchart of a process depicting alternate implementations of a receiving speech data operation 702 of FIG. 7, according to one or more embodiments.

Referring now to FIG. 8C, operation 824 may include operation 830 depicting receiving speech data corresponding to received speech spoken by the particular party that has been at least partially analyzed without altering the speech data. For example, FIG. 2, e.g., FIG. 2C, shows speech data corresponding to analyzed and unaltered particular party spoken word receiving module 230 receiving speech data corresponding to received speech spoken by the particular party (e.g., representation of the user speaking the words "tune to channel four two seven") that has been at least partially analyzed (e.g., the received speech data contains a flag indicating that a device previously has determined that this speech is intended for the television, which was determined by partially analyzing the speech to determine that the word "channel" and a number were present).

Referring again to FIG. 8C, operation 830 may include operation 832 depicting receiving speech data corresponding to received speech spoken by the particular party that has been at least partially analyzed to determine a target device to which the speech spoken by the particular party is directed. For example, FIG. 2, e.g., FIG. 2C, shows speech data corresponding to analyzed particular party spoken word to determine a target device to which the particular party spoken word is directed receiving module 232 receiving speech data corresponding to received speech spoken by the particular party (e.g., a data representation of the user speaking "reduce the ambient temperature by five degrees" that has been at least partially analyzed to determine a target device to which the speech spoken by the particular party is directed (e.g., in a system with a GPS navigation device, e.g., GPS navigation device 41, and a motor vehicle control system, e.g., motor vehicle control system 42, the received speech data has been partially analyzed, e.g., by the GPS navigation device, that determined that the speech data regarding temperature control is directed to a motor vehicle control system, e.g., motor vehicle control system 42, because a GPS navigation device cannot change the ambient temperature).

Referring again to FIG. 8C, operation 824 may include operation 834 depicting receiving speech data corresponding to received speech spoken by the particular party to which header data has been added. For example, FIG. 2, e.g., FIG. 2C, shows speech data correspond to particular party spoken word with header added receiving module 234 receiving speech data corresponding to received speech spoken by the particular party (e.g., data corresponding to the speech "record Friends on channel 429 at 8:30 pm on Saturday") to which header data (e.g., data indicating that the user had the "TV command" button on the remote control depressed when she spoke the command to record Friends) has been added (e.g., the remote control may have added that data, or in another embodiment, the remote control may have transferred the data that the "TV command" button was depressed to an intermediate device, e.g., an audio/visual receiver, which speech data and adds the header, and the header-added speech data is received).

Referring again to FIG. 8C, operation 834 may include operation 836 depicting receiving speech data corresponding to received speech spoken by the particular party to which header data identifying a device that received the speech spoken by the particular party has been added. For example, FIG. 2, e.g., FIG. 2C, shows speech data correspond to particular party spoken word with header identifying spoken word receiving device added receiving module 236 receiving speech data corresponding to received speech spoken by the particular party (e.g., data corresponding to a driver speaking the words "display a map of the twenty-fifth floor" spoken toward an automated help/information terminal) to which header data identifying a device that received the speech spoken by the particular party (e.g., a cellular telephone device that picked up the words spoken by the particular party) has been added (e.g., the identifying information may be general, e.g., "a smart phone," or "an Apple-branded smartphone) or may be specific (e.g., Apple iPhone 5 with identification number #B352062").

Referring again to FIG. 8C, operation 702 may include operation 838 depicting receiving a signal indicating that a device has obtained speech data. For example, FIG. 2, e.g., FIG. 2C, shows signal indicating that a device has obtained speech data receiving module 238 receiving a signal (e.g., data indicating that speech data has been obtained) indicating that a device (e.g., a particular device, e.g., a cellular telephone device) has obtained speech data (e.g., data corresponding to a user speaking "show me a map to the nearest bathroom" that is directed toward an automated help/information terminal).

Referring again to FIG. 8C, operation 702 may include operation 840 depicting receiving the speech data from the indicated device. For example, FIG. 2, e.g., FIG. 2C, shows speech data receiving from indicated device module 240 receiving the speech data (e.g., the data corresponding to the user saying "show me a map to the nearest bathroom" from the indicated device (e.g., receiving the speech data from the cellular telephone device).

Referring again to FIG. 8C, operation 838 may include operation 842 depicting receiving a signal indicating that the particular device has obtained speech data. For example, FIG. 2, e.g., FIG. 2C, shows signal indicating that particular device has obtained speech data receiving module 242 receiving a signal indicating that the particular device (e.g., a universal remote control) has obtained speech data (e.g., data corresponding to the user speaking the words "switch input from cable box to Blu-ray player").

Referring now to FIG. 8D, operation 702 may include operation 844 depicting receiving speech data comprising previously recorded one or more words spoken by the particular party, and a timestamp corresponding to a time at which the one or more words spoken by the particular party were recorded. For example, FIG. 2, e.g., FIG. 2D, shows speech data comprising previously recorded one or more particular party spoken words and a timestamp of the time of recording of the one or more particular party spoken words 244 receiving speech data comprising previously recorded one or more words spoken by the particular party (e.g., "make fifty-five copies using 84-brightness paper"), and a timestamp corresponding to a time at which the one or more words spoken by the particular party were recorded (e.g., 4:02:02 pm, Sep. 3, 2012).

Referring again to FIG. 8D, operation 702 may include operation 846 depicting receiving speech data that comprises a compressed version of data correlated to one or more words spoken by the particular party. For example, FIG. 2, e.g., FIG. 2D, shows speech data comprising a compressed version of data correlated to one or more particular party spoken words receiving module 246 receiving speech data that comprises a compressed version of data (e.g., compressed using a Lempel-Ziv compression method) correlated to one or more words spoken by the particular party (e.g., "I would like to buy two Nats tickets").

Referring again to FIG. 8D, operation 702 may include operation 848 depicting receiving audio data corresponding to one or more words spoken by the particular party. For example, FIG. 2, e.g., FIG. 2D, shows speech data comprising audio data corresponding to one or more particular party spoken words receiving module 248 receiving audio data corresponding to one or more words spoken by the particular party (e.g., speaking the words "I would like a large popcorn, two sodas, and a box of M&Ms" to an automated movie concession dispensing stand).

Referring again to FIG. 8D, operation 702 may include operation 850 depicting receiving, from a further device, speech data correlated to one or more words spoken by a particular party. For example, FIG. 2, e.g., FIG. 2D, shows speech data correlated to one or more particular party spoken words receiving from further device module 250 receiving, from a further device (e.g., from a universal remote control, e.g., personal device 22A), speech data correlated to one or more words spoken by a particular party (e.g., "play the DVD in slot twenty-five").

Referring again to FIG. 8D, operation 850 may include operation 852 depicting receiving, from the further device, audio data derived from one or more words spoken by the particular party. For example, FIG. 2, e.g., FIG. 2D, shows audio data derived from one or more particular party spoken words receiving from further device module 252 receiving, from the further device (e.g., a cellular telephone device), audio data derived from (e.g., processed from the actual speech of) one or more words spoken by the particular party (e.g., a user ordering a pizza at an automated order-taking device).

Referring again to FIG. 8D, operation 852 may include operation 854 depicting receiving, from the further device, audio data derived from one or more words spoken by the particular party and detected by the further device. For example, FIG. 2, e.g., FIG. 2D, shows audio data derived from one or more particular party spoken words detected by further device receiving from further device module 254 receiving, from the further device (e.g., a speech receiving module of a home security system installed in each room), audio data derived from one or more words spoken by the particular party (e.g., "unlock the safe in the closet") and detected by the further device (e.g., a speech receiving module of a home security system).

Referring again to FIG. 8D, operation 852 may include operation 856 depicting receiving, from the further device, audio data derived from one or more words spoken by the particular party and recorded by the further device. For example, FIG. 2, e.g., FIG. 2D shows audio data derived from one or more particular party spoken words recorded by further device receiving from further device module 256 receiving, from the further device (e.g., a personal conversation monitoring device), audio data derived from one or more words spoken by the particular party (e.g., speaking the words "twelve blue pens and three legal pads" to an automated office supply dispenser).

Referring again to FIG. 8D, operation 852 may include operation 858 depicting receiving, from the further device, audio data derived by the further device from one or more words spoken by the particular party and detected by the particular device. For example, FIG. 2, e.g., FIG. 2D, shows audio data derived from one or more particular party words detected by particular device receiving from further device module 258 receiving, from the further device (e.g., a GPS navigation device, e.g., GPS navigation device 41), audio data derived by the further device from one or more words spoken by the particular party (e.g., "give me directions to the nearest Five Guys burger shack") and detected by the particular device (e.g., a cellular telephone device).

Figure 9B:
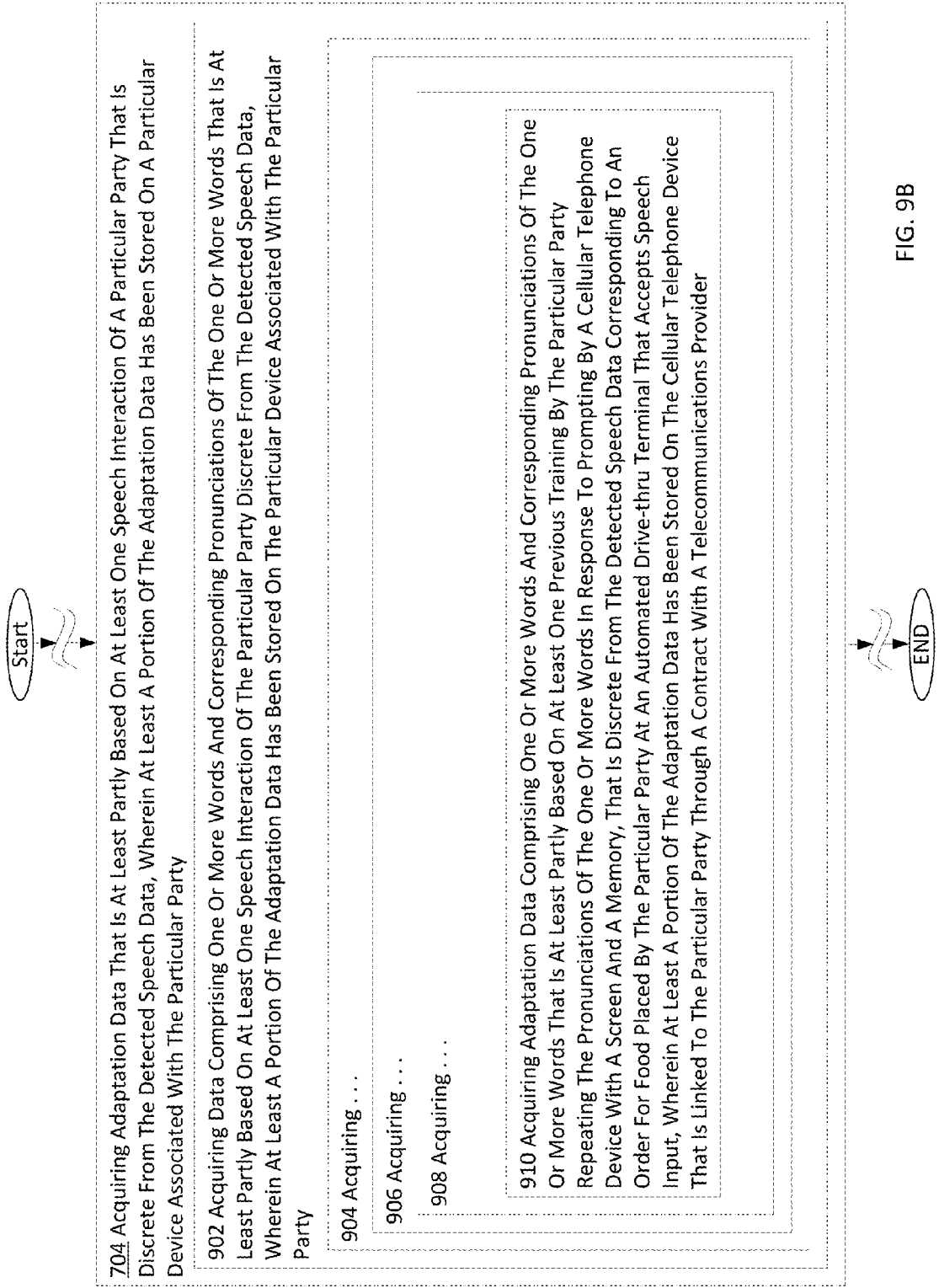
FIG. 9B is a high-level logic flowchart of a process depicting alternate implementations of a receiving adaptation data operation 704 of FIG. 7, according to one or more embodiments.
Figure 9P:
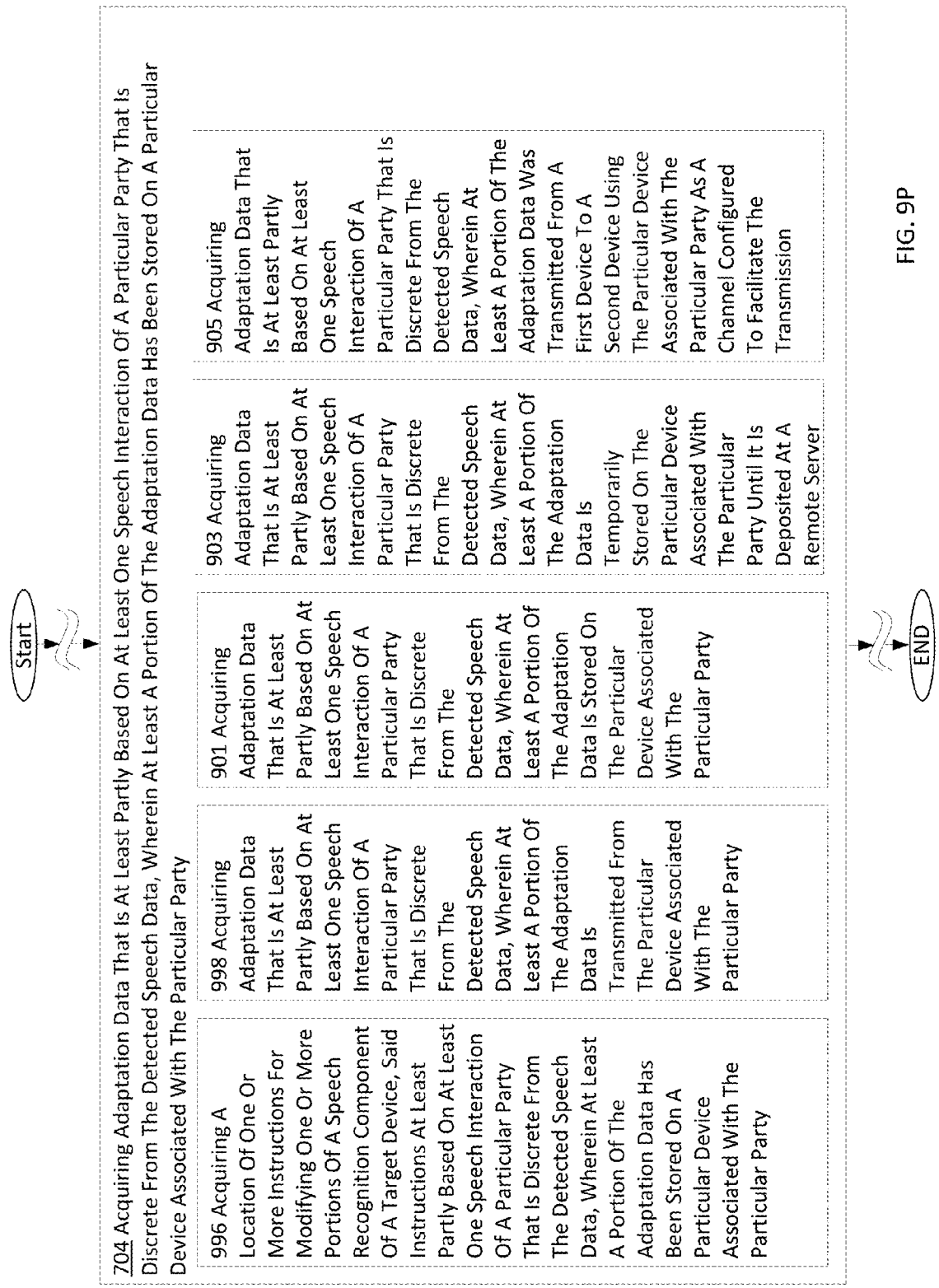
FIG. 9P is a high-level logic flowchart of a process depicting alternate implementations of a receiving adaptation data operation 704 of FIG. 7, according to one or more embodiments.
Figure 9Q:
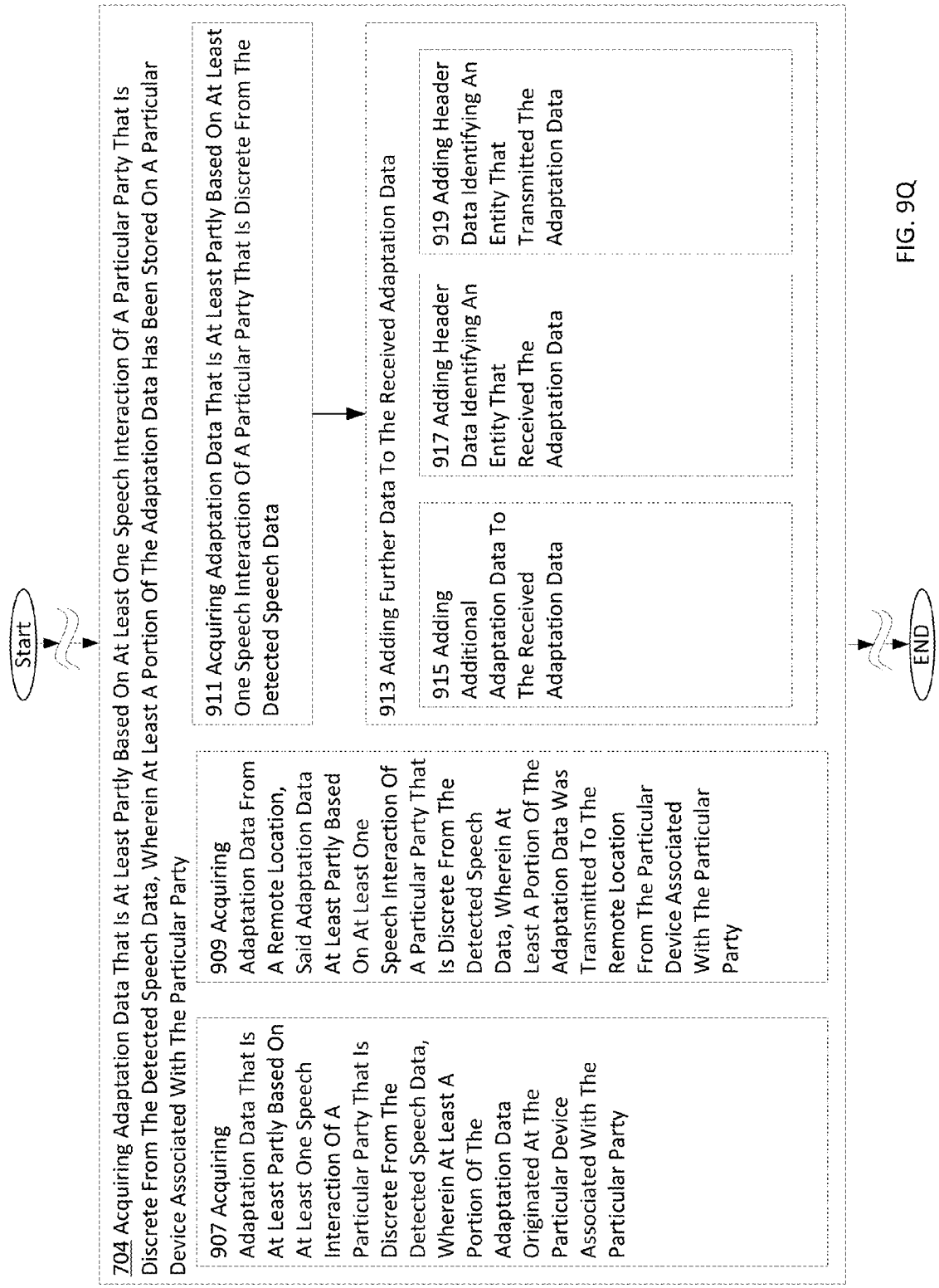
FIG. 9Q is a high-level logic flowchart of a process depicting alternate implementations of a receiving adaptation data operation 704 of FIG. 7, according to one or more embodiments.

FIGS. 9A-9Q depict various implementations of operation 704, according to embodiments. Referring now to FIG. 9A, operation 704 may include operation 902 depicting receiving data comprising one or more words and corresponding pronunciations of the one or more words that is at least partly based on at least one speech interaction of the particular party, said at least one speech interaction of the particular party discrete from the detected speech data, wherein at least a portion of the adaptation data has been stored on the particular device associated with the particular party. For example, FIG. 3, e.g., FIG. 3A, shows adaptation data comprising one or more words and corresponding pronunciations of the one or more words at least partly based on discrete speech interaction of particular party separate from detected speech data, and has been stored on a particular party-associated particular device acquiring module 302 acquiring data comprising one or more words (e.g., "pepperoni," "cheese," and "anchovies") and corresponding pronunciations of the one or more words that is at least partly based on one speech interaction of the particular party (e.g., using a cellular telephone device to order a pizza), said at least one speech interaction of the particular party discrete from the detected speech data (e.g., the user is placing an order at an automated drive-thru window), wherein at least a portion of the adaptation data has been stored on the particular device (e.g., the cellular telephone used to order the pizza) associated with the particular party (e.g., owned by the user).

Referring again to FIG. 9A, operation 902 may include operation 904 depicting receiving data comprising one or more words and corresponding pronunciations of the one or more words that is at least partly based on at least one previous training by the particular party providing the pronunciations of the one or more words in response to prompting, that is discrete from the detected speech data, wherein at least a portion of the adaptation data has been stored on the particular device associated with the particular party. For example, FIG. 3, e.g., FIG. 3A, shows adaptation data comprising one or more words and corresponding pronunciations of the one or more words at least partly based on at least one previous training by the particular party separate from detected speech data, and has been stored on a particular party-associated particular device acquiring module 304 acquiring data comprising one or more words (e.g., "Boston," "Austin," and "flossed") and corresponding pronunciations of the one or more words that is at least partly based on at least one previous training by the particular party providing the pronunciations of the one or more words in response to prompting (e.g., displaying on a computer screen), that is discrete from the detected speech data (e.g., data used in a transaction of buying a train ticket from a speech-enabled automated ticket dispenser), wherein at least a portion of the adaptation data has been stored on the particular device (e.g., a USB device that can also transmit and receive, that was previously inserted into the computer during or after the user's training, and is now carried by the user) associated with the particular party (e.g., the USB device is a necklace, wristband, watch, or pair of eyeglasses that the user is wearing).

Referring again to FIG. 9A, operation 904 may include operation 906 depicting receiving adaptation data comprising one or more words and corresponding pronunciations of the one or more words that is at least partly based on at least one previous training by the particular party repeating the pronunciations of the one or more words in response to prompting by the particular device, that is discrete from the detected speech data corresponding to an order placed by the particular party at an automated drive-thru terminal that accepts speech input, wherein at least a portion of the adaptation data has been stored on the particular device associated with the particular party. For example, FIG. 3, e.g., FIG. 3, shows adaptation data comprising one or more words and corresponding pronunciations of the one or more words at least partly based on at least one previous training by the particular party separate from detected speech data corresponding to an order placed by the particular party at an automated drive-thru terminal that accepts speech input, and has been stored on a particular party-associated particular device acquiring module 306 acquiring adaptation data comprising one or more words (e.g., "national," "first," "bank," "money," and "personal identification number") and corresponding pronunciations of the one or more words that is at least partly based on at least one previous training by the particular party repeating the pronunciations of the one or more words in response to prompting by the particular device (e.g., a custom headset that the user wears and which provides audio prompting to the user through the earphone portion of the headset), that is discrete from the detected speech data corresponding to an order placed by the particular party at an automated drive-thru terminal that accepts speech input, wherein at least a portion of the adaptation data has been stored on the particular device (e.g., the training data was briefly stored at the headset and then transferred to a location within a cloud network) associated with the particular party (e.g., used by the user at one point previously).

Referring again to FIG. 9A, operation 906 may include operation 908 depicting receiving adaptation data comprising one or more words and corresponding pronunciations of the one or more words that is at least partly based on at least one previous training by the particular party repeating the pronunciations of the one or more words in response to prompting by a cellular telephone device with a screen and a memory, that is discrete from the detected speech data corresponding to an order for food placed by the particular party at an automated drive-thru terminal that accepts speech input, wherein at least a portion of the adaptation data has been stored on the cellular telephone device associated with the particular party. For example, FIG. 3, e.g., FIG. 3A, shows adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular party-associated particular device acquiring module 308 acquiring adaptation data comprising one or more words (e.g., "cheeseburger," "small," "medium," and "large") and corresponding pronunciations of the one or more words that is at least partly based on at least one previous training by the particular party repeating the pronunciations of the one or more words in response to prompting by a cellular telephone device with a screen (e.g., user interface 135) and a memory (e.g., memory 134), that is discrete from the detected speech data corresponding to an order for food placed by the particular party at an automated drive-thru terminal that accepts speech input, wherein at least a portion of the adaptation data has been stored on the cellular telephone device associated with the particular party.

Referring now to FIG. 9B, operation 908 (e.g., operations 904, 906, and 908 have been abbreviated for clarity, but are the same as in FIG. 9A) may include operation 910 depicting receiving adaptation data comprising one or more words and corresponding pronunciations of the one or more words that is at least partly based on at least one previous training by the particular party repeating the pronunciations of the one or more words in response to prompting by a cellular telephone device with a screen and a memory, that is discrete from the detected speech data corresponding to an order for food placed by the particular party at an automated drive-thru terminal that accepts speech input, wherein at least a portion of the adaptation data has been stored on the cellular telephone device that is linked to the particular party through a contract with a telecommunications provider. For example, FIG. 3, e.g., FIG. 3A, shows adaptation data comprising one or more words and corresponding pronunciations of the one or more words at least partly based on at least one previous training by the particular party in response to cellular telephone device prompting separate from detected speech data corresponding to an order placed by the particular party at an automated drive-thru terminal that accepts speech input, and has been stored on a particular device linked to the particular party through a contract with a telecommunications provider acquiring module 310 comprising one or more words and corresponding pronunciations (e.g., "money," "yes," "no," and "please repeat that") of the one or more words that is at least partly based on at least one previous training by the particular party repeating the pronunciations of the one or more words in response to prompting by a cellular telephone device with a screen (e.g., user interface 135) and a memory (e.g., memory 134), Referring now to FIG. 9C, operation 704 may include operation 912 depicting receiving adaptation data that is at least partly based on at least one speech interaction of the particular party that occurred that occurred at a different time and a different location than a speech interaction prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party prior to speech interaction generating detected speech data, and has been stored on a particular party-associated particular device receiving module 312 acquiring adaptation data (e.g., a noise level dependent filtration algorithm) that is at least partly based on at least one speech interaction (e.g., giving speech commands to an automated teller machine device at a Jun. 20, 2011 baseball game in Washington, D.C.) of the particular party that occurred at a different time (e.g., Jun. 20, 2011) and a different location (e.g., Washington, D.C.) than a speech interaction prior to a speech interaction that generated the speech adaptation data (e.g., using an automated teller machine at a KISS concert in Philadelphia, Pa., on Nov. 4, 2011), wherein at least a portion of the adaptation data has been stored on a particular device associated with the particular party (e.g., the adaptation data, which usually resides in cloud storage, was transmitted to the user's cellular telephone device, then transmitted to the automated teller machine device).

Referring again to FIG. 9C, operation 704 may include operation 914 depicting acquiring at least a portion of adaptation data that is at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device acquiring module 314 acquiring at least a portion of adaptation data (e.g., an emotion-based pronunciation adjustment algorithm) that is at least partly based on at least one speech interaction of the particular party (e.g., programming a speech-operated microwave oven) that occurred prior to a speech interaction that generated the detected speech data (e.g., programming a PVR to record the "30 Rock" television show), wherein at least a portion of the adaptation data has been stored on a particular device (e.g., in a hard drive on a home computer that is networked to other devices in the house) associated with the particular party (e.g., the home computer is configured to manage the adaptation data for the particular party and to transmit it to personal devices and/or to target devices).

Referring again to FIG. 9C, operation 914 may include operation 916 depicting receiving, from the particular device, adaptation data that is at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device receiving from the particular device module 316 receiving (e.g., a cellular telephone device, e.g., an iPhone, carried by a user, receives), from the particular device (e.g., a programmable universal remote control) adaptation data (e.g., a syllable pronunciation database) that is at least partly based on at least one speech interaction of the particular party (e.g., using speech to enter in "ESPN" and "Comedy Central" as favorite networks into the cable box) that occurred prior to a speech interaction that generated the detected speech data (e.g., the user using speech to command a television to move to a particular channel, e.g., ESPN-2), wherein at least a portion of the adaptation data has been stored on a particular device associated with the particular party (e.g., at least a portion of the syllable pronunciation database) has been stored on the particular device associated with the particular party (e.g., the universal remote control, which has been programmed by the user, and that is configured to store at least a portion of adaptation data).

Referring again to FIG. 9C, operation 916 may include operation 918 depicting receiving, from a memory of the particular device, adaptation data that is at least partly based on at least one speech interaction of the particular party that occurred prior to a speech interaction that generated the detected speech data, wherein the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device receiving directly from the particular device memory module 318 receiving (e.g., a CPU of a tablet device, e.g., an Asus A500 internally receiving from a bus connected to the processor), from a memory of the particular device (e.g., which may be removable memory, e.g., an SD or Micro SD card) or fixed memory (e.g., internal device RAM), adaptation data (e.g., an accent-based pronunciation modification algorithm) that is at least partly based on at least one speech interaction of the particular party (e.g., the user, when driving his Honda Civic motor vehicle commanding that the windows be lowered) that occurred prior to a speech interaction that generated the detected speech data (e.g., after the user trades in a Honda Civic motor vehicle for an Acura TL motor vehicle, the user commands the Acura TL to lower the windows), wherein the adaptation data has been stored on a particular device (e.g., the tablet device, e.g., the Asus A500) associated with the particular party (e.g., is known by the vehicle as associated with a particular party).

Referring now to FIG. 9D, operation 914 may include operation 920 depicting receiving, from a communication network provider, adaptation data that is at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3B, shows adaptation data at least partly based on discrete speech interaction of particular party occurring prior to speech interaction generating detected speech data, and has been stored on a particular party-associated particular device receiving from a communication network provider module 320 receiving (e.g., a cellular telephone device), from a communication provider (e.g., a provider for the cellular telephone device, e.g., AT&T), adaptation data (e.g., instructions for replacing a word frequency table with a modified word frequency table that reflects the particular party's word usage) that is at least partly based on at least one speech interaction of the particular party (e.g., a command given to the cellular phone device of "update calendar to add Mrs. Jones's birthday party on July 19th at 6 pm") that occurred prior to a speech interaction that generated the detected speech data (e.g., a command given to an automated ticket dispensing machine), wherein at least a portion of the adaptation data has been stored on a particular device (e.g., data storing the word frequency of the interactions with the cellular phone device (e.g., one usage each of the words "calendar," "July," "birthday," "party," "nineteenth" and "6 pm") is stored on the cellular telephone device before sending to the communication network provider for aggregation into the modified word frequency table and/or conversion into instructions for replacing the word frequency table with the modified word frequency table).

Referring again to FIG. 9D, operation 920 may include operation 922 depicting receiving, from a communication network provider, adaptation data that is at least partly based on at least one speech interaction of the particular party that occurred prior to a speech interaction that generated the detected speech data, wherein at least a portion of the adaptation data has been stored on the particular device associated with the particular party and previously transmitted to the communication network provider. For example, FIG. 3, e.g., FIG. 3B, shows adaptation data at least partly based on discrete speech interaction of particular party occurring prior to speech interaction generating detected speech data, and has been stored on a particular party-associated particular device and transmitted over the communication network receiving from a communication network provider module 322 receiving, from a communication network provider (e.g., AT&T), adaptation data (e.g., a phoneme pronunciation database) that is at least partly based on at least one speech interaction of the particular party (e.g., placing a food order at an automated walk-thru window (e.g., similar to a drive-thru window, except you walk or conveyor belt ride through)) that occurred prior to a speech interaction that generated the detected speech data (e.g., withdrawing money from a speech-enabled automated teller machine device), wherein at least a portion of the adaptation data (e.g., the phoneme pronunciation database) has been stored on the particular device associated with the particular party and previously transmitted to the communication network provider.

Referring again to FIG. 9D, operation 914 may include operation 924 depicting receiving adaptation data, from a device connected to a same network as a target device to which the detected speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving from a device connected to a same network as a target device to which the detected speech data is directed module 324 receiving adaptation data (e.g., a stochastic state transition network), from a device connected to a same network (e.g., a tablet device connected to a home network via a router) as a target device (e.g., a safe in a home that responds to speech commands and is connected to the home network) to which the detected speech data is directed (e.g., it is determined, e.g., by the tablet, that the detected speech is intended for the tablet device), said adaptation data at least partly based on at least one speech interaction of the particular party (e.g., the user's previous interaction with other portions of the home security system, and the user's previous interactions with a speech- and network-enabled coffee maker) that occurred prior to a speech interaction that generated the detected speech data (e.g., the user programming the safe with the code phrase that will unlock one section of the safe), wherein at least a portion of the adaptation data has been stored on the particular device (e.g., the tablet device) associated with the particular party (e.g., owned by the user).

Referring again to FIG. 9D, operation 914 may include operation 926 depicting retrieving adaptation data in response to reception of the speech data, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to reception of speech data module 326 retrieving adaptation data (e.g., an office assistant device carried by employees (e.g., that might double as a security badge/access card for certain areas) receives adaptation data when it receives the speech data from the user) in response to reception of the speech data (e.g., in response to the user speaking a command to a piece of office equipment, e.g., a copier, a vending machine, or an automated security checkpoint), said adaptation data (e.g., a speech disfluency detection algorithm) at least partly based on at least one speech interaction of the particular party (e.g., training of the particular party's speech that happened at the beginning of her employment, e.g., at new employee orientation) that occurred prior to a speech interaction that generated the detected speech data (e.g., speaking a particular code phrase to an additional security lock to access a limited-access portion of a company, e.g., a document retention room where confidential, protected, or limited access, e.g., medical, records are kept), wherein at least a portion of the adaptation data (e.g., a speech disfluency detection algorithm) has been stored on the particular device (e.g., the office assistant device) associated with the particular party.

Referring now to FIG. 9E, operation 704 may include operation 928 depicting receiving adaptation data in response to a detection of a particular condition, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to condition module 320 acquiring adaptation data (e.g., retrieving, from a cloud storage service, a context-based repaired utterance processing matrix) in response to a detection of a particular condition (e.g., in response to detecting a broadcasting signal being sent from a target device indicating that the target device (e.g., an automated fast food drive-thru window) is configured to receive adaptation data and use the adaptation data in speech processing), said adaptation data at least partly based on at least one speech interaction of the particular party that occurred prior to a speech interaction that generated the detected speech data (e.g., the particular party ordering a #6 combo meal at a popular fast food restaurant), wherein at least a portion of the particular data has been stored on the particular device associated with the particular party (e.g., at times when the particular party requests the adaptation data from the cloud storage service, it is temporarily stored on the particular device before being passed along to the target device).

Referring again to FIG. 9E, operation 928 may include operation 930 depicting receiving adaptation data in response to the particular party interacting with a target device to which the speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to the particular party interacting with a target device module 330 acquiring adaptation data (e.g., a nonlexical vocable removal algorithm) in response to the particular party interacting (e.g., pushing a button on) with a target device (e.g., a speech-enabled automated teller machine device) to which the speech data is directed (e.g., the user is speaking to the speech-enabled automated teller machine device), said adaptation data at least partly based on at least one speech interaction of the particular party (e.g., one or more previous interactions with other automated teller machine devices) that occurred prior to a speech interaction that generated the detected speech data (e.g., the user commanding the automated teller machine device to dispense two hundred dollars in cash from the user's savings account), wherein at least a portion of the adaptation data has been stored on the particular device (e.g., transmit, store, and receive-enabled eyeglasses) associated with the particular party (e.g., being worn by the user).

Referring again to FIG. 9E, operation 930 may include operation 932 depicting receiving adaptation data in response to the particular party inserting a key into a motor vehicle to which the speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3C, shows adaptation data at least partly based on discrete speech interaction of particular party occurring prior to speech interaction generating detected speech data, and has been stored on a particular party-associated particular device receiving in response to the particular party inserting a key into a motor vehicle interacting with a target device module 332 acquiring adaptation data (e.g., a set of proper noun pronunciations, e.g., names of hamburger joints) in response to the particular party inserting a key into a motor vehicle to which the speech data is directed (e.g., the speech data is a command "give me directions to Beastly Burger hamburger joint"), wherein at least a portion of the adaptation data has been stored on the particular device (e.g., the particular device could be the key itself, if the key is configured to store, transmit, and receive data, or the particular device could be the user's smartphone, e.g., the particular device does not necessarily need to be the device (e.g., the key) that triggers the acquisition of adaptation data).

Referring again to FIG. 9E, operation 930 may include operation 934 depicting receiving adaptation data in response to the particular party executing a program on a computing device to which the speech data is directed, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3D, shows adaptation data at least partly based on discrete speech interaction of particular party occurring prior to speech interaction generating detected speech data, and has been stored on a particular party-associated particular device receiving in response to the particular party executing a program on a computing device module 334 acquiring adaptation data (e.g., a part-of-speech labeling algorithm) in response to the particular party executing a program on a computing device (e.g., a word processing program) to which speech data is directed, that is configured to receive dictation of documents), said adaptation data at least partly based on at least one speech interaction of the particular party (e.g., previous dictations of documents into a different word processing program on a different computer) that occurred prior to a speech interaction that generated the detected speech data (e.g., the speech data that will be generated by the user's dictation), wherein at least a portion of the adaptation data has been stored on the particular device (e.g., a USB key that is owned by the user and that stores her adaptation data along with other information) associated with the particular party (e.g., owned by the user).

Referring now to FIG. 9F, operation 928 may include operation 936 depicting receiving adaptation data in response to a detection of the particular party at a particular location, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3D shows adaptation data at least partly based on discrete speech interaction of particular party occurring prior to speech interaction generating detected speech data, and has been stored on a particular party-associated particular device receiving in response to detection of the particular party at a particular location module 336 acquiring adaptation data in response to a detection of the particular party at a particular location (e.g., within two feet of a target device, e.g., an automated airline ticket dispensing counter), said adaptation data at least partly based on at least one speech interaction of the particular party that occurred prior to a speech interaction that generated the detected speech data (e.g., speaking the name of the destination of the user's airline ticket), wherein at least a portion of the adaptation data (e.g., a French language substitution algorithm) has been stored on the particular device (e.g., a smartphone with GPS sensors) associated with the particular party (e.g., carried by the user).

Referring again to FIG. 9F, operation 928 may include operation 938 depicting receiving adaptation data in response to a detection of the particular party within a particular proximity of a target device, said adaptation data at least partly based on at least one speech interaction of the particular party that occurred prior to a speech interaction that generated the detected speech data, wherein at least a portion of the adaptation data has been stored on the particular device associated with the particular party. For example, FIG. 3, e.g., FIG. 3D, shows adaptation data at least partly based on discrete speech interaction of particular party occurring prior to speech interaction generating detected speech data, and has been stored on a particular party-associated particular device receiving in response to detection of the particular party within a particular proximity of a target device module 338 acquiring adaptation data (e.g., an utterance ignoring algorithm) in response to a detection of the particular party (e.g., the user) within a particular proximity of a target device (e.g., the particular device acquires the adaptation data from a cloud storage service when it receives a signal from the target device that the target device (e.g., an automated drink dispensing device) detected the particular party was within screen-viewing distance of the automated drive-thru window), said adaptation data at least partly based on at least one speech interaction of the particular party (e.g., the particular party dictating a memorandum to speech-enabled word processing that is stored on a cloud) that occurred prior to a speech interaction that generated the detected speech data (e.g., ordering a cherry-and-chocolate twisted lime soda drink), wherein at least a portion of the adaptation data has been stored on the particular device (e.g., a "smart wallet" that, in addition to holding cash and credit cards, also can store, transmit, and receive adaptation data, and that acquires the adaptation data when it learns that a particular party is within proximity to a particular type of target device) associated with the particular party (e.g., carried by the particular party and configured to store, at least temporarily, the particular party's adaptation data).

Referring now to FIG. 9G, operation 704 may include operation 940 depicting receiving adaptation data from a further device, said adaptation data at least partly based on at least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device module 340 acquiring adaptation data, from a further device (e.g., from a cellular telephone device), said adaptation data at least partly based on at least one speech interaction of the particular party (e.g., previous commands given to a navigation device requesting directions) that is discrete from the detected speech data (e.g., requesting directions to Big Boy Pizza), wherein at least a portion of the adaptation data has been stored on the particular device (e.g., a smart key inserted into a vehicle that can store, transmit, and receive adaptation data) associated with the particular party (e.g., the driver of a car that has both onboard navigation and a personal GPS navigation system removably mounted to the windshield).

Referring again to FIG. 9G, operation 940 may include operation 942 depicting receiving adaptation data from a further device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data originating at further device and at least partly based on discrete speech interaction of particular party separate from detected speech data, and has been stored on a particular party-associated particular device acquiring from a further device module 342 acquiring adaptation data from a further device (e.g., an office personal device, which may be owned by the company that the user works for, and stores at least a portion, or a version of the adaptation data), said adaptation data originating at the further device (e.g., the adaptation data is stored on the further device once and then transmitted from there; e.g., the further device does not receive the adaptation data from another source on demand) and at least partly based on at least one speech interaction of the particular party that is discrete from the detected speech data (e.g., operating a piece of machinery used in that field that responds to speech commands), wherein at least a portion of the adaptation data has been stored on the particular device associated with the particular party (e.g., the adaptation data is transferred from a further device to a particular device (e.g., the user's cellular telephone, which may perform additional modifications, or may transmit it as is to the target device, e.g., the piece of machinery).

Referring again to FIG. 9G, operation 940 may include operation 944 depicting receiving adaptation data from a further device related to the particular device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device related to the particular device module 944 acquiring adaptation data from a further device (e.g., a desktop computer that stores adaptation data for a user, e.g., or for the user's entire family) related to (e.g., both the particular device and the further device have a login saved for the user) the particular device (e.g., a cellular telephone device), said adaptation data originating at the further device (e.g., the adaptation data is stored at the further device and transmitted to the particular device over a network, e.g., a Wi-Fi network) and at least partly based on at least one speech interaction of the particular party that is discrete from the detected speech data (e.g., speech-programming a convection oven, wherein the convection oven isn't connected by Wi-Fi but does have a Bluetooth connection and the cellular telephone device, as the particular device, acquires the adaptation data from the desktop computer via Wi-Fi, and relays the adaptation data to the convection oven via Bluetooth), wherein at least a portion of the adaptation data has been stored on the particular device (e.g., the adaptation data is stored on the cellular telephone device, at least temporarily, as it is received over Wi-Fi and transmitted over Bluetooth) associated with the particular party.

Referring again to FIG. 9G, operation 944 may include operation 946 depicting receiving adaptation data from a further device associated with the particular party, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device associated with the particular party module 946 acquiring adaptation data from a further device associated with the particular party (e.g., a customized gaming controller that the user, e.g., the player, brings to use in various guest video game systems as well as her own), said adaptation data originating at the further device (e.g., the adaptation data is stored on the further device and derived from interactions of the player with the game system using speech) and at least partly based on at least one speech interaction of the particular party (e.g., giving voice commands in a first-person shooter game) that is discrete from the detected speech data (e.g., giving voice commands in an online soccer game), wherein at least a portion of the adaptation data has been stored on the particular device (e.g., a headset used by the player that pulls adaptation data from the particular party, and either passes the adaptation data to the target device, modifies the adaptation data, or performs some amount of processing on the speech data received through the microphone of the headset) associated with the particular party.

Referring again to FIG. 9G, operation 944 may include operation 948 depicting receiving adaptation data from a further device in communication with the particular device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device in communication with the particular device module 348 acquiring adaptation data from a further device (e.g., a tablet device, e.g., an iPad) in communication with (e.g., operating on a same network, whether through 3G or Wi-Fi communication) the particular device (e.g., a cellular device, e.g., an iPhone), said adaptation data originating at the further device (e.g., the adaptation data is stored and maintained on the iPad) and at least partly based on at least one speech interaction of the particular party (e.g., conversations that occurred more than two days ago) that is discrete from the detected speech data (e.g., speech from the user buying a train ticket from an automated train ticket dispensing device), wherein at least a portion of the adaptation data has been stored on the particular device (e.g., the iPhone receives the adaptation data from the iPad, and determines if any speech interactions have occurred in the last two days that would result in changing the adaptation data, and, if so, modifies the adaptation data, before sending the adaptation data to the target device, e.g., the automated train ticket dispensing device) associated with the particular party (e.g., the user).

Referring now to FIG. 9H, operation 944 may include operation 950 depicting receiving adaptation data from a further device that is at least partially controlled by the particular device, said adaptation data originating at the further device and at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device at least partially controlled by the particular device module 350 acquiring adaptation data from a further device (e.g., a laptop computer plugged into a network) that is at least partially controlled (e.g., has been set up so that portable devices can access its files and execute limited commands on it) by the particular device (e.g., a tablet device, e.g., an Apple iPad), said adaptation data originating at the further device and at least partly based on at least one speech interaction of the particular party (e.g., the user programming a convection oven) that is discrete from the detected speech data (e.g., the user programming a microwave oven), wherein at least a portion of the adaptation data (e.g., an utterance ignoring algorithm) has been stored on the particular device (e.g., the Apple iPad) associated with the particular party (e.g., carried by the particular party).

Referring again to FIG. 9H, operation 940 may include operation 952 depicting receiving adaptation data from a further device, said adaptation data received by the further device from the particular device, and said adaptation data at least partly based on least one speech interaction of the particular party that is discrete from the detected speech data, wherein at least a portion of the adaptation data has been stored on the particular device associated with the particular party. For example, FIG. 3, e.g., FIG. 3E, shows adaptation data at least partly based on discrete speech interaction of particular party separate from detected speech data, and has been stored on a particular party-associated particular device acquiring from a further device that received the adaptation data from the particular device module 352 acquiring adaptation data (e.g., an uncommon word pronunciation guide), said adaptation data received by the further device (e.g., a portable personal navigation system device) from the particular device (e.g., a user's cellular telephone), and said adaptation data at least partly based on at least one speech interaction of the particular party (e.g., the user giving commands into his cellular telephone to add contact information) that is discrete from the detected speech data (e.g., a request to lower the windows of the motor vehicle), wherein at least a portion of the adaptation data (e.g., at least one word of the uncommon word pronunciation guide) has been stored on the particular device associated with the particular party (e.g., the user).

Referring now to FIG. 9I, operation 940 may include operation 954 depicting receiving adaptation data, from a further device, said adaptation data comprising instructions for modifying a pronunciation dictionary, and said adaptation data at least partly based on at least one speech interaction of the particular party that is discrete from the detected speech data, wherein at least a portion of the adaptation data has been stored on the particular device associated with the particular party. For example, FIG. 3, e.g., FIG. 3F shows adaptation data comprising instructions for modifying a pronunciation dictionary, said adaptation data at least partly based on discrete speech interaction of particular party separate from detected speech data, and has been stored on a particular party-associated particular device acquiring from a further device module 354 acquiring adaptation data, from a further device (e.g., a personal navigation system device), said adaptation data comprising instructions for modifying a pronunciation dictionary, and said adaptation data at least partly based on at least one speech interaction of the particular party (e.g., requesting directions to the nearest emergency room) that is discrete from the detected speech data (e.g., requesting instructions to the nearest pizza parlor), wherein at least a portion of the adaptation data has been stored on the particular device (e.g., a cellular telephone with GPS positioning enabled) associated with the particular party.

Referring again to FIG. 9I, operation 954 may include operation 956 depicting receiving adaptation data, from a further device, said adaptation data comprising a first instruction for modifying the pronunciation dictionary based on a first speech interaction of the particular party and a second instruction for modifying the pronunciation dictionary based on a second speech interaction of the particular party, and said adaptation data is at least partly based on at least one speech interaction of the particular party that is discrete from the detected speech data, wherein at least a portion of the adaptation data has been stored on the particular device associated with the particular party. For example, FIG. 3, e.g., FIG. 3F, shows adaptation data comprising a first instruction for modifying a pronunciation dictionary based on a first particular party interaction and a second instruction for modifying a pronunciation dictionary based on a second particular party interaction, and has been stored on a particular party-associated particular device acquiring from a further device module 356 acquiring adaptation data, from a further device (e.g., a tablet device, e.g., a Samsung Galaxy Tab), said adaptation data comprising a first instruction for modifying the pronunciation dictionary (e.g., "modify a pronunciation of the word 'twenty'") based on a first speech interaction of the particular party (e.g., the user withdrawing two hundred dollars and requesting twenty dollar bills from an automated teller machine device that accepts speech input) and a second instruction for modifying the pronunciation dictionary (e.g., "modify a pronunciation of the word 'hamburger'") based on a second speech interaction of the particular party (e.g., the user placing a lunch order for a hamburger and french fries with an automated drive thru window), and said adaptation data is at least partly based on at least one speech interaction of the particular party (e.g., the user withdrawing two hundred dollars and requesting twenty dollar bills from an automated teller machine device that accepts speech input and/or the user placing a lunch order for a hamburger and French fries) that is discrete from the detected speech data (e.g., giving a speech command to an automated ticket taking device), wherein at least a portion of the adaptation data has been stored on the particular device (e.g., a cellular telephone device that originally transmitted the adaptation data to the tablet) associated with the particular party (e.g., owned by the user).

Referring again to FIG. 9I, operation 956 may include operation 958 depicting receiving adaptation data, from a further device, said adaptation data comprising a first instruction for modifying the pronunciation dictionary based on a first speech interaction of the particular party and a second instruction for modifying the pronunciation dictionary based on a second speech interaction of the particular party, and said adaptation data is at least partly based on at least one speech interaction of the particular party that is discrete from the detected speech data, wherein the first instruction for modifying the pronunciation data has been stored on the particular device associated with the particular party. For example, FIG. 3, e.g., FIG. 3F, shows adaptation data comprising a first instruction for modifying a pronunciation dictionary based on a first particular party interaction and a second instruction for modifying a pronunciation dictionary based on a second particular party interaction, said first instruction has been stored on a particular party-associated particular device acquiring from a further device module 358 acquiring adaptation data, from a further device (e.g., a tablet device, e.g., a Samsung Galaxy Tab), said adaptation data comprising a first instruction for modifying the pronunciation dictionary (e.g., "modify a pronunciation of the word 'twenty'") based on a first speech interaction of the particular party (e.g., the user withdrawing two hundred dollars and requesting twenty dollar bills from an automated teller machine device that accepts speech input) and a second instruction for modifying the pronunciation dictionary (e.g., "modify a pronunciation of the word 'hamburger'") based on a second speech interaction of the particular party (e.g., the user placing a lunch order for a hamburger and french fries with an automated drive thru window), and said adaptation data is at least partly based on at least one speech interaction of the particular party (e.g., the user withdrawing two hundred dollars and requesting twenty dollar bills from an automated teller machine device that accepts speech input and/or the user placing a lunch order for a hamburger and French fries) that is discrete from the detected speech data (e.g., giving a speech command to an automated ticket taking device), wherein the first instruction for modifying the pronunciation data has been stored on the particular device (e.g., a cellular telephone device that originally transmitted at least that portion of the adaptation data to the tablet) associated with the particular party (e.g., associated to the user with a service contract through a communication network provider).

Referring now to FIG. 9J, operation 704 may include operation 960 depicting generating adaptation data that is at least partly based on at least one speech interaction of the particular party that is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party separate from detected speech data, and has been stored on a particular party-associated particular device generating module 360 generating (e.g., creating, modifying, adapting, calculating, developing, evolving, or constructing) adaptation data (e.g., a latent dialogue act matrix)

Referring again to FIG. 9J, operation 704 may include operation 962 depicting retrieving adaptation data that is at least partly based on at least one speech interaction of the particular party that is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party separate from detected speech data, and has been stored on a particular party-associated particular device retrieving module 362 retrieving (e.g., requesting and receiving, obtaining, gathering, getting, fetching, and/or procuring) adaptation data (e.g., speech disfluency detection algorithm) that is at least partly based on at least one speech interaction (e.g., dictating a memorandum using Dragon speech software with a headset) of the particular party that is discrete from the detected speech data (e.g., ordering an ice cream cone with chocolate sprinkles from an automated ice cream dispenser), wherein at least a portion of the adaptation data has been stored on the particular device (e.g., a modified USB key that stores adaptation data, that was plugged into the computer when the memorandum was dictated, thereby retrieving the data) and, at the time of the speech interaction with the automated ice cream dispenser, is communicating with the automated ice cream dispenser, either by being directly plugged into the automated ice cream dispenser, or by being plugged into a tablet device carried by the user, where the tablet device retrieves the adaptation data and transmits it to the automated ice cream dispenser).

Referring again to FIG. 9J, operation 704 may include operation 964 depicting receiving adaptation data that is at least partly based on at least one speech interaction of the particular party with a particular type of device, said at least one speech interaction discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with particular type of device separate from detected speech data, and has been stored on a particular party-associated particular device acquiring module 364 acquiring (e.g., retrieving from memory) adaptation data (e.g., a word and/or syllable dependency parser) that is at least partly based on at least one speech interaction of the particular party with a particular type of device (e.g., a Sony-branded home entertainment product, e.g., a television, Blu-Ray player, home theater system, etc.), said at least one speech interaction discrete from the detected speech data (e.g., an interaction with a brand new Sony-manufactured television), wherein at least a portion of the adaptation data (e.g., the word and/or syllable dependency parser) has been stored on the particular device (e.g., a cellular telephone device with an app designed by Sony configured to filter adaptation data) associated with the particular party (e.g., owned by the particular party).

Referring again to FIG. 9J, operation 964 may include operation 966 depicting receiving adaptation data that is at least partly based on at least one speech interaction of the particular party with the particular type of device that is a same type of device as a target device configured to receive the speech data, said at least one speech interaction discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device of same type as target device configured to receive speech data, said discrete interaction separate from detected speech data, and has been stored on a particular party-associated particular device acquiring module 366 acquiring adaptation data (e.g., a syllable pronunciation database) that is at least partly based on at least one speech interaction of the particular party (e.g., ordering a particular type and flavor of soda from an automated drink dispensing machine, e.g., "cherry diet Coke with a twist of vanilla") with the particular type of device (e.g., automated food dispensing machines) that is a same type of device as a target device (e.g., an automated ice cream dispenser) configured to receive the speech data (e.g., the particular party ordering a "double scoop of vanilla with nuts, chocolate sprinkles, and chocolate syrup"), said at least one speech interaction discrete from the detected speech data, wherein at least a portion of the adaptation data (e.g., the syllable pronunciation database) has been stored on the particular device (e.g., a "food preference smartcard" that can store, receive, and transmit data, and that a child can carry with him or her, and that also may be configured to prevent the child from ordering food that he or she is allergic to) associated with the particular party (e.g., carried by the user, e.g., the particular party).

Referring again to FIG. 9J, operation 964 may include operation 968 depicting receiving adaptation data that is at least partly based on at least one speech interaction of the particular party with a device that has at least one characteristic in common with a target device that is configured to receive the speech data, said at least one speech interaction is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device having particular characteristic separate from detected speech data, and has been stored on a particular party-associated particular device acquiring module 368 acquiring adaptation data (e.g., a syllable pronunciation database) that is at least partly based on at least one speech interaction of the particular party (e.g., inputting a playlist via speech) with a device (e.g., a media player) that has at least one characteristic in common (e.g., an ability to play music files) with a target device that is configured to receive the speech data (e.g., a speech-enabled clock radio that plays music files), said at least one speech interaction is discrete from the detected speech data, wherein at least a portion of the adaptation data (e.g., the syllable pronunciation database) has been stored on the particular device (e.g., the user's cellular telephone device) associated with the particular party.

Referring now to FIG. 9K, operation 968 depicting operation 970 depicting receiving adaptation data that is at least partly based on at least one speech interaction of the particular party with a device that communicates on a same type of communication network as the target device that is configured to receive the speech data, said at least one speech interaction is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device communicating on a same communication network as target device and separate from detected speech data, and has been stored on a particular party-associated particular device acquiring module 370 acquiring adaptation data (e.g., a context-based repaired utterance processing matrix) that is at least partly based on at least one speech interaction of the particular party (e.g., a speech interaction with the user commanding an office photocopier) with a device (e.g., the office photocopier) that communicates on a same type of communication network (e.g., local area network, as opposed to 4G LTE, or Bluetooth) as the target device that is configured to receive the speech data (e.g., an office computer), said at least one speech interaction is discrete from the detected speech data (e.g., dictating a memorandum to the office computer), wherein at least a portion of the adaptation data has been stored on the particular device (e.g., an office-issued device that can transmit, store, and receive adaptation data, e.g., an advanced keycard) associated with the particular party.

Referring again to FIG. 9K, operation 968 may include operation 972 depicting receiving adaptation data that is at least partly based on at least one speech interaction of the particular party with a device that is configured to carry out a similar function as the target device that is configured to receive the speech data, said at least one speech interaction is discrete from the detected speech data, wherein at least a portion of the adaptation data has been stored on the particular device associated with the particular party. For example, FIG. 3, e.g., FIG. 3G, shows adaptation data at least partly based on discrete speech interaction of particular party with device configured to carry out a same function as the target device and separate from detected speech data, and has been stored on a particular party-associated particular device acquiring module 372 acquiring adaptation data (e.g., a regional dialect application algorithm) that is at least partly based on at least one speech interaction of the particular party with a device (e.g., a portable navigation system) that is configured to carry out a similar function as the target device (e.g., an onboard navigation system in a motor vehicle) that is configured to receive the speech data (e.g., requesting directions on how to get home from the present location), said at least one speech interaction is discrete from the detected speech data (e.g., because the interactions are with two similar, but different devices), wherein at least a portion of the adaptation data has been stored on the particular device (e.g., a cellular telephone device).

Referring now to FIG. 9L, operation 968 may include operation 974 depicting receiving adaptation data that is at least partly based on at least one speech interaction of the particular party with a type of device that accepts a same type of input as the target device that is configured to receive the speech data, said at least one speech interaction is discrete from the detected speech data, wherein at least a portion of the adaptation data has been stored on the particular device associated with the particular party. For example, FIG. 3, e.g., FIG. 3H, shows adaptation data at least partly based on discrete speech interaction of particular party with device configured to accept a same type of input as the target device and separate from detected speech data, and has been stored on a particular party-associated particular device acquiring module 374 acquiring adaptation data that is at least partly based on at least one speech interaction of the particular party (e.g., ordering food at an automated drive-thru window) with a type of device (e.g., an automated ordering window) that accepts a same type of input (e.g., food orders) as the target device (e.g., an automated terminal inside a restaurant that gives out more detail about a menu option in response to a speech prompt) that is configured to receive the speech data (e.g., a request to know more about the Kobe beef entrée), said at least one speech interaction is discrete from the detected speech data, wherein at least a portion of the adaptation data has been stored on the particular device (e.g., a user's tablet device) associated with the particular party (e.g., owned by the user).

Referring now to FIG. 9M, operation 704 may include operation 976 depicting receiving adaptation data that is at least partly based on at least one speech interaction of the particular party with the particular device, said at least one speech interaction is discrete from the detected speech data, wherein at least a portion of the adaptation data has been stored on the particular device associated with the particular party. For example, FIG. 3, e.g., FIG. 3H, shows adaptation data at least partly based on discrete speech interaction of particular party with particular device separate from detected speech data, and has been stored on a particular party-associated particular device acquiring module 376 acquiring adaptation data (e.g., a list of the way that the particular party pronounces ten words) that is at least partly based on at least one speech interaction of the particular party (e.g., the user giving commands to play a particular game to a headset that also can transmit and receive adaptation data to and from a video game system) with the particular device (e.g., the headset), said at least one speech interaction is discrete from the detected speech data (e.g., giving an automated command to the video game system in a first person shooter, e.g., "arm the machine gun"), wherein at least a portion of the adaptation data has been stored on the particular device (e.g., the headset) associated with the particular party (e.g., has been set up for use with the user).

Referring again to FIG. 9M, operation 976 may include operation 978 depicting receiving adaptation data that is at least partly based on at least one speech interaction of the particular party with a cellular telephone device, said at least one speech interaction is discrete from the detected speech data, wherein at least a portion of the adaptation data has been stored on the cellular telephone device associated with the particular party. For example, FIG. 3, e.g., FIG. 3H, shows adaptation data at least partly based on discrete speech interaction of particular party with cellular telephone device separate from detected speech data, and has been stored on a particular party-associated cellular telephone device acquiring module 378 acquiring adaptation data (e.g., instructions for replacing a word frequency table with a modified word frequency table that reflects the particular party's word usage) that is at least partly based on at least one speech interaction of the particular party (e.g., the user) with a cellular telephone device (e.g., playing a word-fill-in based game using speech, which game is designed to also generate training data), said at least one speech interaction is discrete from the detected speech data (e.g., interacting with an automated drive-thru window), wherein at least a portion of the adaptation data has been stored on the cellular telephone device associated with the particular party.

Referring again to FIG. 9M, operation 978 may include operation 980 depicting receiving adaptation data that is at least partly based on at least one telephone conversation carried out using the cellular telephone device, said at least one telephone conversation is different than speech that is part of the detected speech data, wherein at least a portion of the adaptation data has been stored on the cellular telephone device associated with the particular party. For example, FIG. 3, e.g., FIG. 3H, shows adaptation data at least partly based on particular party telephone conversation carried out using cellular telephone device separate from detected speech data, and has been stored on a particular party-associated cellular telephone acquiring module 380 acquiring adaptation data (e.g., a phrase completion algorithm) that is at least partly based on at least one telephone conversation carried out using the cellular telephone device, said at least one telephone conversation is different than speech that is part of the detected speech data (e.g., dictating a memorandum to a speech-enabled computer that also is configured to communicate with the cellular telephone device), wherein at least a portion of the adaptation data has been stored on the cellular telephone device associated with the particular party (e.g., the particular party has a service contract with a communication network provider that sold the cellular telephone device to the user at a discount based on the service contract).

Referring again to FIG. 9M, operation 980 may include operation 982 depicting receiving adaptation data that is at least partly based on at least one speech instruction given to the cellular telephone device by the particular party, said at least one speech instruction different from the detected speech data, wherein at least a portion of the adaptation data has been stored on the particular device associated with the particular party. For example, FIG. 3, e.g., FIG. 3H, shows adaptation data at least partly based on particular party speech command given to cellular telephone device separate from detected speech data, and has been stored on a particular party-associated cellular telephone acquiring module 382 acquiring adaptation data (e.g., a basic pronunciation adjustment algorithm) that is at least partly based on at least one speech instruction given to the cellular telephone device by the particular party (e.g., dictating a text message to be sent to Jenny and Rob), said at least one speech instruction different from the detected speech data, wherein at least a portion of the adaptation data has been stored on the particular device associated with the particular party.

Referring now to FIG. 9N, operation 704 may include operation 984 depicting receiving adaptation data that is at least partly based on at least one speech interaction of the particular party that used one or more same utterances as speech used in the detected speech data, said one or more same utterances spoken to a different device than a target device to which the detected speech data is directed. For example, FIG. 3, e.g., FIG. 3I shows adaptation data at least partly based on discrete speech interaction of particular party separate from detected speech data and using same utterance as speech that is part of speech data, and has been stored on a particular party-associated particular device acquiring module 384 acquiring adaptation data (e.g., an emotion-based pronunciation adjustment algorithm) that is at least partly based on at least one speech interaction of the particular party (e.g., using voice commands to operate a motor vehicle control system) that used one or more same utterances (e.g., spoke one or more of the same words, e.g., "music," "play," "MP3," and "CD Number Four") spoken to a different device (e.g., the motor vehicle control system) than a target device to which the detected speech data is directed (e.g., a home media player).

Referring again to FIG. 9N, operation 704 may include operation 986 depicting receiving adaptation data that is at least partly based on at least one speech interaction of the particular party that used one or more same utterances, said one or more same utterances spoken at a different time than speech used in the detected speech data. For example, FIG. 3, e.g., FIG. 3I, shows adaptation data at least partly based on discrete speech interaction of particular party and using same utterance as speech that is part of speech data at a different time than speech that is part of the speech data acquiring module 386 acquiring adaptation data (e.g., a sentence diagramming path selection algorithm) that is at least partly based on at least one speech interaction of the particular party (e.g., a player of a speech-controlled video game system playing a soccer game) that used one or more same utterances (e.g., "kick," "run," jump," "control player two"), said one or more same utterances spoken at a different time (e.g., while playing a different game) than speech used in the detected speech data (e.g., the player playing a new soccer game at a different time).

Referring again to FIG. 9N, operation 704 may include operation 988 depicting acquiring a phoneme database based on one or more pronunciations by the particular party that are discrete from the detected speech data, wherein at least one entry of the phoneme database has been stored on a particular device associated with the particular party. For example, FIG. 3, e.g., FIG. 3I, shows adaptation data comprising a phoneme dictionary based on one or more particular party pronunciations, such that at least one entry has been stored on a particular party-associated particular device acquiring module 388 acquiring a phoneme database based on one or more pronunciations by the particular party (e.g., pronunciations given while a driver is giving commands to a motor vehicle control system to raise the volume on the stereo, open the sunroof, lower the windows, brighten the interior lights, and stop using the overdrive mode, because the driver is going to start driving fast while listening to loud music) that are discrete from the detected speech data (e.g., the driver, having wrecked his vehicle, now is using the onboard automated help system to call for help and describe his situation), wherein at least one entry of the phoneme database has been stored on a particular device (e.g., a smart key that is used to activate the car and store the phoneme database for that particular driver, so that a different driver would use a different key and the vehicle would have a different phoneme database for the different driver) associated with the particular party (e.g., it stores adaptation data that is based at least in part on speech from the driver).

Referring again to FIG. 9N, operation 704 may include operation 990 depicting acquiring a sentence diagramming path selection algorithm based on at least one speech interaction of the particular party that is discrete from the detected speech data, wherein at least a portion of the adaptation data has been stored on a particular device associated with the particular party. For example, FIG. 3, e.g., FIG. 3I, shows adaptation data comprising a sentence diagramming path selection algorithm based on one or more particular party pronunciations, and has been stored on a particular party-associated particular device acquiring module 390 acquiring a sentence diagramming path selection algorithm based on at least one speech interaction of the particular party (e.g., programming, using speech commands, favorite channels on an old television made by a particular manufacturer, e.g., Samsung) that is discrete from the detected speech data (e.g., programming, using speech commands, favorite channels on a new flat screen plasma television made by a different manufacturer, e.g., Panasonic), wherein at least a portion of the adaptation data has been stored on a particular device (e.g., a universal remote control, e.g., manufactured by a still different manufacturer from either the old television or the new television, e.g., Logitech) associated with the particular party (e.g., the owner of the universal remote control).

Referring again to FIG. 9N, operation 704 may include operation 992 depicting receiving adaptation data that is at least partly based on at least one speech interaction of the particular party that is discrete from the detected speech data, wherein at least a portion of the adaptation data was collected by the particular device associated with the particular party. For example, FIG. 3, e.g., FIG. 3I, shows adaptation data at least partly based on discrete speech interaction of particular party separate from detected speech data, and at least partly collected by a particular party-associated particular device acquiring module 392 acquiring adaptation data that is at least partly based on at least one speech interaction of the particular party (e.g., speech interactions with speech-controlled kitchen devices) that is discrete from the detected speech data (e.g., controlling a speech-commanded clock radio in the bedroom), wherein at least a portion of the adaptation data was collected by the particular device (e.g., a desktop computer that is networked to each of the speech-controlled kitchen devices and the speech-controlled clock radio) associated with the particular party (e.g., the user has a login on the desktop computer).

Referring again to FIG. 9N, operation 704 may include operation 994 depicting acquiring one or more instructions for modifying one or more portions of a speech recognition component of a target device, said instructions at least partly based on at least one speech interaction of the particular party that is discrete from the detected speech data, wherein at least a portion of the adaptation data has been stored on a particular device associated with the particular party. For example, FIG. 3, e.g., FIG. 3I, shows adaptation data comprising instructions for modifying one or more portions of a speech recognition component of a target device that are at least partly based on one or more particular party speech interactions, and has been stored on a particular party-associated particular device acquiring module 394 acquiring one or more instructions (e.g., modifying one or more parameters of one or more algorithms) for modifying one or more portions of a speech recognition component (e.g., a set of logic gates configured to execute one or more of the algorithms for processing speech) of a target device (e.g., an automated teller machine device), said instructions at least partly based on at least one speech interaction of the particular party that is discrete from the detected speech data (e.g., based on previous speech interactions with automated teller machine devices), wherein at least a portion of the adaptation data has been stored on a particular device associated with the particular party (e.g., a cellular telephone device owned by the user).

Referring now to FIG. 9P (there is no FIG. 9O to avoid confusing the figure with a nonexistent Figure "ninety," e.g., "90"), operation 704 may include operation 996 depicting acquiring a location of one or more instructions for modifying one or more portions of a speech recognition component of a target device, said instructions at least partly based on at least one speech interaction of the particular party that is discrete from the detected speech data, wherein at least a portion of the adaptation data has been stored on a particular device associated with the particular party. For example, FIG. 3, e.g., FIG. 3J, shows adaptation data comprising a location of instructions for modifying one or more portions of a speech recognition component of a target device that are at least partly based on one or more particular party speech interactions, and has been stored on a particular party-associated particular device acquiring module 396 acquiring a location (e.g., a location in memory, or a location of a server) of one or more instructions for modifying one or more portions of a speech recognition component (e.g., an order in which speech algorithms are applied) of a target device (e.g., a computer with speech recognition software and word processing software loaded onto it), said instructions at least partly based on at least one speech interaction of the particular party that is discrete from the detected speech data (e.g., based on at least one previous dictation of one or more documents), wherein at least a portion of the adaptation data (e.g., the location of one or more instructions for modifying one or more portions of a speech recognition component of a target device) has been stored on a particular device (e.g., a headset worn by the user) associated with the particular party (e.g., set up and associated with the user).

Referring again to FIG. 9P, operation 704 may include operation 998 depicting receiving adaptation data that is at least partly based on at least one speech interaction of the particular party that is discrete from the detected speech data, wherein at least a portion of the adaptation data is transmitted from the particular device associated with the particular party. For example, FIG. 3, e.g., FIG. 3J, shows adaptation data at least partly based on discrete speech interaction of particular party separate from detected speech data, and transmitted from a particular party-associated particular device acquiring module 398 acquiring adaptation data (e.g., an ungrammatical utterance deletion algorithm) that is at least partly based on at least one speech interaction of the particular party (e.g., a history of the user's musical selections for automated, speech-controlled jukeboxes) that is discrete from the detected speech data (e.g., selecting a new song at the speech-commanded jukebox), wherein at least a portion of the adaptation data is transmitted from the particular device (e.g., a near-field communications device held by the user that stores adaptation data) associated with the particular party).

Referring again to FIG. 9P, operation 704 may include operation 901 depicting receiving adaptation data that is at least partly based on at least one speech interaction of the particular party that is discrete from the detected speech data, wherein at least a portion of the adaptation data is stored on the particular device associated with the particular party. For example, FIG. 3, e.g., FIG. 3J, shows adaptation data at least partly based on discrete speech interaction of particular party separate from detected speech data, and stored on a particular party-associated particular device acquiring module 301 acquiring adaptation data (e.g., a set of proper noun pronunciations, e.g., city names) that is at least partly based on at least one speech interaction of the particular party (e.g., the particular party dictating directions into a word processor), wherein at least a portion of the adaptation data is stored on the particular device (e.g., a USB stick, e.g., the first personal device 20A) associated with the particular party (e.g., the user).

Referring again to FIG. 9P, operation 704 may include operation 903 depicting receiving adaptation data that is at least partly based on at least one speech interaction of the particular party that is discrete from the detected speech data, wherein at least a portion of the adaptation data is temporarily stored on the particular device associated with the particular party until it is deposited at a remote server. For example, FIG. 3, e.g., FIG. 3J, shows adaptation data at least partly based on discrete speech interaction of particular party separate from detected speech data, and is temporarily stored on the particular-party associated particular device until remote server deposit acquiring module 303 acquiring (e.g., receiving from a remote server, e.g., Amazon cloud services) adaptation data (e.g., a set of proper noun pronunciations, e.g., city names) that is at least partly based on at least one speech interaction of the particular party (e.g., previous interactions with automated ticket dispensing devices using speech) that is discrete from the detected speech data (e.g., speech data that comes from a speech interaction with an automated train ticket dispensing device located at Union Station in Washington, D.C.), wherein at least a portion of the adaptation data is temporarily stored on the particular device (e.g., in one or more of the previous interactions with automated ticket dispensing devices, the particular party's pronunciation of a city is stored on the cellular telephone device associated with the particular party) until it is deposited at a remote server (e.g., the Amazon cloud services from where it was retrieved along with the rest of the adaptation data).

Referring again to FIG. 9P, operation 704 may include operation 905 depicting receiving adaptation data that is at least partly based on at least one speech interaction of the particular party that is discrete from the detected speech data, wherein at least a portion of the adaptation data was transmitted from a first device to a second device using the particular device associated with the particular party as a conduit configured to facilitate the transmission. For example, FIG. 3, e.g., FIG. 3J, shows adaptation data at least partly based on discrete speech interaction of particular party separate from detected speech data, and was transmitted from a first device to a second device using the particular party-associated particular device as a channel configured to facilitate the transaction acquiring module 305 acquiring adaptation data (e.g., a partial pattern tree model) that is at least partly based on at least one speech interaction of the particular party (e.g., the user giving speech commands to request a re-route to a GPS navigation device) that is discrete from the detected speech data (e.g., the user giving a command to the GPS navigation device to find a cheese shop), wherein at least a portion of the adaptation data was transmitted from a first device (e.g., a GPS navigation device, e.g., GPS navigation device 41, that may be good at re-routing traffic but has no information on cheese shops) to a second device (e.g., an onboard motor vehicle control system, e.g., motor vehicle control system 42, which may be bad at re-routing traffic but has an extensive cheese shop database) using the particular device (e.g., a smart key device, e.g., smart key 26, or a cellular telephone device) associated with the particular party as a conduit (e.g., the smart key device 26 communicates with the GPS navigation device 41 and the motor vehicle control system 42) configured to facilitate (e.g., take one or more steps that aid or assist in) the transmission of the adaptation data.

Referring now to FIG. 9Q, operation 704 may include operation 907 depicting receiving adaptation data that is at least partly based on at least one speech interaction of the particular party that is discrete from the detected speech data, wherein at least a portion of the adaptation data originated at the particular device associated with the particular party. For example, FIG. 3, e.g., FIG. 3K, shows adaptation data at least partly based on discrete speech interaction of particular party separate from detected speech data, and at least a portion of which originated at a particular party-associated particular device acquiring module 307 acquiring adaptation data (e.g., a discourse marker detecting module) that is at least partly based on at least one speech interaction of the particular party that is discrete from the detected speech data, wherein at least a portion of the adaptation data originated at the particular device (e.g., a universal remote control, e.g., personal device 22A).

Referring again to FIG. 9Q, operation 704 may include operation 909 depicting receiving adaptation data from a remote location, said adaptation data at least partly based on at least one speech interaction of the particular party that is discrete from the detected speech data, wherein at least a portion of the adaptation data was transmitted to the remote location from the particular device associated with the particular party. For example, FIG. 3, e.g., FIG. 3K, shows adaptation data at least partly based on discrete speech interaction of particular party separate from detected speech data, and at least a portion of which was transmitted to a remote location from a particular party-associated particular device receiving from remote location module 309 acquiring adaptation data (e.g., an accent-based pronunciation modification algorithm) from a remote location (e.g., a remote server, e.g., server 110), said adaptation data at least partly based on at least one speech interaction of the particular party that is discrete from the detected speech data (e.g., previous commands given to a headset during an augmented reality gaming session where the headset is worn outside), wherein at least a portion of the adaptation data was transmitted to the remote location (e.g., the adaptation data collected from the speech interactions with the headset does not stay on the headset, but is transmitted to a remote location) from the particular device (e.g., an augmented reality headset) associated with the particular party (e.g., being worn by the user).

Referring again to FIG. 9Q, operation 704 may include operation 911 depicting receiving adaptation data that is at least partly based on at least one speech interaction of the particular party that is discrete from the detected speech data. For example, FIG. 3, e.g., FIG. 3K, shows adaptation data at least partly based on discrete speech interaction of particular party separate from detected speech data receiving module 311 receiving adaptation data (e.g., a list of the way that the particular party pronounces ten words) that is at least partly based on at least one speech interaction of the particular party that is discrete from the detected speech data (e.g., ordering a triple bacon cheeseburger from the automated drive-thru window).

Referring again to FIG. 9Q, operation 704 may include operation 913 depicting adding further data to the received adaptation data. For example, FIG. 3, e.g., FIG. 3K, shows further data adding to adaptation data module 313 adding further data (e.g., adding one or more additional words to the list of the way that the particular party pronounces ten words, e.g., the word "bacon,").

Referring again to FIG. 9Q, operation 913 may include operation 915 depicting adding additional adaptation data to the received adaptation data. For example, FIG. 3, e.g., FIG. 3K, shows additional adaptation data adding to adaptation data module 315 adding additional adaptation data (e.g., another algorithm, e.g., adding an accent-based pronunciation modification algorithm to be executed serially with or parallel to the existing acquired adaptation data) to the received adaptation data (e.g., a phrase completion algorithm).

Referring again to FIG. 9Q, operation 913 may include operation 917 depicting adding header data identifying an entity that received the adaptation data. For example, FIG. 3, e.g., FIG. 3K, shows header data identifying receiving entity adding to adaptation data module 317 adding header data identifying an entity (e.g., either specific identification, like a MAC address or IP address, specific type identification, such as "I am a cellular telephone device," e.g., personal device 22B, or general identity information, e.g., "I am not the ultimate destination of this adaptation data" that received this information) that received the adaptation data (e.g., an emotion-based pronunciation adjustment algorithm).

Referring again to FIG. 9Q, operation 913 may include operation 919 depicting adding header data identifying an entity that transmitted the adaptation data. For example, FIG. 3, e.g., FIG. 3K, shows header data identifying transmitting entity adding to adaptation data module 319 adding header data identifying an entity (e.g., specific or general, similarly to as described above, e.g., "received from a universal remote control," or, e.g., personal device 22A) that transmitted the adaptation data (e.g., a partial pattern tree model).

Figure 10A:
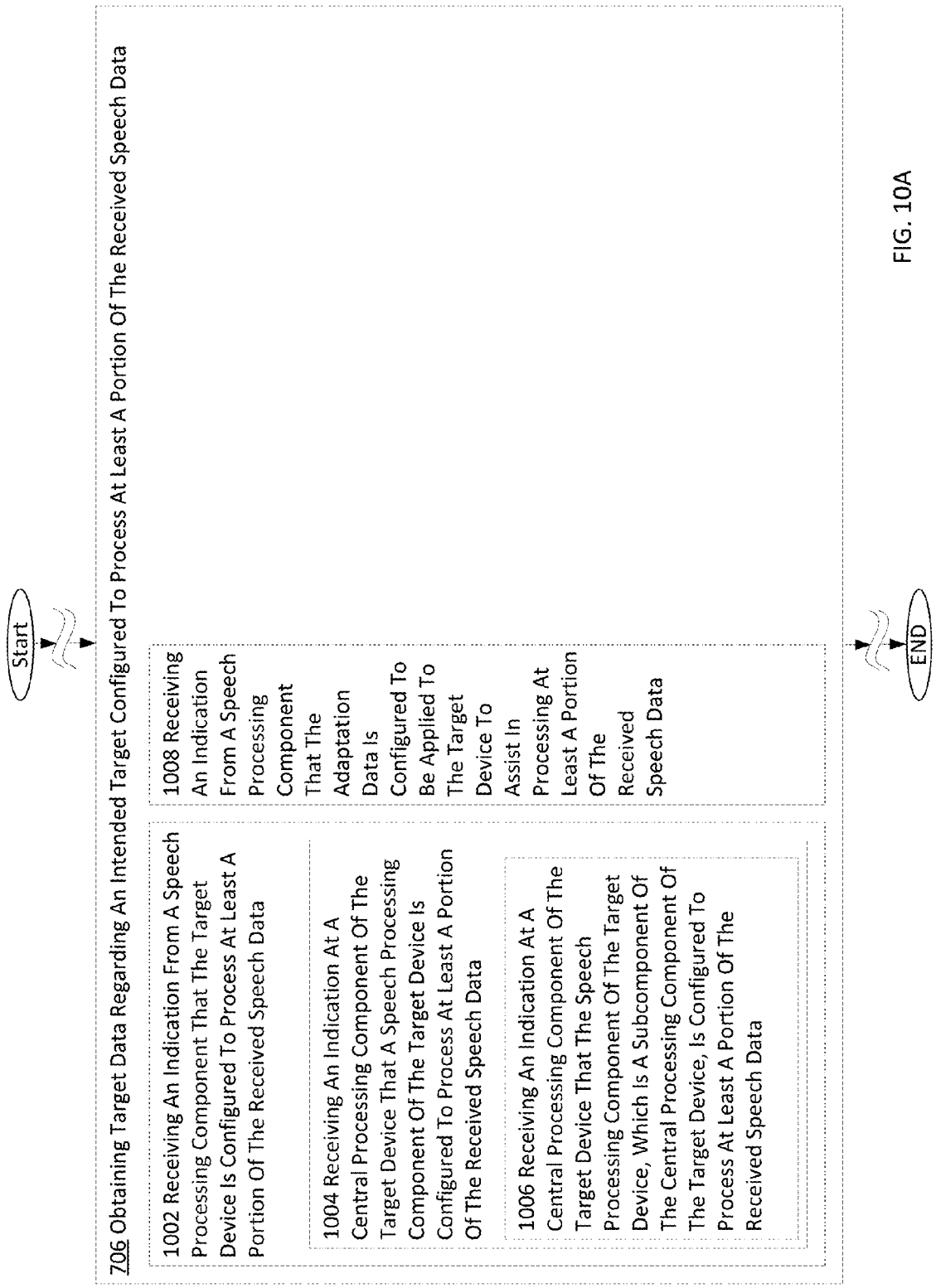
FIG. 10A is a high-level logic flowchart of a process depicting alternate implementations of an obtaining target data operation 706 of FIG. 7, according to one or more embodiments.

FIGS. 10A-10G depict various implementations of operation 706, according to embodiments. Referring now to FIG. 10A, in some embodiments, operation 706 may include operation 1002 depicting receiving an indication from a speech processing component that the target device is configured to process at least a portion of the received speech data. For example, FIG. 4, e.g., FIG. 4A, shows data indicating the target device is configured to process at least a portion of received speech data receiving module 402 receiving an indication (e.g., a signal, or having an internal flag set, or receiving status information) from a speech processing component (e.g., a component that applies a path selection algorithm to the received speech data) that the target device (e.g., the automated teller machine device) is configured to process at least a portion of the received speech data (e.g., "withdraw two hundred dollars from the checking account"). It is noted that, in some embodiments, the indication from the speech processing component is entirely internal to a device, e.g., the speech processing component is integral to the component receiving the indication. In some embodiments, the speech processing component is located on the same hardware (e.g., chip, memory, etc.) as the component that receives the indication.

Referring again to FIG. 10A, in some embodiments, operation 1002 may include operation 1004 depicting receiving an indication at a central processing component of the target device that a speech processing component of the target device is configured to process at least a portion of the received speech data. For example, FIG. 4, e.g., FIG. 4A, shows data indicating the target device is configured to process at least a portion of received speech data receiving from speech processing component at central processing component module 404 receiving an indication at a central processing component of the target device (e.g. a computer that receives speech input and has a complex word processing application running) that a speech processing component (e.g., word processing application) of the target device (e.g., the computer) is configured to process at least a portion of the received speech data (e.g., a dictation of a letter to the editor).

Referring again to FIG. 10A, operation 1004 may include operation 1006 depicting receiving an indication at a central processing component of the target device that the speech processing component of the target device, which is a sub-component of the central processing component of the target device, is configured to process at least a portion of the received speech data. For example, FIG. 4, e.g., FIG. 4A, shows data indicating the target device is configured to process at least a portion of received speech data receiving from speech processing component at central processing component of which the speech processing component is a subcomponent module 406 receiving an indication at a central processing unit (e.g., a processor of a tablet device, e.g., an Apple iPad) of the target device (e.g., the tablet device, e.g., the Apple iPad) that a speech processing component (e.g., a speech processing application, e.g., an application configured to apply an algorithm to convert received speech into one or more words) of the target device (e.g., the tablet device, e.g., the Apple iPad), which is a subcomponent of the central processing component of the target device (e.g., the speech processing application does not have a dedicated separate processor, but may have dedicated hardware that is part of the main central processing unit, or may have non-dedicated hardware that is part of the main central processing unit), is configured to process at least a portion of the received speech data (e.g., a request to load the web browser and browse to espn.com).

Referring again to FIG. 10A, operation 706 may include operation 1008 depicting receiving an indication from a speech processing component that the adaptation data is configured to be applied to the target device to assist in processing at least a portion of the received speech data. For example, FIG. 4, e.g., FIG. 4A, shows data indicating that the adaptation data is configured to be applied to the target device to assist in processing at least a portion of the speech data receiving from a speech processing component module 408 receiving an indication from a speech processing component (e.g., hardware configured to receive the speech data and filter out certain types of noise in the speech data) that the adaptation data (e.g., a low level noise filtration algorithm) is configured to be applied to the target device (e.g., an automated ticket dispensing machine) to assist in processing at least a portion of the received speech data (e.g., here, the speech processing component only removes low-level noise, and further processing is handled by a different component, but the adaptation data is a low level noise filtration algorithm, so the adaptation data is applied to the speech processing component to assist in this portion of the processing of the received speech data, e.g., a request for four tickets to the new Matt and Kim show).

Referring now to FIG. 10B, operation 706 may include operation 1012 depicting receiving an indication from the speech processing component that the adaptation data has been applied to the target device to assist in processing at least a portion of the received speech. For example, FIG. 4, e.g., FIG. 4A, shows data indicating that the adaptation data has been applied to the target device to assist in processing at least a portion of the speech data receiving from a speech processing component module 410 receiving an indication from the speech processing component (e.g., the portion of the motor vehicle control system that processes the speech, which may be in a different physical location than the portion that executes the one or more commands derived from the interpreted speech) that the adaptation data (e.g., an utterance ignoring algorithm) has been applied to the target device (e.g., the motor vehicle control system) to assist in processing at least a portion of the received speech (e.g., a command to lower the windows and open the sunroof).

Referring again to FIG. 10B, operation 1010 may include operation 1012 depicting receiving an indication from the speech processing component that the adaptation data is configured to be applied to an automated teller machine device to assist in processing at least a portion of the received speech data. For example, FIG. 4, e.g., FIG. 4A, shows data indicating that the adaptation data has been applied to an automated teller machine device to assist in processing at least a portion of the speech data receiving from a speech processing component module 412 receiving an indication from the speech processing component (e.g., a chip configured to interpret the speech data into recognizable commands) that the adaptation data (e.g., a syllable pronunciation database) is configured to be applied to an automated teller machine device to assist in processing at least a portion of the received speech data (e.g., a selection of one of three accounts in which to deposit the check that was inserted into the slot).

Referring again to FIG. 10B, operation 1012 may include operation 1014 depicting receiving the indication from the speech processing component of the automated teller machine device that the adaptation data is configured to be applied to the automated teller machine device to assist in processing at least a portion of data corresponding to a spoken request by the particular party to withdraw two hundred dollars from a bank account. For example, FIG. 4, e.g., FIG. 4A, shows data indicating that the adaptation data has been applied to an automated teller machine device to assist in processing at least a portion of the data corresponding to a spoken request by the particular party receiving from a speech processing component module 414 receiving the indication from the speech processing component of the automated teller machine device that the adaptation data (e.g., an uncommon word pronunciation guide) is configured to be applied to the automated teller machine device to assist in processing at least a portion of data corresponding to a spoken request by the particular party to withdraw two hundred dollars from a bank account.

Referring again to FIG. 10B, operation 1014 may include operation 1016 depicting receiving the indication from the speech processing component of the automated teller machine device that the automated teller machine device is configured to apply a list of the way that the particular party pronounces numbers zero through nine to assist in processing at least a portion of data corresponding to a spoken request by the particular party to withdraw two hundred dollars from the bank account. For example, FIG. 4, e.g., FIG. 4A, shows data indicating that the list of the way that the particular party pronounces numbers zero through nine has been applied to an automated teller machine device to assist in processing at least a portion of the data corresponding to a spoken request by the particular party receiving from a speech processing component module 1016 receiving the indication from the speech processing component of the automated teller machine device that the automated teller machine device is configured to apply a list of the way that the particular party pronounces numbers zero through nine to assist in processing at least a portion of data corresponding to a spoken request by the particular party to withdraw two hundred dollars from the bank account.

Referring again to FIG. 10B, operation 706 may include operation 1018 depicting generating target data regarding a target device configured to process at least a portion of the received speech data. For example, FIG. 4, e.g., FIG. 4B, shows target data regarding a target configured to process at least a portion of the received speech data generating module 418 generating target data (e.g., information about a device that can process the received speech data, e.g., a name of the device, a type of the device, a location of the device, a characteristic of the device, and the like) regarding a target device (e.g., a video game system) configured to process at least a portion of the received speech data (e.g., a command to load a particular game, e.g., Halo).

Referring again to FIG. 10B, operation 706 may include operation 1020 depicting determining whether the speech data is configured to be processed by a speech recognition component to which the adaptation data has been applied. For example, FIG. 4, e.g., FIG. 4B, shows speech data configurable to be processed by a speech recognition component to which the adaptation data has been applied determining module 420 determining whether the speech data (e.g., MP3-formatted speech data corresponding to a request to play the Guns 'n' Roses CD) is configured to be processed by a speech recognition component (e.g., in some embodiments, whether the intended device can interpret MP3-formatted speech data) to which the adaptation data has been applied (e.g., an algorithm that deletes repeated words has been applied to the MP3 to remove particular portions of the file).

Figure 10C:
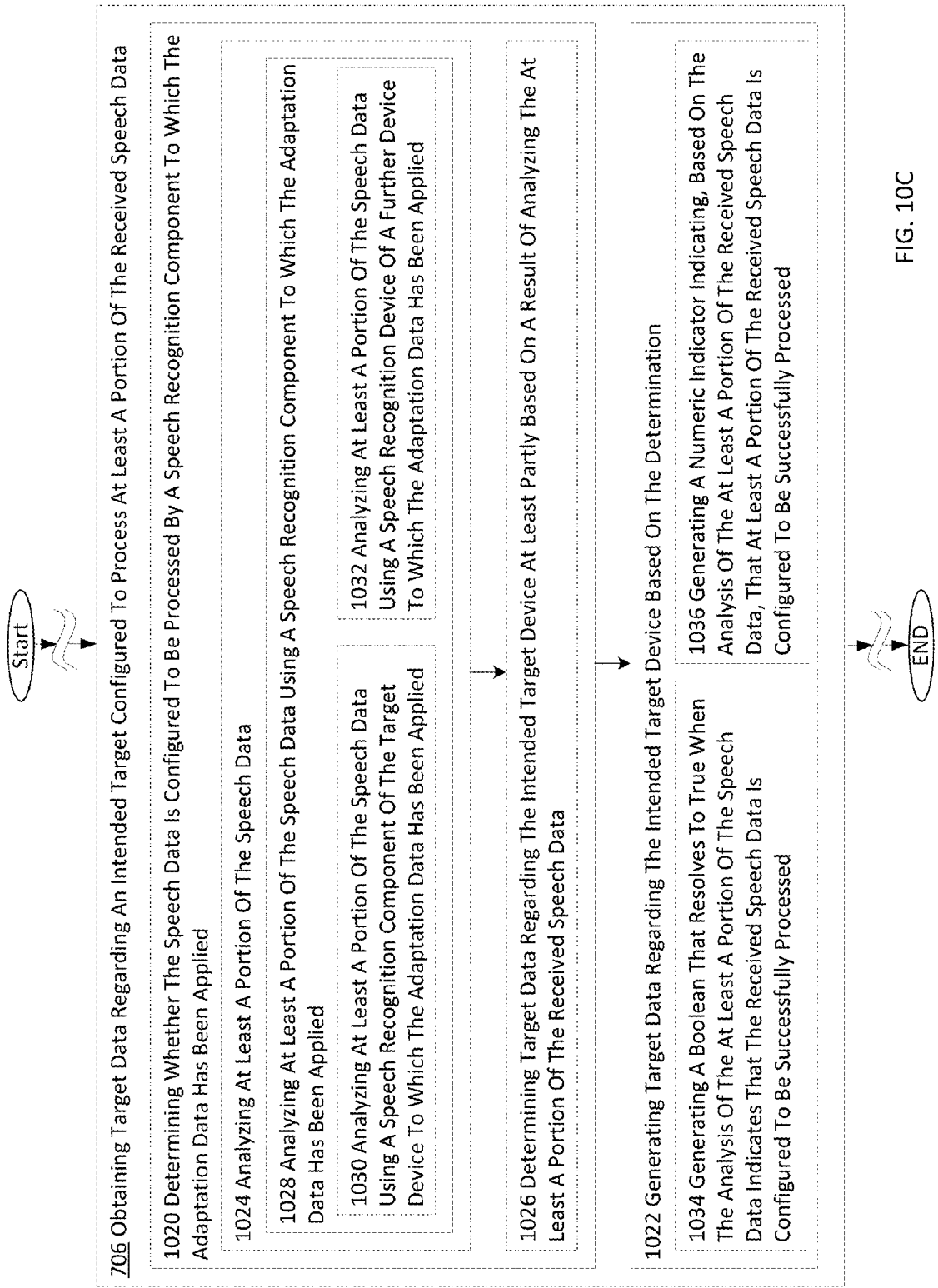
FIG. 10C is a high-level logic flowchart of a process depicting alternate implementations of an obtaining target data operation 706 of FIG. 7, according to one or more embodiments.

Referring now to FIG. 10C, operation 706 may include operation 1022 depicting generating target data regarding the intended target device based on the determination. For example, FIG. 4, e.g., FIG. 4B, shows target data regarding intended target device generating based on determination module 422 generating target data (e.g., data indicating how much speech processing should be performed at the location, and if the speech data and/or the adaptation data should be transmitted to another device, and if so, one or more pieces of information (e.g., name, location, permissions, communication network protocol) regarding the one or more devices to which the speech data and/or the adaptation data should be transmitted.

Referring again to FIG. 10C, operation 1020 may include operation 1024 depicting analyzing at least a portion of the speech data. For example, FIG. 4, e.g., FIG. 4B, shows at least a portion of speech data analyzing module 424 analyzing (e.g., reading headier information) at least a portion (e.g., the header portion, in some embodiments the body data also may be read and/or analyzed, but such reading and/or analyzing is not required) of the speech data (e.g., data corresponding to the user giving a speech command to turn on the headlights).

Referring again to FIG. 10C, operation 1020 may include operation 1026 depicting determining target data regarding the intended target device at least partly based on a result of analyzing the at least a portion of the received speech data. For example, FIG. 4, e.g., FIG. 4B, shows target data regarding intended target device determining at least partly based on the analyzing at least a portion of speech data module 426 determining (e.g., inferring based on one or more pieces of data) target data (e.g., data indicating that a motor vehicle control system is a system for which the user intended her speech to operate and/or command) regarding the intended target device (e.g., a motor vehicle control system) at least partly based on a result of analyzing the at least a portion of the received speech data (e.g., reading the header information).

Referring again to FIG. 10C, operation 1024 may include operation 1028 depicting analyzing at least a portion of the speech data using a speech recognition component to which the adaptation data has been applied. For example, FIG. 4, e.g., FIG. 4B, shows at least a portion of speech data analyzing using an adaptation data-applied speech recognition component module 428 analyzing at least a portion of the speech data (e.g., analyzing a portion of the data corresponding to the user speaking the words "turn on headlights") using a speech recognition component (e.g., a component of a device that is configured to interpret speech data corresponding to the user speaking the words "play Norah Jones track four" into a command "play," an artist, "Norah Jones," and a track number "four," using pattern recognition and/or other known techniques for interpreting speech) to which the adaptation data (e.g., a pronunciation dictionary) has been applied (e.g., the pronunciation dictionary replaces the generic pronunciation of the proper noun "Norah Jones," as well as other artists, e.g., "Red Hot Chili Peppers," "U2," and "The Beatles," and replaces it with the user's pronunciation of those artists, to allow for more accurate recognition).

Referring again to FIG. 10C, operation 1028 may include operation 1030 depicting analyzing at least a portion of the speech data using a speech recognition component of the target device to which the adaptation data has been applied. For example, FIG. 4, e.g., FIG. 4B, shows at least a portion of speech data analyzing using an adaptation data-applied speech recognition component of target device module 430 analyzing at least a portion of the speech data (e.g., "open the web page for ESPN.com") using a speech recognition component (e.g., speech recognition processing module on a Dell computer) of the target device (e.g., the Dell computer) to which the adaptation data (e.g., the sentence diagramming path selection algorithm) has been applied. In this example, analyzing the speech data reveals that this speech data is intended for the web browser, as opposed to a word processing document or a game program.

Referring again to FIG. 10C, operation 1028 may include operation 1032 depicting analyzing at least a portion of the speech data using a speech recognition component of a further device to which the adaptation data has been applied. For example, FIG. 4, e.g., FIG. 4B, shows at least a portion of speech data analyzing using an adaptation data-applied speech recognition component of further device module 432 analyzing at least a portion of the speech data (e.g., data corresponding to the user speaking "give me access to the accounts payable directory, password GHBQ1535#") using a speech recognition component of a further device (e.g., a device on an enterprise network that handles the processing of speech) to which the adaptation data (e.g., that personal user's uncommon word pronunciation guide, which may include a specific pronunciation guide for the user's password) has been applied (e.g., the further device receives the adaptation data over the network (said adaptation data having been stored on a USB drive that the computer user inserted prior to making the speech command), and applies the uncommon word pronunciation guide to assist in recognition of the user's commands, including the password for a particular directory.

Referring again to FIG. 10C, operation 1022 may include operation 1034 depicting generating a boolean that resolves to true when the analysis of the at least a portion of the received speech data indicates that the received speech data is configured to be successfully processed. For example, FIG. 4, e.g., FIG. 4B, shows Boolean that resolves to true when the analysis of the speech data portion indicates the received speech data is configured to be successfully processed module 434 generating a Boolean that resolves to true when the analysis of the at least a portion of the received speech data indicates that the received speech data is configured to be successfully processed (e.g., the received speech data is formatted, converted, compressed, encrypted, encoded, or any combination thereof in such a way that the device generating the Boolean can process the received speech data).

Referring again to FIG. 10C, operation 1022 may include operation 1036 depicting generating a numeric indicator indicating, based on the analysis of the at least a portion of the received speech data, that at least a portion of the received speech data is configured to be successfully processed. For example, FIG. 4, e.g., FIG. 4B, shows numeric indicator indicating that at least a portion of the received speech data is configured to be successfully processed generating based on analysis of at least a portion of speech data module 436 generating a numeric indicator (e.g., a number from 0 to 9) indicating, based on the analysis of the at least a portion of the received speech data, that at least a portion of the received speech data is configured to be successfully processed (e.g., the received speech data is formatted, converted, compressed, encrypted, encoded, or any combination thereof in such a way that the device generating the numeric indicator cannot process the received speech data if the numeric indicator is zero, and the numbers from one to nine indicate how difficult it will be for the device to process the received speech data (e.g., if a specific codec must be retrieved then the number may be a six, and if it is a computing-resources-on-demand type system, e.g., some form of cloud or distributed computing system, then the number may be from three to five depending on how many resources must be obtained, and/or the availability of those resources).

Figure 10D:
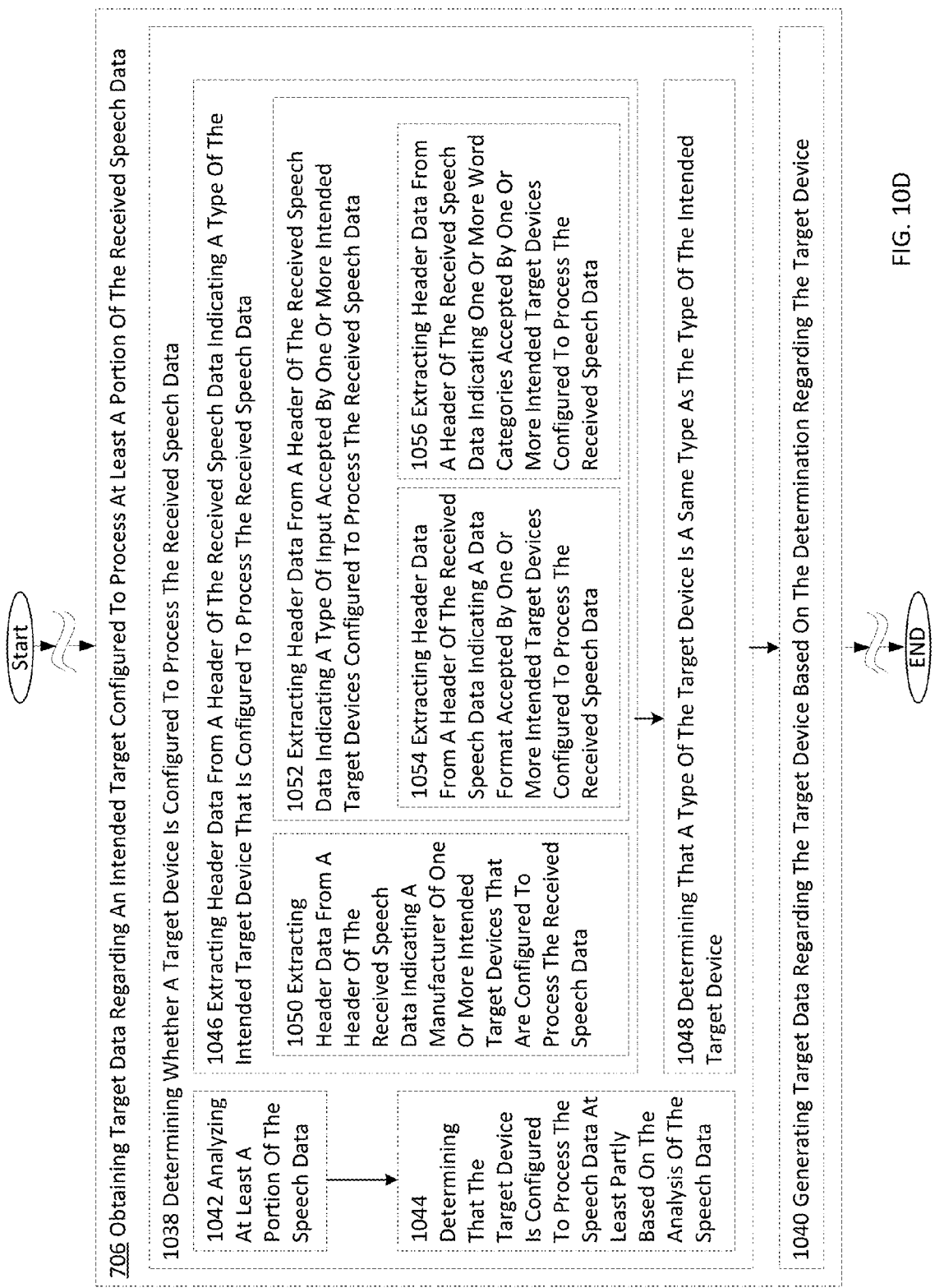
FIG. 10D is a high-level logic flowchart of a process depicting alternate implementations of an obtaining target data operation 706 of FIG. 7, according to one or more embodiments.

Referring now to FIG. 10D, operation 706 may include operation 1038 depicting determining whether a target device is configured to process the received speech data. For example, FIG. 4, e.g., FIG. 4C, shows target device configurable to process received speech data determining module 438 determining whether a target device (e.g., an audio/visual receiver) is configured to process (e.g., whether the received speech data is intended for the audio/visual receiver, or for another component of a home system) the received speech data.

Referring again to FIG. 10D, operation 706 may include operation 1040 depicting generating target data regarding the target device based on the determination regarding the target device. For example, FIG. 4, e.g., FIG. 4C, shows target data regarding target device generating based on determination regarding the target device module 440 generating target data generating target data (e.g., a type of device that can process the received speech data, e.g., a cable box with digital video recording ("DVR") capabilities) regarding the target device (e.g., a DVR cable box) based on the determination regarding the target device (e.g., the analysis shows that in order to execute the command, a cable box and DVR capabilities are necessary, and a determination is made that the target device is not a cable box, or does not have DVR capabilities, and thus those features are made part of the generated target data).

Referring again to FIG. 10D, operation 1038 may include operation 1042 depicting analyzing at least a portion of the speech data. For example, FIG. 4, e.g., FIG. 4C, shows at least a portion of the speech data analyzing module 442 analyzing at least a portion of the speech data (e.g., a placed order of a Deluxe burger, garlic fries, and S'mores Shake from Good Stuff eatery).

Referring again to FIG. 10D, operation 1038 may include operation 1044 depicting determining that the target device is configured to process the speech data at least partly based on the analysis of the speech data. For example, FIG. 4, e.g., FIG. 4C, shows target device configurable to process speech data determining at least partly based on result of analyzing at least a portion of the speech data module 444 determining that the target device (e.g., an automated order-placing terminal) is configured to process the speech data (e.g., the automated order-placing terminal is the device to which the user's speech was directed, and not to the user's Apple iPhone cellular telephone device, which the user is speaking a message into that will be converted into a text message) at least partly based on the analysis of the speech data (e.g., based on the words containing "garlic fries" and "deluxe burger," it is determined that this is an order for food from Good Stuff eatery).

Referring again to FIG. 10D, operation 1038 may include operation 1046 depicting extracting header data from a header of the received speech data indicating a type of the intended target device that is configured to process the received speech data. For example, FIG. 4, e.g., FIG. 4C, shows header data indicating a type of intended target device that is configured to process received speech data extracting from received speech data header module 446 extracting header data (e.g., data indicating that the target is a home electronics device) from a header of the received speech data (e.g., data corresponding to a user saying "raise the volume five units" and including a header file that identifies the type of device this speech is intended for as a home electronics device) indicating a type of the intended target device (e.g., a home electronics device) that is configured to process the received speech data (e.g., "raise the volume five units")

Referring again to FIG. 10D, operation 1038 may include operation 1048 depicting determining that a type of the target device is a same type as the type of the intended target device. For example, FIG. 4, e.g., FIG. 4C, shows type of target device is same type as type of intended target device determining module 448 determining that a type of the target device (e.g., the target device, e.g., a Blu-ray player, is a home electronics device) is a same type as the type of the intended target device (e.g., the intended target device is a Sony Blu-Ray player).

Referring again to FIG. 10D, operation 1046 may include operation 1050 depicting extracting header data from a header of the received speech data indicating a manufacturer of one or more intended target devices that are configured to process the received speech data. For example, FIG. 4, e.g., FIG. 4C, shows header data indicating a manufacturer of intended target device that is configured to process received speech data extracting from received speech data header module 448 extracting header data from a header (e.g., an encoding that indicates that this received speech data is for devices manufactured by a particular electronics manufacturer, e.g., Samsung, because the speech data is encoded using a proprietary encoding by Samsung, and the header data identifies this) of the received speech data (e.g., "play chapter four of the Blu-Ray") indicating a manufacturer of the intended target device (e.g., a Samsung electronics device) that is configured to process the received speech data (e.g., at least decode the data into a coded format that is not proprietary, and, in some embodiments, also perform interpreting of the speech data, or further determination regarding whether the speech data has reached the device that is its intended target).

Referring again to FIG. 10D, operation 1046 may include operation 1052 depicting extracting header data from a header of the received speech data indicating a type of input accepted by one or more intended target devices configured to process the received speech data. For example, FIG. 4, e.g., FIG. 4C, shows header data indicating a type of input accepted by one or more intended target devices configured to process received speech data extracting from received speech data header module 450 extracting header data (e.g., data indicating which type of user authorization must have been completed) from a header of the received speech data (e.g., data corresponding to a user speaking a command to "withdraw two hundred dollars from a checking account") indicating a type of input accepted by one or more intended target devices (e.g., input from that particular user that has established an authorization with a particular machine (e.g., by inserting his card, and thus the header may be an encrypted version of the card number) accepted by one or more intended target devices (e.g., of a long line of automated teller machine devices in a row, the intended target device is the one with which the user has established a connection, e.g., by inserting his card) configured to process the received speech data (e.g., withdraw two hundred dollars from a checking account).

Referring again to FIG. 10D, operation 1052 may include operation 1054 depicting extracting header data from a header of the received speech data indicating a data format accepted by one or more intended target devices configured to process the received speech data. For example, FIG. 4, e.g., FIG. 4C, shows header data indicating a data format accepted by one or more intended target devices configured to process received speech data extracting from received speech data header module 452 extracting header data (e.g., the following speech data requires an Advanced Audio Coding ("AAC") decoder) from a header of the received speech data (e.g., data corresponding to the user giving a command to present directions to the nearest Big Boy restaurant) indicating a data format (AAC) accepted by one or more intended target devices (e.g., personal navigation systems, onboard vehicle navigation systems, and the like) configured to process the received speech data (e.g., data corresponding to the user giving a command to present directions to the nearest Big Boy restaurant).

Referring again to FIG. 10D, operation 1052 may include operation 1056 depicting extracting header data from a header of the received speech data indicating one or more word categories accepted by one or more intended target devices configured to process the received speech data. For example, FIG. 4, e.g., FIG. 4C, shows header data indicating one or more word categories accepted by one or more intended target devices configured to process received speech data extracting from received speech data header module 456 extracting header data from a header of the received speech data indicating one or more word categories (e.g., "words that control home theater components," "words that control temperature," or, "words that control navigation," or specific sets of words, e.g., "volume," "digital video disc," "channel," etc.) accepted by one or more intended target devices (e.g., home theater systems) configured to process the received speech data (e.g., "lower the volume five units").

Figure 10E:
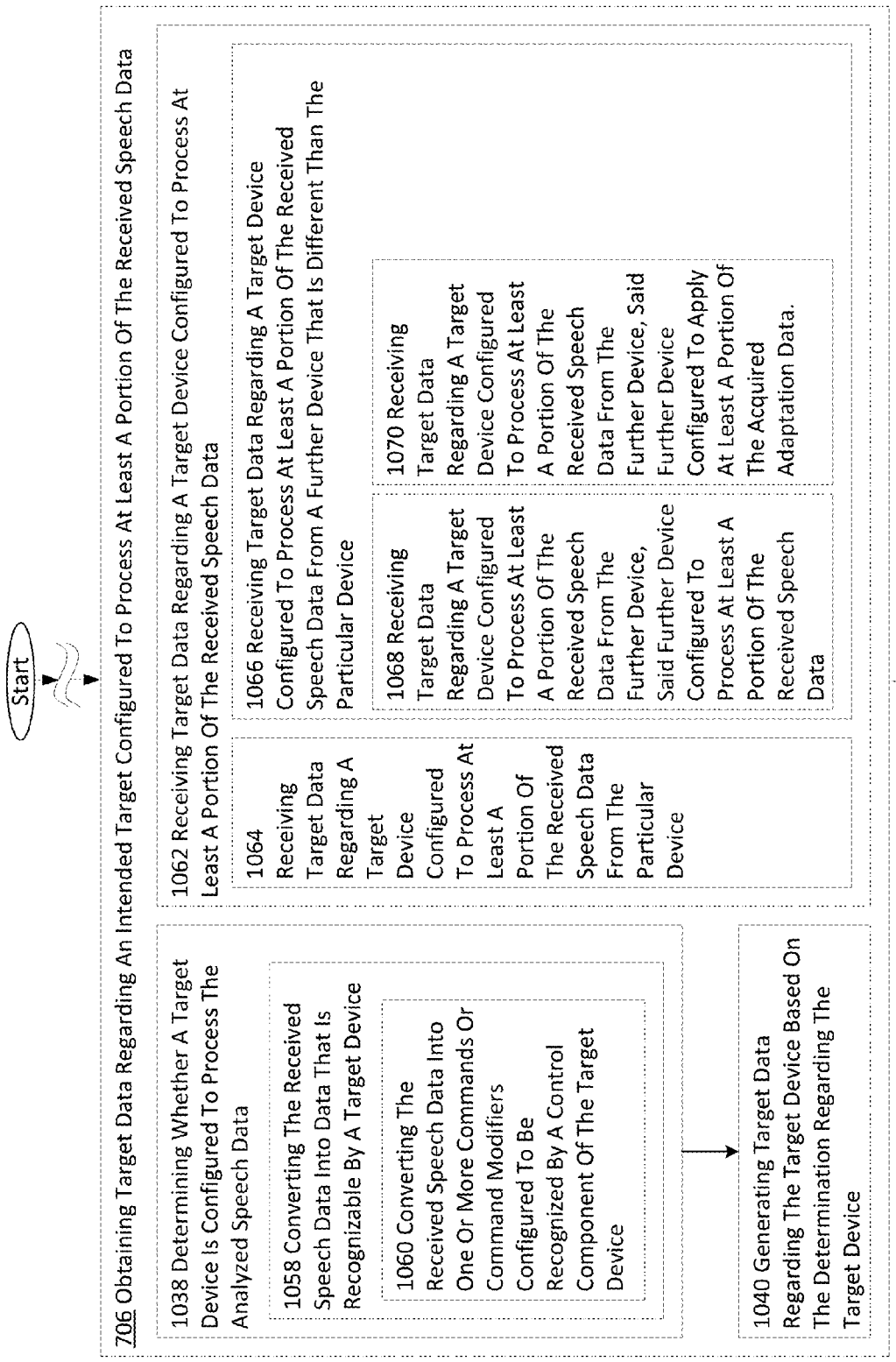
FIG. 10E is a high-level logic flowchart of a process depicting alternate implementations of an obtaining target data operation 706 of FIG. 7, according to one or more embodiments.

Referring now to FIG. 10E, operation 1038 may include operation 1058 converting the received speech data into data that is recognizable by a target device. For example, FIG. 4, e.g., FIG. 4D, shows received speech data into target device recognizable data converting module 458 converting the received speech data (e.g., dictation of a memorandum with a lot of background noise, e.g., machinery, children yelling, in the background) into data that is recognizable by a target device (e.g., by applying one or more filters to remove the non-speech data).

Referring again to FIG. 10E, operation 1058 may include operation 1060 depicting converting the received speech data into one or more commands or command modifiers configured to be recognized by a control component of the target device. For example, FIG. 4, e.g., FIG. 4D, shows received speech data into one or more commands or command modifiers configured to be recognized by a target device control component converting module 460 converting the received speech data (e.g., the received speech at a microphone, e.g., the user's speech, e.g., the words "withdraw two hundred dollars from checking account") into one or more commands (e.g., "withdraw" "200" "checking account," or in some embodiments, "withdraw" '200' "account number 6204620") configured to be recognized by a control component (e.g., a component configured to carry out the "deposit" "withdraw" and "display" commands of the target device (e.g., an automated teller machine device).

Referring again to FIG. 10E, operation 706 may include operation 1062 depicting receiving target data regarding a target device configured to process at least a portion of the received speech data. For example, FIG. 4, e.g., FIG. 4D, shows target data regarding a target device configured to process at least a portion of speech data receiving module 462 receiving target data (e.g., data identifying a target device) regarding a target device (e.g., a video game system) configured to process at least a portion of the received speech data (e.g., a command to kick the soccer ball given to a headset to command a player in a sports soccer game).

Referring again to FIG. 10E, operation 1062 may include operation 1064 depicting receiving target data regarding a target device configured to process at least a portion of the received speech data from the particular device. For example, FIG. 4, e.g., FIG. 4D, shows target data regarding a target device configured to process at least a portion of speech data receiving from the particular device module 464 receiving target data regarding a target device (e.g., data that identifies the video game system as the target of the speech) configured to process at least a portion of the received speech data (e.g., a command to switch control to a different player in the soccer game) from the particular device (e.g., from the headset that the video game player is wearing).

Referring again to FIG. 10E, operation 1062 may include operation 1066 depicting receiving target data regarding a target device configured to process at least a portion of the received speech data from a further device that is different than the particular device. For example, FIG. 4, e.g., FIG. 4D, shows target data regarding a target device configured to process at least a portion of speech data receiving from a further device module 466 receiving target data regarding a target device (e.g., data indicating which component of a home theater system is the target device, e.g., the television) configured to process at least a portion of the received speech data (e.g., data corresponding to the user giving the command ("increase brightness 75% and set the contrast to twenty-four") from a further device (e.g., a computer, e.g., computing device 54 of FIG. 1D, that communicates with devices in home theater system, e.g., receiver device 51, media player device 52, and television device 53 of FIG. 1D) that is different than the particular device (e.g., the universal remote control, e.g., personal device 22A of FIG. 1D).

Referring again to FIG. 10E, operation 1066 may include operation 1068 depicting receiving target data regarding a target device configured to process at least a portion of the received speech data from the further device, said further device configured to process at least a portion of the received speech data. For example, FIG. 4, e.g., FIG. 4D, shows target data regarding a target device configured to process at least a portion of speech data receiving from a further device configured to process at least a portion of the speech data module 468 receiving target data regarding a target device (e.g., "this data is intended for the television component of the home theater system) configured to process at least a portion of the received speech data (e.g., data corresponding to the user speaking the command "change the input to VIDEO-2") from the further device (e.g., a universal remote control), said further device configured to process at least a portion of the received speech data (e.g., the universal remote control receives the speech from the user, converts it to a data stream, and adds the target data that says "this data is intended for the television component" based on the universal remote control's detection that the user had pressed down the "Television" button on the personal device prior to speaking the command).

Referring again to FIG. 10E, operation 1066 may include operation 1070 depicting receiving target data regarding a target device configured to process at least a portion of the received speech data from the further device, said further device configured to apply at least a portion of the acquired adaptation data. For example, FIG. 4, e.g., FIG. 4D, shows target data regarding a target device configured to process at least a portion of speech data receiving from a further device configured to apply at least a portion of the adaptation data module 470 receiving target data regarding a target device (e.g., data indicating an address of a computer, e.g., a desktop computing system on a desk in the bedroom, and not a networked laptop sitting on a couch in the living room) configured to process at least a portion of the received speech data (e.g., "open the web browser") from the further device (e.g., a cellular telephone device carried by the user), said further device configured to apply at least a portion of the acquired adaptation data (e.g., the cellular telephone device retrieves the adaptation data from memory and applies the adaptation data to its speech recognition component, in case the cellular telephone device is requested by the computer to perform some or all of the speech data processing).

Figure 10F:
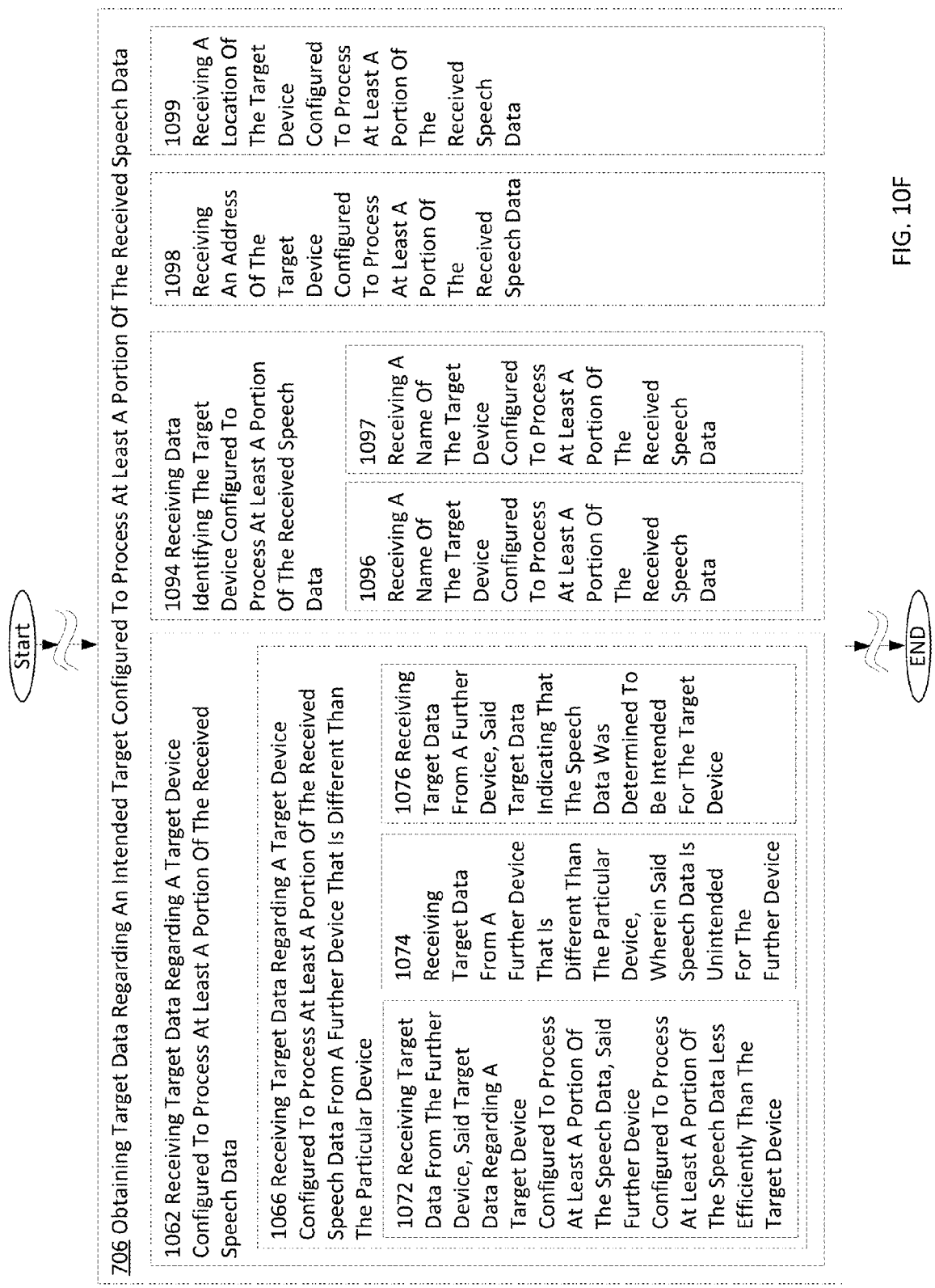
FIG. 10F is a high-level logic flowchart of a process depicting alternate implementations of an obtaining target data operation 706 of FIG. 7, according to one or more embodiments.

Referring now to FIG. 10F, operation 1066 may include operation 1072 depicting receiving target data from the further device, said target data regarding a target device configured to process at least a portion of the speech data, said further device configured to process at least a portion of the speech data less efficiently than the target device. For example, FIG. 4, e.g., FIG. 4E, shows target data regarding a target device configured to process at least a portion of speech data receiving from a further device configured to process the speech data less efficiently than the target device module 472 receiving target data (e.g., a type of device that the speech data is directed toward, e.g., an automated drive through window) from the further device (e.g., a user's cellular telephone device), said target data regarding a target device (e.g., an automated drive through window) configured to process at least a portion of the speech data (e.g., a user's order of a large pizza with pepperoni and sausage), said further device configured to process at least a portion of the speech data less efficiently than the target device (e.g., the cellular telephone device could process the speech data, but without knowing a vocabulary of the menu of the pizza place, cannot do so as efficiently as the target device, e.g., the automated drive thru window at the pizza place).

Referring again to FIG. 10F, operation 1066 may include operation 1074 depicting receiving target data from a further device that is different than the particular device, wherein said speech data is unintended for the further device. For example, FIG. 4, e.g., FIG. 4E, shows target data regarding a target device configured to process at least a portion of speech data receiving from a further device for which the speech data is unintended module 474 receiving target data (e.g., data indicating that the user is intending his speech to be directed to a media player) from a further device (e.g., an audio visual receiver) that is different from the particular device (e.g., a universal remote control), wherein said speech data (e.g., "play my song playlist number three") is unintended for the further device (e.g., the audio visual receiver does not play media).

Referring again to FIG. 10F, operation 1066 may include operation 1076 depicting receiving target data from a further device, said target data indicating that the speech data was determined to be intended for the target device. For example, FIG. 4, e.g., FIG. 4E, shows target data regarding a target device configured to process at least a portion of speech data and target data indicating the speech data was determined to be intended for the target device receiving from a further device module 476 receiving target data (e.g., data stating "this data is intended for a motor vehicle control system") from a further device (e.g., a personal GPS navigation system, e.g., personal GPS navigation system 41), said target data indicating that the speech data was determined (e.g., by the personal GPS navigation system) to be intended for the target device (e.g., the GPS navigation system tried to process the speech data, but could not, and then determined, based on the failure to recognize, that the speech data was intended for the motor vehicle control system).

Referring again to FIG. 10F, operation 706 may include operation 1094 depicting receiving data identifying the target device configured to process at least a portion of the received speech data. For example, FIG. 4, e.g., FIG. 4E, shows data identifying the target device receiving module 494 receiving data identifying the target device (e.g., a name of the device, whether general or specific, e.g., "video game system number 532162462" or "Billy's netbook") configured to process at least a portion of the received speech data (e.g., a command to "load the game Call of Duty").

Referring again to FIG. 10F, operation 1094 may include operation 1096 depicting receiving a name of the target device configured to process at least a portion of the received speech data. For example, FIG. 4, e.g., FIG. 4E, shows name of the target device (e.g., a name on a network, e.g., "computer NA00326W") configured to process at least a portion of the received speech data (e.g., a memorandum outlining new human resources policy).

Referring again to FIG. 10F, operation 1094 may include operation 1097 depicting receiving a device identifier of the target device configured to process at least a portion of the received speech data. For example, FIG. 4, e.g., FIG. 4E, shows device identifier of the target device receiving module 497 receiving a device identifier (e.g., a MAC address of a network card of the device) configured to process at least a portion of the received speech data (e.g., a command to open up the address book program).

Referring again to FIG. 10F, operation 706 may include operation 1098 depicting receiving an address of the target device configured to process at least a portion of the received speech data. For example, FIG. 4, e.g., FIG. 4E, shows address of the target device receiving module 498 receiving an address of the target device (e.g., an IP address, or a network address) configured to process at least a portion of the received speech data (e.g., a request to use Skype to dial a particular number).

Referring again to FIG. 10F, operation 706 may include operation 1099 depicting receiving a location of the target device configured to process at least a portion of the received speech data. For example, FIG. 4, e.g., FIG. 4E, shows location of the target device receiving module 499 receiving a location of the target device (e.g., it could be a relative location to the particular party, e.g., "directly in front of the particular party," e.g., within a bank of automated teller machines, or an absolute location, e.g., "the automated ticket dispensing device located on the third floor of Union Station, at location 38.89774 degrees N and 77.00643 degrees W) configured to process at least a portion of the received speech data.

Figure 10G:
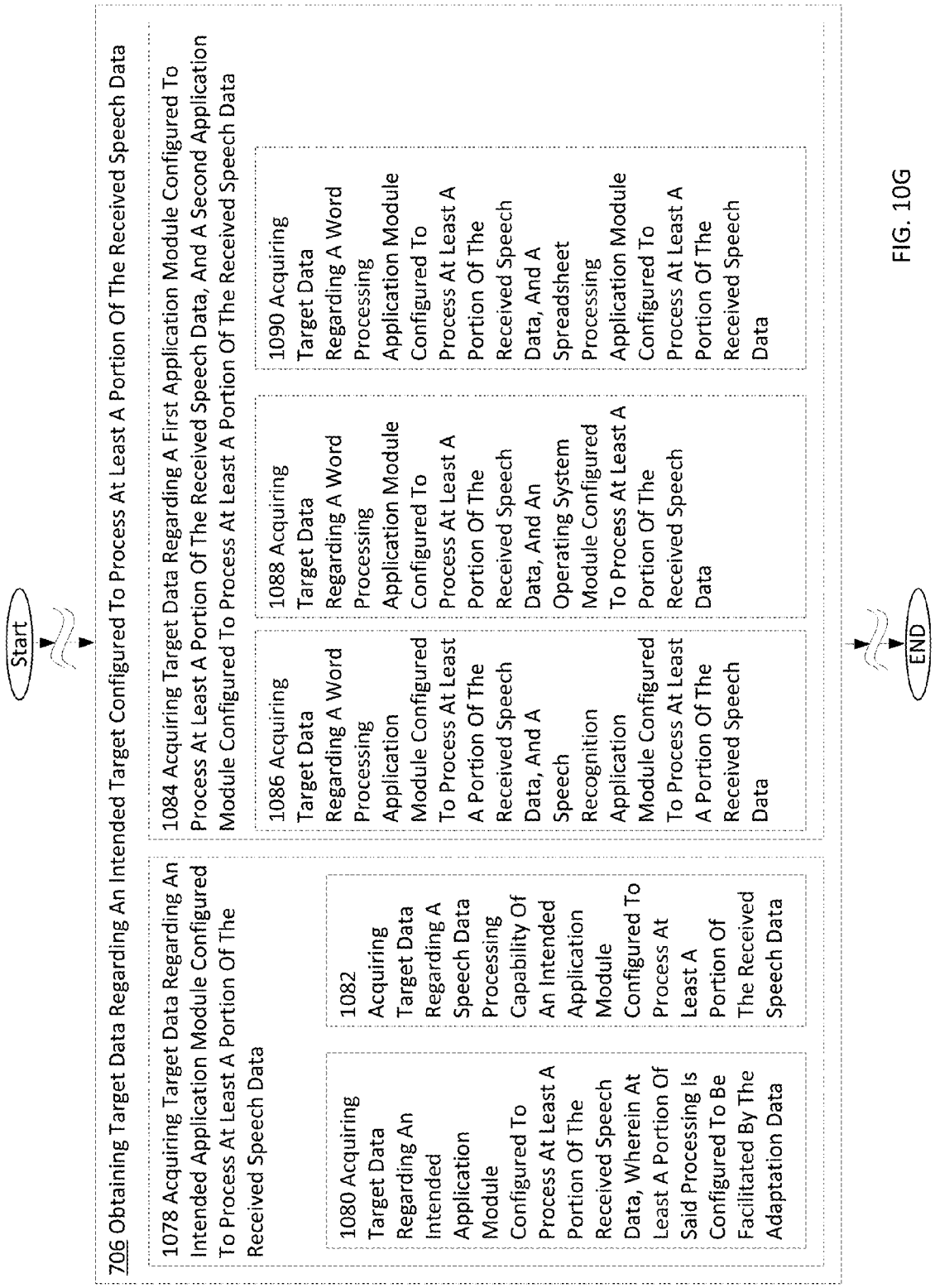
FIG. 10G is a high-level logic flowchart of a process depicting alternate implementations of an obtaining target data operation 706 of FIG. 7, according to one or more embodiments.

Referring now to FIG. 10G, operation 706 may include operation 1078 depicting acquiring target data regarding an intended application module configured to process at least a portion of the received speech data. For example, FIG. 4, e.g., FIG. 4E, shows target data regarding an intended application module configured to process at least a portion of the received speech data obtaining module 478 acquiring target data (e.g., data identifying a word processing application) regarding an intended application module (e.g., a word processor, e.g., Microsoft Word) configured to process at least a portion of the received speech data (e.g., a dictation of a memorandum).

Referring again to FIG. 10G, operation 1078 may include operation 1080 depicting acquiring target data regarding an intended application module configured to process at least a portion of the received speech data, wherein at least a portion of said processing is configured to be facilitated by the adaptation data. For example, FIG. 4, e.g., FIG. 4E, shows target data regarding an intended application module configured to process, facilitated by the adaptation data, at least a portion of the received speech data obtaining module 480 acquiring target data (e.g., data identifying the intended target) regarding an intended application module (e.g., an operating system shell) configured to process at least a portion of the received speech data (e.g., increase screen brightness by 30%), wherein at least a portion of said processing is facilitated by the adaptation data (e.g., the adaptation data contains a pronunciation of the numbers zero to ninety-nine, and facilitates the operating system identifying that the user said "thirty percent," as opposed to "thirteen percent" or some other incorrect interpretation).

Referring again to FIG. 10G, operation 1080 may include operation 1082 depicting acquiring target data regarding a speech data processing capability of an intended application module configured to process at least a portion of the received speech data. For example, FIG. 4, e.g., FIG. 4F, shows target data regarding a speech data processing capability of an intended application module configured to process, facilitated by the adaptation data, at least a portion of the received speech data obtaining module 482 acquiring target data (e.g., data showing a capability, e.g., 'completely incapable') regarding a speech data processing capability (e.g., no capability) of an intended application module (e.g., a basic web browser) configured to process at least a portion of the received speech data (e.g., "open espn.com").

Referring again to FIG. 10G, operation 706 may include operation 1084 depicting acquiring target data regarding a first application module configured to process at least a portion of the received speech data, and a second application module configured to process at least a portion of the received speech data. For example, FIG. 4, e.g., FIG. 4F, shows target data regarding a first application module configured to process at least a portion of the received speech data and a second application module configured to process at least a portion of the received speech data obtaining module 484 acquiring target data (e.g., a list of the application modules running on a computer) regarding a first application module (e.g., a web browser) configured to process at least a portion of the received speech data (e.g., data corresponding to the user's request to look up Aunt Sally's address), and a second application module (e.g., an address book application) configured to process at least a portion of the received speech data (e.g., the data corresponding to the user's request to look up Aunt Sally's address).

Referring again to FIG. 10G, operation 1084 may include operation 1086 depicting acquiring target data regarding a word processing application module configured to process at least a portion of the received speech data, and a speech recognition application module configured to process at least a portion of the received speech data. For example, FIG. 4, e.g., FIG. 4F, shows target data regarding a word processing application module configured to process at least a portion of the received speech data and a speech recognition application module configured to process at least a portion of the received speech data obtaining module 486 acquiring target data (e.g., a list of the application modules on the computer that are configured to process speech) regarding a word processing application module configured to process at least a portion of the received speech data (e.g., a dictation of a letter to the user's sister), and a speech recognition application module configured to process at least a portion of the received speech data (e.g., the dictation of a letter to the user's sister).

Referring again to FIG. 10G, operation 1084 may include operation 1088 depicting acquiring target data regarding a word processing application module configured to process at least a portion of the received speech data, and an operating system module configured to process at least a portion of the received speech data. For example, FIG. 4, e.g., FIG. 4F, shows target data regarding a word processing application module configured to process at least a portion of the received speech data and an operating system application module configured to process at least a portion of the received speech data obtaining module 488 acquiring target data (e.g., data listing one or more applications' capabilities to process speech data) regarding a word processing application module (e.g., Notepad) configured to process at least a portion of the received speech data, and an operating system module (e.g., Chrome OS) configured to process at least a portion of the received speech data.

Referring again to FIG. 10G, operation 1084 may include operation 1090 depicting acquiring target data regarding a word processing application module configured to process at least a portion of the received speech data, and a spreadsheet processing application module configured to process at least a portion of the received speech data. For example, FIG. 4, e.g., FIG. 4F, shows target data regarding a word processing application module configured to process at least a portion of the received speech data and a spreadsheet processing application module configured to process at least a portion of the received speech data obtaining module 490 acquiring target data (e.g., a list of open applications) regarding a word processing application module configured to process at least a portion of the received speech data, and a spreadsheet processing application module configured to process at least a portion of the received speech data.

FIGS. 11A-11C depict various implementations of operation 708, according to embodiments. Referring now to FIG. 11A, in some embodiments, operation 708 may include operation 1102 depicting determining to apply the adaptation data for processing at least a portion of the received speech data when the acquired target data indicates that the received speech data was not intended for a further device. For example, FIG. 5, e.g., FIG. 5A, shows application of adaptation data for processing at least a portion of the received speech data determining based on acquired target data comprising an indication of intended device module 502 determining to apply the adaptation data (e.g., instructions for replacing a word frequency table with a modified word frequency table that reflects the particular party's word usage) for processing at least a portion of the received speech data (e.g., a request to withdraw money from a checking account) when the acquired target data (e.g., data identifying the automated teller machine device that the user swiped her card into) indicates that the received speech data was not intended for a further device (e.g., a different automated teller machine device in a same cluster of automated teller machine devices).

Referring again to FIG. 11A, operation 708 may include operation 1104 depicting determining to apply the adaptation data for processing at least a portion of the received speech data when the acquired target data indicates that the received speech data has arrived at its intended target device. For example, FIG. 5, e.g., FIG. 5A, shows application of adaptation data for processing at least a portion of the received speech data determining based on acquired target data comprising an indication that speech data has arrived at intended device module 504 determining to apply the adaptation data (e.g., stochastic state transition network) for processing at least a portion of the received speech data (e.g., a request to receive dictation of a memorandum) when the acquired target data indicates that the received speech data has arrived at its intended target device (e.g., a computer running Microsoft Word).

Referring again to FIG. 11A, operation 708 may include operation 1106 depicting determining against application of the adaptation data for processing at least a portion of the received speech data when the acquired target data indicates that the received speech data has not arrived at its intended target device. For example, FIG. 5, e.g., FIG. 5A, shows application of adaptation data for processing at least a portion of the received speech data determining based on acquired target data comprising an indication that speech data has not arrived at intended device module 506 determining against application of the adaptation data (e.g., an uncommon word pronunciation guide) for processing at least a portion of the received speech data (e.g., a command to lower the rear windows and open the sunroof) when the acquired target data (e.g., data indicating that the speech data is intended for a motor vehicle control system) indicates that the received speech data has not arrived at its intended target device (e.g., it has arrived at a personal GPS navigation system, which is not a device it was intended for).

Referring again to FIG. 11A, operation 1106 may include operation 1108 depicting choosing against application of the adaptation data for processing at least a portion of the received speech data when the acquired target data indicates that the received speech data has not arrived at its intended target device. For example, FIG. 5, e.g., FIG. 5A shows application of adaptation data for processing at least a portion of the received speech data choosing against based on acquired target data comprising an indication that speech data has not arrived at intended device module 508 choosing against application of the adaptation data (e.g., an utterance ignoring algorithm) for processing at least a portion of the received speech data (e.g., a request to raise the volume by fifteen units) when the acquired target data (e.g., data indicating that the speech data is intended for a television) indicates that the received speech data has not arrived at its intended target device (e.g., it has arrived at an audio/visual receiver, which can raise its volume by fifteen units, but the target data indicates that the speech data is intended for a television).

Referring again to FIG. 11A, operation 708 may include operation 1110 depicting determining against application of the adaptation data for processing at least a portion of the received speech data when the acquired target data indicates that the received speech data has arrived at a device other than its intended target device. For example, FIG. 5, e.g., FIG. 5A, shows application of adaptation data for processing at least a portion of the received speech data determining based on acquired target data comprising an indication that speech data has arrived at other device than an intended device module 510 determining against application of the adaptation data (e.g., an uncommon word pronunciation guide) for processing at least a portion of the received speech data (e.g., a request for directions home) when the acquired target data indicates that the received speech data has arrived at a device (e.g., a cellular telephone device with navigational features) other than its intended target device (e.g., a personal GPS navigation system).

Referring again to FIG. 11A, operation 708 may include operation 1112 depicting determining to apply the adaptation data for processing at least a portion of the received speech data when the acquired target data indicates a capability of applying the adaptation data. For example, FIG. 5, e.g., FIG. 5A, shows application of adaptation data for processing at least a portion of the received speech data determining when acquired target data indicates capability of adaptation data application module 512 determining to apply the adaptation data (e.g., a noise level dependent filtration algorithm) for processing at least a portion of the received speech data (e.g., a request to withdraw two hundred dollars from a checking account) when the acquired target data (e.g., data internal to the device that indicates that adaptation data can be applied) indicates a capability of applying the adaptation data (e.g., has components that allow application of the noise level dependent filtration algorithm).

Referring now to FIG. 11B, operation 708 may include operation 1114 depicting determining against application of the adaptation data for processing at least a portion of the received speech data when the acquired target data indicates that there are one or more other devices present that are configured to apply the adaptation data for processing at least a portion of the received speech data. For example, FIG. 5, e.g., FIG. 5B, shows application of adaptation data for processing at least a portion of the received speech data determining based on acquired target data indicating presence of one or more other devices configured to apply adaptation data module 514 determining against application of the adaptation data (e.g., a speech disfluency detection algorithm) for processing at least a portion of the received speech data (e.g., a spoken request to power off) when the acquired target data (e.g., a list of devices in a home theater system that are currently powered on) indicates that there are one or more other devices present (e.g., in a home theater system, there may be several pieces of equipment that can be powered off) that are configured to apply the adaptation data (e.g., a speech disfluency detection algorithm) for processing at least a portion of the received speech data (e.g., a spoken request to power off).

Referring again to FIG. 11B, operation 708 may include operation 1116 depicting determining against application of the adaptation data for processing at least a portion of the received speech data when the acquired target data indicates that there are one or more other devices present that are configured to efficiently apply the adaptation data for processing at least a portion of the received speech data. For example, FIG. 5, e.g., FIG. 5B, shows application of adaptation data for processing at least a portion of the received speech data determining against based acquired target data indicating presence of one or more other devices configured to efficiently apply adaptation data module 516 determining against application of the adaptation data (e.g., an accent-based pronunciation modification algorithm) for processing at least a portion of the received speech data (e.g., a request to show directions to the nearest cheese shop) when the acquired target data (e.g., a list including a motor vehicle control system and a GPS navigation system that can communicate with each other) indicates that there are one or more other devices present (e.g., a GPS navigation system) that are configured to efficiently apply the adaptation data (e.g., the GPS navigation system may have more processing power and thus may be able to apply the algorithm efficiently) for processing at least a portion of the received speech data (e.g., a request to show directions to the nearest cheese shop).

Referring again to FIG. 11B, operation 708 may include operation 1118 depicting determining whether to apply the adaptation data for processing at least a portion of the received speech data when the acquired target data indicates a presence of one or more applications configured to process the received speech data. For example, FIG. 5, e.g., FIG. 5B, shows application of adaptation data for processing at least a portion of the received speech data determining based on acquired target data indicating presence of one or more other applications module 518 determining whether to apply the adaptation data (e.g., a phoneme pronunciation database) for processing at least a portion of the received speech data (e.g., the user speaking a list of numbers) when the acquired target data indicates a presence of one or more applications of the target device (e.g., a word processing application and a spreadsheet application of a computer).

Referring again to FIG. 11B, operation 708 may include operation 1120 depicting determining whether to apply the adaptation data for processing at least a portion of the received speech data based on one or more characteristics of one or more applications of the target device, wherein the acquired target data includes data regarding a presence of the one or more applications. For example, FIG. 5, e.g., FIG. 5B, shows application of adaptation data for processing at least a portion of the received speech data determining based on one or more characteristics of one or more applications and target data indicating a presence of the one or more applications module 520 determining whether to apply the adaptation data (e.g., a part-of-speech labeling algorithm) for processing at least a portion of the received speech data (e.g., a dictation of a memorandum) based on one or more characteristics (e.g., an ability to successfully process numbers recited in speech) of one or more applications of the target device (e.g., a computer having two different spreadsheet processing applications), wherein the acquired target data includes data regarding a presence of the one or more applications (e.g., the acquired target data lists the available applications, and their efficiency rate at processing numbers as speech).

Referring now to FIG. 11C, operation 708 may include operation 1122 depicting determining whether to apply the adaptation data for processing at least a portion of the received speech data based on acquired target data comprising one or more characteristics of one or more applications of the target device. For example, FIG. 5, e.g., FIG. 5C, shows application of adaptation data for processing at least a portion of the received speech data determining against based acquired target data comprising one or more characteristics of one or more applications module 522 determining whether to apply the adaptation data (e.g., a regional dialect application algorithm) for processing at least a portion of the received speech data (e.g., a request to play a particular video from the user's on-demand video library) based on acquired target data comprising one or more characteristics (e.g., processor power available at the time of interpreting the speech) of one or more applications (e.g., a video-on-demand equipped cable box that is running a menuing application and an on-demand application) of the target device (e.g., a video cable box).

Referring again to FIG. 11C, operation 1122 may include operation 1124 depicting determining whether to apply the adaptation data for processing at least a portion of the received speech data based on acquired target data comprising a detection of one or more applications and corresponding one or more characteristics of the one or more applications. For example, FIG. 5, e.g., FIG. 5C, shows application of adaptation data for processing at least a portion of the received speech data determining against based acquired target data comprising a presence of one or more applications and one or more characteristics of one or more applications module 524 determining whether to apply the adaptation data (e.g., a syllable pronunciation database) for processing at least a portion of the received speech data (e.g., speaking commands to fill in fields on a web page) based on acquired target data comprising a detection of one or more applications (e.g., whether a web browser is open and information about the open web browser) and corresponding one or more characteristics (e.g., whether the web browser can process the speech data, e.g., and how much pre-processing, if any, should be performed) of the one or more applications (e.g., a web browser).

Referring again to FIG. 11C, operation 1122 may include operation 1126 depicting determining whether to apply the adaptation data for processing at least a portion of the received speech data at least partly based on acquired target data comprising a developer of one or more applications of the target device. For example, FIG. 5, e.g., FIG. 5C, shows application of adaptation data for processing at least a portion of the received speech data determining against based acquired target data comprising a developer of one or more applications module 526 determining whether to apply the adaptation data (e.g., a context-based repaired utterance processing matrix) for processing at least a portion of the received speech data at least partly based on acquired target data comprising a developer (e.g., for Microsoft-developed applications, the adaptation data may not be applied, but for Corel-developed applications, the adaptation data may be applied) of one or more applications (e.g., a word processing application) of the target device (e.g., a laptop computer).

Referring again to FIG. 11C, operation 706 may include operation 1128 depicting determining whether to apply the adaptation data for processing at least a portion of the received speech data at least partly based on a preference flag set on the one or more applications. For example, FIG. 5, e.g., FIG. 5C, shows application of adaptation data for processing at least a portion of the received speech data determining based on one or more application preference flags module 528 determining whether to apply the adaptation data for processing at least a portion of the received speech data (e.g., the user is reading numbers off of a list to be entered into a spreadsheet) at least partly based on a preference flag set on the one or more applications (e.g., the spreadsheet application has an internal flag that lets the application decide whether to use the adaptation data). In some embodiments, the decision is based on current conditions within the device, e.g., available processing power, etc. In some embodiments, the decision is based on the application estimating the success of previously applying the adaptation data. In some embodiments, the decision is based on a user selection.

Referring again to FIG. 11C, operation 706 may include operation 1130 depicting determining whether to apply the adaptation data for processing at least a portion of the received speech data at least partly based on a user-controlled preference flag set on the one or more applications. For example, FIG. 5, e.g., FIG. 5C, shows application of adaptation data for processing at least a portion of the received speech data determining based on one or more user-controlled preference flags module 530 determining whether to apply the adaptation data (e.g., a partial pattern tree model) for processing at least a portion of the received speech data (e.g., a dictation of a memorandum) at least partly based on a user-controlled preference flag set on the one or more applications (e.g., the word processing application has a user preference setting for allowing the user to select whether she wants the word processing application to process the adaptation data).

Referring again to FIG. 11C, operation 706 may include operation 1132 depicting determining whether to apply the adaptation data based on a decision by an operating system of a device configured to process at least a portion of the received speech data, when the acquired target data indicates that there are one or more applications present configured to process the received speech data. For example, FIG. 5, e.g., FIG. 5C, shows application of adaptation data for processing at least a portion of the received speech data determining based on operating system decision module 532 determining whether to apply the adaptation data (e.g., a part-of-speech labeling algorithm) based on a decision by an operating system of a device (e.g., a Windows operating system, e.g., Windows 7, loaded on a Dell desktop computer) configured to process at least a portion of the received speech data (e.g., a verbal listing of contact information to be saved in the computer), wherein the acquired target data (e.g., a list of currently running applications) indicates that there are one or more applications present (e.g., a word processing application, a calendar application, a contact management application) configured to process the received speech data (e.g., one or more of the word processing application, calendar application, and contact management application can process the received speech device, but the contact management application cannot use the adaptation data, and so the operating system determines whether to apply the adaptation data based on the existence of an application that cannot use the adaptation data). In some embodiments, the operating system also may decide for which application the speech data is intended. In other embodiments, the operating system may determine for which application the speech data is intended based on other information, e.g., a window that was active when the user spoke the words).

Figure 12A:
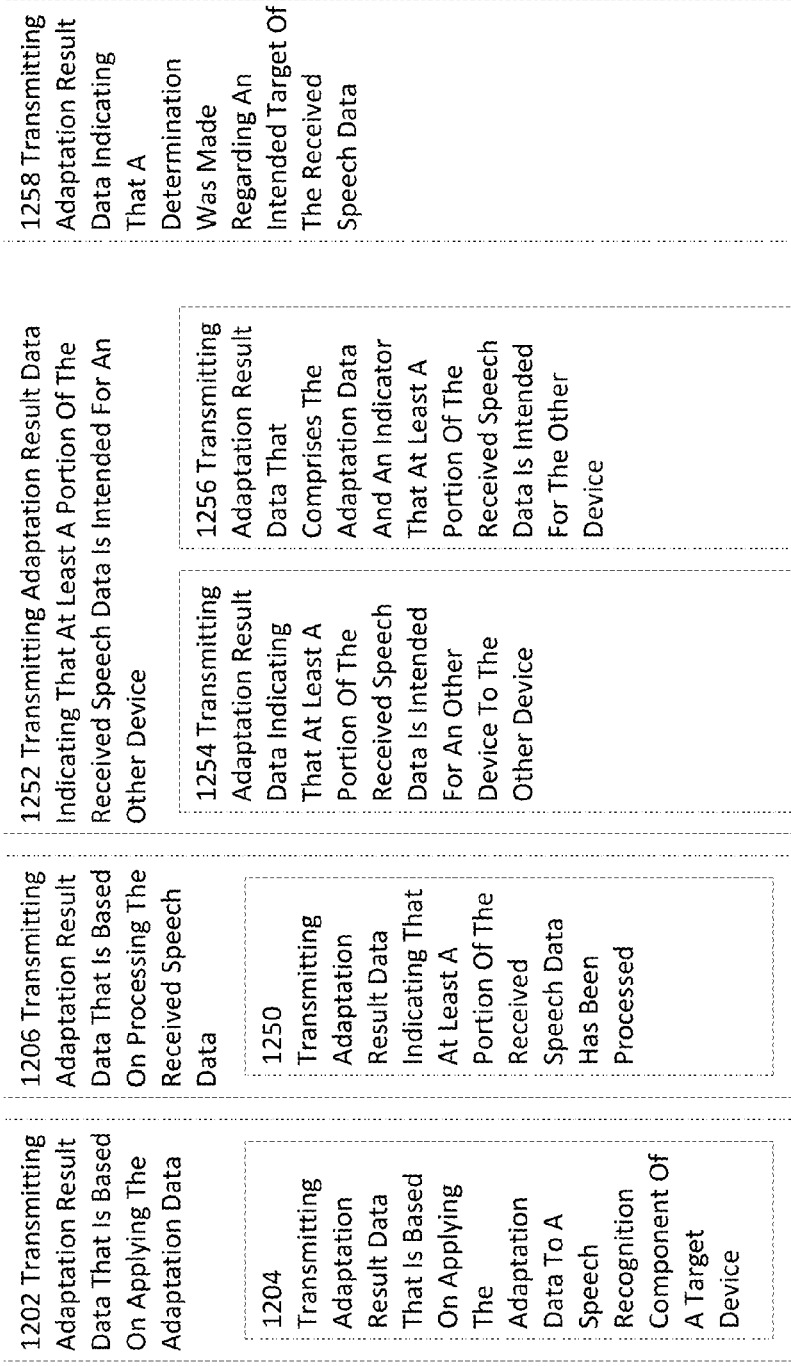
FIG. 12A is a high-level logic flowchart of a process depicting alternate implementations of a transmitting adaptation result data operation 710 of FIG. 7, according to one or more embodiments.
Figure 12B:
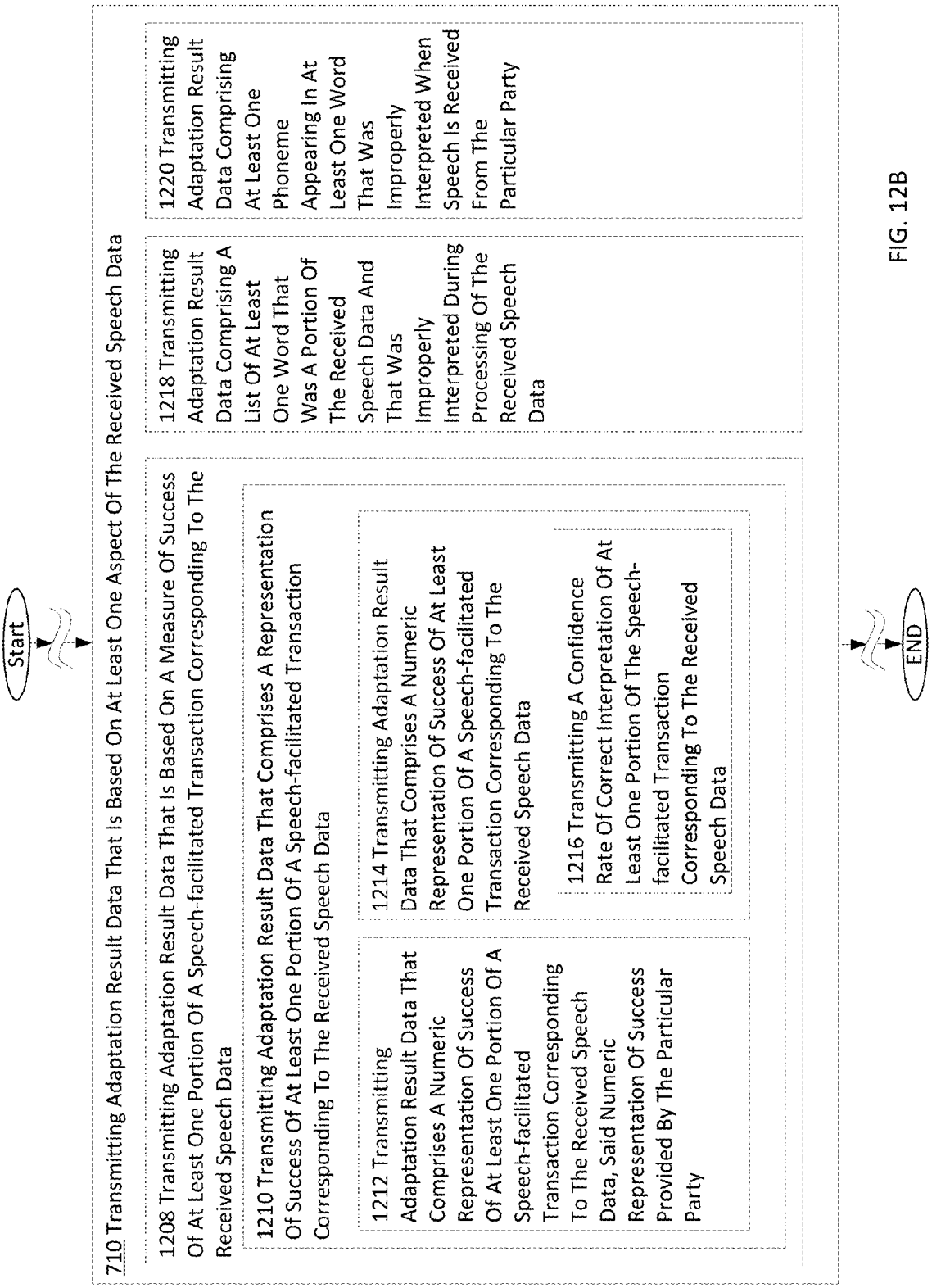
FIG. 12B is a high-level logic flowchart of a process depicting alternate implementations of a transmitting adaptation result data operation 710 of FIG. 7, according to one or more embodiments.

FIGS. 12A-12C depict various implementations of operation 710, according to embodiments. Referring now to FIG. 12A, in some embodiments, operation 710 may include operation 1202 depicting transmitting adaptation result data that is based on applying the adaptation data. For example, FIG. 6, e.g., FIG. 6A, shows adaptation result data based on applying the adaptation data transmitting module 602 transmitting adaptation result data that is based on applying the adaptation data (e.g., transmitting a "1" if the adaptation result data was successfully applied, and a "0" otherwise, or in other embodiments, transmitting a number indicating a percentage of the adaptation data (e.g., a list of the way that the particular party pronounces ten words) that was applied).

Referring again to FIG. 12A, operation 1202 may include operation 1204 depicting transmitting adaptation result data that is based on applying the adaptation data to a speech recognition component of a target device. For example, FIG. 6, e.g., FIG. 6A, shows adaptation result data based on applying the adaptation data to a speech recognition component of a target device transmitting module 604 transmitting adaptation result data that is based on applying the adaptation data (e.g., an emotion-based pronunciation adjustment algorithm) to a speech recognition component of a target device (e.g., a speech-enabled video game system).

Referring again to FIG. 12A, operation 710 may include operation 1206 transmitting adaptation result data that is based on processing the received speech data. For example, FIG. 6, e.g., FIG. 6A, shows adaptation result data based on processing received speech data transmitting module 606 transmitting adaptation result data (e.g., transmitting a signal, e.g., internally to a portion of the device that processed the speech data, or externally to a different device) indicating that at least a portion of the received speech data has been processed (e.g., in some embodiments, the processing of the speech data may include determining that the speech data is intended for a different device, and in some embodiments, also may include sending a signal indicating that the speech data is intended for a different device) that is based on processing the received speech data.

Referring again to FIG. 12A, operation 1206 may include operation 1250 depicting transmitting adaptation result data indicating that at least a portion of the received speech data has been processed. For example, FIG. 6, e.g., FIG. 6A, shows adaptation result data indicating at least a portion of received speech data has been processed transmitting module 650 transmitting adaptation result data indicating that at least a portion of the received speech data (e.g., a request to withdraw two hundred dollars from a speech-enabled automated teller machine device).

Referring again to FIG. 12A, operation 710 may include operation 1252 depicting transmitting adaptation result data indicating that at least a portion of the received speech data is intended for an other device. For example, FIG. 6, e.g., FIG. 6A, shows adaptation result data indicating that at least a portion of the received speech data is intended for an other device transmitting module 652 transmitting adaptation result data indicating that at least a portion of the received speech data (e.g., "dial the number 252-256-6356" is intended for an other device (e.g., an automated wall dialer in a house or office setting).

Referring again to FIG. 12A, operation 1252 may include operation 1254 depicting transmitting adaptation result data indicating that at least a portion of the received speech data is intended for an other device to the other device. For example, FIG. 6, e.g., FIG. 6A, shows adaptation result data indicating that at least a portion of the received speech data is intended for an other device transmitting to the other device module 654 transmitting adaptation result data (e.g., that is based on at least one aspect of the received speech data, e.g., that the received speech data is not intended for the device that received it, whether or not the device made that determination or another device made that determination, e.g., and encoded it into a header of the speech data, or transmitted it separately) indicating that at least a portion of the received speech data (e.g., the data that says "turn the air conditioner down by two degrees") is intended for an other device (e.g., a climate control system of a house) to the other device (e.g., a home climate control system).

Referring again to FIG. 12A, operation 1252 may include operation 1256 depicting transmitting adaptation result data that comprises the adaptation data and an indicator that at least a portion of the received speech data is intended for the other device. For example, FIG. 6, e.g., FIG. 6A, shows adaptation result data comprising the adaptation data and indicating that at least a portion of the received speech data is intended for an other device transmitting module 656 transmitting adaptation result data, comprising the adaptation data (e.g., a path selection algorithm), and an indicator (e.g., data) that at least a portion of the received speech data (e.g., data that says "turn the air conditioner down by two degrees") is intended for the other device (e.g., a motor vehicle control system).

Referring again to FIG. 12A, operation 710 may include operation 1258 depicting transmitting adaptation result data indicating that a determination was made regarding an intended target of the received speech data. For example, FIG. 6, e.g., FIG. 6A, shows adaptation result data indicating completed determination regarding intended target of received speech data transmitting module 658 transmitting adaptation result data indicating that a determination was made (e.g., either determining the target of the received speech data, or determining merely that some other device is the target of the received speech data) regarding an intended target (e.g., an office copier) of the received speech data (e.g., data corresponding to a speech instruction of "make twenty-five color copies with sixty percent less yellow in them").

Referring now to FIG. 12B, operation 710 may include operation 1208 depicting transmitting adaptation result data that is based on a measure of success of at least one portion of a speech-facilitated transaction corresponding to the received speech data. For example, FIG. 6, e.g., FIG. 6B, shows adaptation result data based on a measure of success of at least one portion of a speech-facilitated transaction corresponding to the received speech data transmitting module 608 transmitting adaptation result data that is based on a measure of success (e.g., an observer not directly related to the transaction, e.g., a monitoring network computer, or a cellular telephone device, or a device specifically installed to monitor quality of speech-facilitated transactions, e.g., which, in some embodiments, may be integral with a terminal designed to receive the speech-facilitated transactions) of at least one portion of a speech-facilitated transaction (e.g., giving commands to a laptop computer to open various programs, e.g., a web browser, a word processor, and the like) corresponding to the received speech data.

Referring again to FIG. 12B, operation 1208 may include operation 1210 depicting transmitting adaptation result data that comprises a representation of success of at least one portion of a speech-facilitated transaction corresponding to the received speech data. For example, FIG. 6, e.g., FIG. 6B, shows adaptation result data comprising a representation of success of at least one portion of a speech-facilitated transaction corresponding to the received speech data transmitting module 610 transmitting adaptation result data that comprises a representation of success (e.g., a representation in the form of answers to open-ended survey questions presented to the particular party at the end of a speech-facilitated transaction) of at least one portion of a speech-facilitated transaction (e.g., an interaction with an automated banking center in which the particular party speaks the words "obtain a home equity loan," and the various steps are carried out through speech of the user) corresponding to the received speech data (e.g., data corresponding to at least one of the words spoken by the user during the speech-facilitated transaction).

Referring again to FIG. 12B, operation 1210 may include operation 1212 depicting transmitting adaptation result data that comprises a numeric representation of success of at least one portion of a speech-facilitated transaction corresponding to the received speech data, said numeric representation of success provided by the particular party. For example, FIG. 6, e.g., FIG. 6B, shows adaptation result data comprising a numeric representation of success provided by the particular party of at least one portion of a speech-facilitated transaction corresponding to the received speech data transmitting module 612 transmitting adaptation result data that comprises a numeric representation of success (e.g., 42 out of 100) of at least one portion of a speech-facilitated transaction (e.g., a user trying to get walking directions from an automated "help terminal" located on a New York City street corner") corresponding to the received speech data, said numeric representation of success provided by the particular party (e.g., the particular party is asked through a feedback mechanism, e.g., a survey, to rate ten different portions of their transaction on a scale of 0-10, and the scores are aggregated to arrive at a score of 42).

Referring again to FIG. 12B, operation 1210 may include operation 1214 depicting transmitting adaptation result data that comprises a numeric representation of success of at least one portion of a speech-facilitated transaction corresponding to the received speech data. For example, FIG. 6, e.g., FIG. 6A, shows adaptation result data comprising a numeric representation of success of at least one portion of a speech-facilitated transaction corresponding to the received speech data transmitting module 614 transmitting adaptation result data that comprises a numeric representation (e.g., 8 out of 10) of success of at least one portion of a speech-facilitated transaction corresponding to the received speech data (e.g., a user speaking a command to withdraw two hundred dollars from an automated teller machine device).

Referring again to FIG. 12A, operation 1214 may include operation 1216 depicting transmitting a confidence rate of correct interpretation of at least one portion of the speech-facilitated transaction corresponding to the received speech data. For example, FIG. 6, e.g., FIG. 6A shows adaptation result data comprising confidence rate of correct interpretation of at least one portion of the speech-facilitated transaction corresponding to the received speech data transmitting module 616 transmitting a confidence rate of correct interpretation (e.g., fifty percent) of at least one portion of the speech-facilitated transaction (e.g., a user ordering a bacon cheeseburger, a large French fries, a coke, and a shake) corresponding to the received speech data (e.g., data corresponding to a computer-readable representation of the user's speech).

Referring now to FIG. 12B, operation 710 may include operation 1218 depicting transmitting adaptation result data comprising a list of at least one word that was a portion of the received speech data and that was improperly interpreted during processing of the received speech data. For example, FIG. 6, e.g., FIG. 6B, shows adaptation result data comprising a list of at least one word that was a portion of the received speech data and that was improperly interpreted during speech data processing transmitting module 618 transmitting adaptation result data comprising a list of at least one word that was a portion of the received speech data (e.g., "forty") and that was improperly interpreted (e.g., interpreted as "four tie" instead of "forty") during processing of the received speech data (e.g., "show me destinations within forty miles" spoken to an automated train ticket dispensing device).

Referring again to FIG. 12B, operation 710 may include operation 1220 depicting transmitting adaptation result data comprising at least one phoneme appearing in at least one word that was improperly interpreted when speech is received from the particular party. For example, FIG. 6, e.g., FIG. 6B, shows adaptation result data comprising at least one phoneme appearing in at least one improperly interpreted word transmitting module 620 transmitting adaptation result data comprising at least one phoneme appearing in at least one word (e.g., "Cincinnati") that was improperly interpreted when speech is received from the particular party (e.g., "I would like to order three orders of five-way Cincinnati chili").

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A computationally-implemented method, comprising:
   receiving speech data correlated to one or more words spoken by a particular party;
   receiving adaptation data that is at least partly based on at least one speech interaction of the particular party that is discrete from the speech data, wherein at least a portion of the adaptation data has been stored on a particular device associated with the particular party;
   obtaining target device data indicating whether a target device in communication with the particular device associated with the particular party is configured to process at least a portion of the speech data;
   applying, at least partially via the target device, the adaptation data for processing at least a portion of the speech data, at least partly based on the target device data indicating that the speech data has arrived at an intended target device; and
   transmitting adaptation result data that is based on at least one aspect of the speech data.

2. The computationally-implemented method of claim 1, wherein said receiving speech data correlated to one or more words spoken by a particular party includes:
   receiving speech data comprising a representation of speech that is spoken by the particular party.

3. The computationally-implemented method of claim 2, wherein said receiving speech data comprising a representation of speech that is spoken by the particular party includes:
   receiving speech data corresponding to received speech spoken by the particular party that has been at least partially processed.

4. The computationally-implemented method of claim 1, wherein said receiving speech data correlated to one or more words spoken by a particular party includes:
   receiving, from a further device, speech data correlated to one or more words spoken by a particular party.

5. The computationally-implemented method of claim 4, wherein said receiving, from a further device, speech data correlated to one or more words spoken by a particular party includes:
   receiving, from the further device, audio data derived from one or more words spoken by the particular party.

6. The computationally-implemented method of claim 5, wherein said receiving, from the further device, audio data derived from one or more words spoken by the particular party includes:
   receiving, from the further device, audio data derived by the further device from one or more words spoken by the particular party and detected by the particular device.

7. The computationally-implemented method of claim 1, wherein said receiving adaptation data that is at least partly based on at least one speech interaction of the particular party that is discrete from the speech data, wherein at least a portion of the adaptation data has been stored on a particular device associated with the particular party includes:
   receiving adaptation data from a further device, said adaptation data at least partly based on at least one speech interaction of the particular party that is discrete from the speech data, wherein at least a portion of the adaptation data has been stored on the particular device associated with the particular party.

8. The computationally-implemented method of claim 7, wherein said receiving adaptation data from a further device, said adaptation data at least partly based on at least one speech interaction of the particular party that is discrete from the speech data, wherein at least a portion of the adaptation data has been stored on the particular device associated with the particular party includes:

receiving adaptation data from a further device, said adaptation data originating at the further device and at least partly based on least one speech interaction of the particular party that is discrete from the speech data, wherein at least a portion of the adaptation data has been stored on the particular device associated with the particular party.

9. The computationally-implemented method of claim 7, wherein said receiving adaptation data from a further device, said adaptation data at least partly based on at least one speech interaction of the particular party that is discrete from the speech data, wherein at least a portion of the adaptation data has been stored on the particular device associated with the particular party includes:

receiving adaptation data from a further device related to the particular device, said adaptation data originating at the further device and at least partly based on least one speech interaction of the particular party that is discrete from the speech data, wherein at least a portion of the adaptation data has been stored on the particular device associated with the particular party.

10. The computationally-implemented method of claim 9, wherein said receiving adaptation data from a further device related to the particular device, said adaptation data originating at the further device and at least partly based on least one speech interaction of the particular party that is discrete from the speech data, wherein at least a portion of the adaptation data has been stored on the particular device associated with the particular party includes:

receiving adaptation data from a further device associated with the particular party, said adaptation data originating at the further device and at least partly based on least one speech interaction of the particular party that is discrete from the speech data, wherein at least a portion of the adaptation data has been stored on the particular device associated with the particular party.

11. The computationally-implemented method of claim 7, wherein said receiving adaptation data from a further device, said adaptation data at least partly based on at least one speech interaction of the particular party that is discrete from the speech data, wherein at least a portion of the adaptation data has been stored on the particular device associated with the particular party includes:

receiving adaptation data from a further device, said adaptation data received by the further device from the particular device, and said adaptation data at least partly based on least one speech interaction of the particular party that is discrete from the speech data, wherein at least a portion of the adaptation data has been stored on the particular device associated with the particular party.

12. The computationally-implemented method of claim 1, wherein said receiving adaptation data that is at least partly based on at least one speech interaction of the particular party that is discrete from the speech data, wherein at least a portion of the adaptation data has been stored on a particular device associated with the particular party includes:

receiving adaptation data that is at least partly based on at least one speech interaction of the particular party that used one or more same utterances as speech used in the speech data, said one or more same utterances spoken to a different device than a target device to which the detected speech data is directed.

13. The computationally-implemented method of claim 1, wherein said receiving adaptation data that is at least partly based on at least one speech interaction of the particular party that is discrete from the speech data, wherein at least a portion of the adaptation data has been stored on a particular device associated with the particular party includes:

receiving adaptation data that is at least partly based on at least one speech interaction of the particular party that is discrete from the speech data, wherein at least a portion of the adaptation data was collected by the particular device associated with the particular party.

14. The computationally-implemented method of claim 1, wherein said receiving adaptation data that is at least partly based on at least one speech interaction of the particular party that is discrete from the speech data, wherein at least a portion of the adaptation data has been stored on a particular device associated with the particular party includes:

receiving adaptation data that is at least partly based on at least one speech interaction of the particular party that is discrete from the speech data, wherein at least a portion of the adaptation data is temporarily stored on the particular device associated with the particular party until it is deposited at a remote server.

15. The computationally-implemented method of claim 1, wherein said receiving adaptation data that is at least partly based on at least one speech interaction of the particular party that is discrete from the speech data, wherein at least a portion of the adaptation data has been stored on a particular device associated with the particular party includes:

receiving adaptation data that is at least partly based on at least one speech interaction of the particular party that is discrete from the speech data, wherein at least a portion of the adaptation data was transmitted from a first device to a second device using the particular device associated with the particular party as a conduit configured to facilitate the transmission.

16. The computationally-implemented method of claim 1, wherein said receiving adaptation data that is at least partly based on at least one speech interaction of the particular party that is discrete from the speech data, wherein at least a portion of the adaptation data has been stored on a particular device associated with the particular party includes:

receiving adaptation data that is at least partly based on at least one speech interaction of the particular party that is discrete from the speech data; and adding further data to the received adaptation data.

17. The computationally-implemented method of claim 1, wherein said obtaining target device data indicating whether a target device in communication with the particular device associated with the particular party is configured to process at least a portion of the speech data includes:

generating an indication from a speech processing component that the adaptation data is configured to be applied to the target device to assist in processing at least a portion of the speech data.

18. The computationally-implemented method of claim 1, wherein said obtaining target device data indicating whether a target device in communication with the particular device associated with the particular party is configured to process at least a portion of the speech data includes:

generating target device data indicating whether the target device is configured to process at least a portion of the received speech data.

19. The computationally-implemented method of claim 1, wherein said obtaining target device data indicating whether a target device in communication with the particular device associated with the particular party is configured to process at least a portion of the speech data includes:

determining whether the speech data is configured to be processed by a speech recognition component of the target device to which the adaptation data has been applied; and generating target device data regarding the target device based on the determination.

20. The computationally-implemented method of claim 19, wherein said generating target device data regarding the target device based on the determination includes:

analyzing at least a portion of the speech data; and generating target device data regarding the target device at least partly based on a result of analyzing the at least a portion of the speech data.

21. The computationally-implemented method of claim 20, wherein said analyzing at least a portion of the speech data includes:

analyzing at least a portion of the speech data using a speech recognition component to which the adaptation data has been applied.

22. The computationally-implemented method of claim 21, wherein said analyzing at least a portion of the speech data using a speech recognition component to which the adaptation data has been applied includes:

analyzing at least a portion of the speech data using a speech recognition component of the target device to which the adaptation data has been applied.

23. The computationally-implemented method of claim 21, wherein said analyzing at least a portion of the speech data using a speech recognition component to which the adaptation data has been applied includes:

analyzing at least a portion of the speech data using a speech recognition component of a further device to which the adaptation data has been applied.

24. The computationally-implemented method of claim 1, wherein said obtaining target device data indicating whether a target device in communication with the particular device associated with the particular party is configured to process at least a portion of the speech data includes:

determining whether the target device is configured to process the speech data; and generating target device data indicating whether the target device is configured to process at least a portion of the speech data based on the determination regarding the target device.

25. The computationally-implemented method of claim 24, wherein said determining whether the target device is configured to process the speech data includes:

analyzing at least a portion of the speech data; and determining that the target device is configured to process the speech data at least partly based on the analysis of the speech data.

26. The computationally-implemented method of claim 24, wherein said determining whether the target device is configured to process the speech data includes:

extracting data from the speech data indicating a type of target device that is configured to process the speech data; and determining that a type of the target device is the same as the type of target device indicated by the extracted data.

27. The computationally-implemented method of claim 26, wherein said extracting data from the speech data indicating a type of target device that is configured to process the speech data includes:

extracting data from the speech data indicating a manufacturer of one or more target devices that are configured to process the speech data.

28. The computationally-implemented method of claim 24, wherein said determining whether the target device is configured to process the speech data includes:

converting the speech data into data that is recognizable by a target device.

29. The computationally-implemented method of claim 28, wherein said converting the speech data into data that is recognizable by a target device includes:

converting the speech data into one or more commands or command modifiers configured to be recognized by a control component of the target device.

30. The computationally-implemented method of claim 1, wherein said obtaining target device data indicating whether a target device in communication with the particular device associated with the particular party is configured to process at least a portion of the speech data includes:

receiving target device data regarding a target device configured to process at least a portion of the speech data.

31. The computationally-implemented method of claim 30, wherein said receiving target device data regarding a target device configured to process at least a portion of the speech data includes:

receiving target device data regarding a target device configured to process at least a portion of the speech data from a further device that is different than the particular device.

32. The computationally-implemented method of claim 1, wherein said obtaining target device data indicating whether a target device in communication with the particular device associated with the particular party is configured to process at least a portion of the speech data includes:

receiving data identifying the target device configured to process at least a portion of the speech data.

33. The computationally implemented method of claim 1, wherein said obtaining target device data indicating whether a target device in communication with the particular device associated with the particular party is configured to process at least a portion of the speech data includes:

receiving an address of a target device configured to process at least a portion of the speech data.

34. The computationally-implemented method of claim 1, wherein said obtaining target device data indicating whether a target device in communication with the particular device associated with the particular party is configured to process at least a portion of the speech data includes:

acquiring target device data regarding an intended application module configured to process at least a portion of the speech data.

35. The computationally-implemented method of claim 34, wherein said acquiring target device data regarding an intended application module configured to process at least a portion of the speech data includes:

acquiring target device data regarding an intended application module configured to process at least a portion of the speech data, wherein at least a portion of said processing is configured to be facilitated by the adaptation data.

36. The computationally-implemented method of claim 34, wherein said acquiring target device data regarding an intended application module configured to process at least a portion of the speech data includes:

acquiring target device data regarding a speech data processing capability of an intended application module configured to process at least a portion of the speech data.

37. The computationally-implemented method of claim 1, wherein said obtaining target device data indicating whether a target device in communication with the particular device associated with the particular party is configured to process at least a portion of the speech data includes:
    acquiring target device data regarding a first application module configured to process at least a portion of the speech data, and a second application module configured to process at least a portion of the speech data.

38. The computationally-implemented method of claim 37, wherein said acquiring target device data regarding a first application module configured to process at least a portion of the speech data, and a second application module configured to process at least a portion of the speech data includes:
    acquiring target device data regarding a word processing application module configured to process at least a portion of the speech data, and a speech recognition application module configured to process at least a portion of the speech data.

39. The computationally-implemented method of claim 37, wherein said acquiring target device data regarding a first application module configured to process at least a portion of the speech data, and a second application module configured to process at least a portion of the speech data includes:
    acquiring target device data regarding a word processing application module configured to process at least a portion of the speech data, and an operating system module configured to process at least a portion of the speech data.

40. The computationally-implemented method of claim 37, wherein said acquiring target device data regarding a first application module configured to process at least a portion of the speech data, and a second application module configured to process at least a portion of the speech data includes:
    acquiring target device data regarding a word processing application module configured to process at least a portion of the speech data, and a spreadsheet processing application module configured to process at least a portion of the speech data.

41. A computationally-implemented method comprising:
    receiving speech data correlated to one or more words spoken by a particular party;
    receiving adaptation data that is at least partly based on at least one speech interaction of the particular party that is discrete from the speech data, wherein at least a portion of the adaptation data has been stored on a particular device associated with the particular party;
    obtaining target device data indicating whether a target device in communication with the particular device associated with the particular party is configured to process at least a portion of the speech data;
    applying, at least partially via the target device, the adaptation data for processing at least a portion of the speech data at least partly based on the target device data indicating that the speech data has arrived at a device other than the target device;
    transmitting adaptation result data that is based on at least one aspect of the speech data.

42. A computationally-implemented method comprising:
    receiving speech data correlated to one or more words spoken by a particular party;
    receiving adaptation data that is at least partly based on at least one speech interaction of the particular party that is discrete from the speech data, wherein at least a portion of the adaptation data has been stored on a particular device associated with the particular party;
    obtaining target device data indicating whether a target device in communication with the particular device associated with the particular party is configured to process at least a portion of the speech data;
    applying, at least partially via the target device, the adaptation data for processing at least a portion of the speech data at least partly based on the target device data indicating that there are one or more other target devices present that are configured to apply the adaptation data for processing at least a portion of the speech data; and
    transmitting adaptation result data that is based on at least one aspect of the speech data.

43. The computationally-implemented method of claim 1, wherein said applying, at least partially via the target device, the adaptation data for processing at least a portion of the speech data, at least partly based on the target device data indicating that the speech data has arrived at an intended target device includes:
    applying the adaptation data for processing at least a portion of the speech data according to whether the target device data indicates a presence of one or more applications configured to process the speech data.

44. The computationally-implemented method of claim 1, wherein said applying, at least partially via the target device, the adaptation data for processing at least a portion of the speech data, at least partly based on the target device data indicating that the speech data has arrived at an intended target device includes:
    applying the adaptation data for processing at least a portion of the speech data according to whether the target device data includes one or more characteristics of one or more applications of a target device.

45. The computationally-implemented method of claim 1, wherein said applying, at least partially via the target device, the adaptation data for processing at least a portion of the speech data, at least partly based on the target device data indicating that the speech data has arrived at an intended target device includes:
    applying the adaptation data for processing at least a portion of the speech data at least partly based on a preference flag set on one or more applications.

46. The computationally-implemented method of claim 1, wherein said applying, at least partially via the target device, the adaptation data for processing at least a portion of the speech data, at least partly based on the target device data indicating that the speech data has arrived at an intended target device includes:
    applying the adaptation data for processing at least a portion of the speech data at least partly based on a decision by an operating system of the target device configured to process at least a portion of the speech data, when the target device data indicates that there are one or more applications present configured to process the speech data.

47. The computationally-implemented method of claim 1, wherein said transmitting adaptation result data that is based on at least one aspect of the speech data includes:
    transmitting adaptation result data indicating that a determination was made regarding an intended target of the speech data.

48. The computationally-implemented method of claim 1, wherein said transmitting adaptation result data that is based on at least one aspect of the speech data includes:
    transmitting adaptation result data that is based on a measure of success of at least one portion of a speech-facilitated transaction corresponding to the speech data.

49. The computationally-implemented method of claim 48, wherein said transmitting adaptation result data that is based on a measure of success of at least one portion of a speech-facilitated transaction corresponding to the speech data includes:

transmitting adaptation result data that includes a representation of success of at least one portion of a speech-facilitated transaction corresponding to the speech data.

50. The computationally-implemented method of claim 49, wherein said transmitting adaptation result data that includes a representation of success of at least one portion of a speech-facilitated transaction corresponding to the speech data includes:

transmitting adaptation result data that includes a numeric representation of success of at least one portion of a speech-facilitated transaction corresponding to the speech data.

51. The computationally-implemented method of claim 50, wherein said transmitting adaptation result data that includes a numeric representation of success of at least one portion of a speech-facilitated transaction corresponding to the speech data includes:

transmitting a confidence rate of correct interpretation of at least one portion of the speech-facilitated transaction corresponding to the received speech data.

52. A computationally-implemented system, comprising circuitry for receiving speech data correlated to one or more words spoken by a particular party;

circuitry for receiving adaptation data that is at least partly based on at least one speech interaction of the particular party that is discrete from the speech data, wherein at least a portion of the adaptation data has been stored on a particular device associated with the particular party;

circuitry for obtaining target device data indicating whether a target device in communication with the particular device associated with the particular party is configured to process at least a portion of the speech data;

circuitry for applying, at least partially via the target device, the adaptation data for processing at least a portion of the speech data, at least partly based on the target device data indicating that the speech data has arrived at an intended target device; and circuitry for transmitting adaptation result data that is based on at least one aspect of the speech data.

53. A device defined by a computational language comprising:

one or more interchained physical machines ordered for receiving speech data correlated to one or more words spoken by a particular party;

one or more interchained physical machines ordered for receiving adaptation data that is at least partly based on at least one speech interaction of the particular party that is discrete from the speech data, wherein at least a portion of the adaptation data has been stored on a particular device associated with the particular party;

one or more interchained physical machines ordered for obtaining target device data indicating whether a target device in communication with the particular device associated with the particular party is configured to process at least a portion of the speech data;

one or more interchained physical machines ordered for applying, at least partially via the target device, the adaptation data for processing at least a portion of the speech data, at least partly based on the target device data indicating that the speech data has arrived at an intended target device; and one or more interchained physical machines ordered for transmitting adaptation result data that is based on at least one aspect of the speech data.

54. The computationally-implemented method of claim 1, wherein said particular device associated with the particular party includes:

at least one mobile device associated with the particular party by at least one of: a contract with a telecommunications provider associating the mobile device with the particular party, ownership of the mobile device by the particular party, information stored on the at least one mobile device identifying the particular party, or detected usage of the mobile device by the particular party.

* * * * *